US012645049B2

(12) United States Patent
Kim et al.

(10) Patent No.: US 12,645,049 B2
(45) Date of Patent: Jun. 2, 2026

(54) CAMERA MODULE

(71) Applicant: SAMSUNG ELECTRO-MECHANICS CO., LTD., Suwon-si (KR)

(72) Inventors: Dae Seob Kim, Suwon-si (KR); Cheong Hee Lee, Suwon-si (KR); Jin Sheng Wang, Suwon-si (KR); Hwan Soo Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 533 days.

(21) Appl. No.: 17/574,109

(22) Filed: Jan. 12, 2022

(65) Prior Publication Data

US 2022/0236513 A1     Jul. 28, 2022

(30) Foreign Application Priority Data

Jan. 28, 2021     (KR) ........................ 10-2021-0012364

(51) Int. Cl.
*G02B 7/02*          (2021.01)
(52) U.S. Cl.
CPC ............. *G02B 7/028* (2013.01); *G02B 7/021* (2013.01)
(58) Field of Classification Search
CPC ........ G02B 7/028; G02B 7/021; G02B 7/022; G02B 27/0006; B08B 7/02; G03B 17/55; H04N 23/55; H04N 23/57
See application file for complete search history.

(56) References Cited

U.S. PATENT DOCUMENTS

| | | | | |
|---|---|---|---|---|
| 5,905,598 A | * | 5/1999 | Shimada | .................. G02B 7/10 359/694 |
| 10,191,189 B2 | | 1/2019 | Mori et al. | |
| 2004/0042092 A1 | * | 3/2004 | Nomura | ................ G02B 7/102 359/819 |
| 2004/0242963 A1 | | 12/2004 | Matsumoto et al. | |
| 2009/0244727 A1 | | 10/2009 | Ishii et al. | |
| 2010/0268027 A1 | | 10/2010 | Aono et al. | |
| 2010/0309553 A1 | | 12/2010 | Nagamizu | |
| 2011/0092769 A1 | | 4/2011 | Kokubo | |

(Continued)

FOREIGN PATENT DOCUMENTS

| | | |
|---|---|---|
| CN | 1572227 A | 2/2005 |
| CN | 1332628 C | 8/2007 |

(Continued)

OTHER PUBLICATIONS

Gross Herbert et al. Handbook of Optical Systems, 2007, Wiley-VCH, vol. 3: Aberration Theory and Correction of Optical Systems, pp. 377-379 (Year: 2007).*

(Continued)

*Primary Examiner* — Sharrief I Broome
*Assistant Examiner* — K Muhammad
(74) *Attorney, Agent, or Firm* — NSIP Law

(57) ABSTRACT

A camera module includes: a lens barrel accommodating a lens; a forwardmost lens disposed closer to an object side than the lens; an energy generation unit configured to supply energy to the forwardmost lens; and an energy transfer member disposed in contact with the forwardmost lens and the energy generation unit, and configured to transfer the supplied energy to the forwardmost lens.

20 Claims, 42 Drawing Sheets

(56)                References Cited

U.S. PATENT DOCUMENTS

| | | | |
|---|---|---|---|
| 2013/0310644 A1 * | 11/2013 | Ichimura | A61B 1/051 600/109 |
| 2015/0241607 A1 | 8/2015 | Mori et al. | |
| 2018/0131879 A1 | 5/2018 | Nagata et al. | |
| 2019/0137850 A1 | 5/2019 | Ha et al. | |
| 2020/0116994 A1 | 4/2020 | Gu et al. | |
| 2022/0163751 A1 | 5/2022 | Park et al. | |

FOREIGN PATENT DOCUMENTS

| | | | |
|---|---|---|---|
| CN | 101543397 A | 9/2009 | |
| CN | 102131450 A | 7/2011 | |
| CN | 102292014 A | 12/2011 | |
| CN | 102123654 B | 7/2012 | |
| CN | 103648354 A | 3/2014 | |
| CN | 207336911 U | 5/2018 | |
| CN | 208384225 U | 1/2019 | |
| CN | 110200574 A | 9/2019 | |
| JP | 4632083 B2 * | 2/2011 | |
| JP | 2014-68676 A | 4/2014 | |
| JP | 6009826 B2 * | 10/2016 | |
| KR | 10-2017-0041360 A | 4/2017 | |
| KR | 10-2019-0051604 A | 5/2019 | |
| KR | 10-2020-0014971 A | 2/2020 | |
| KR | 10-2020-0042983 A | 4/2020 | |
| KR | 10-2020-0113641 A | 10/2020 | |

OTHER PUBLICATIONS

Chinese Office Action issued on Apr. 7, 2024, in counterpart Chinese Patent Application No. 202210115055.1 (6 pages in English, 9 pages in Chinese).

Lin, Li, et al., "Theory and Application of Computer Aided Optical Design", National Defense Industry Press, Apr. 30, 2002, (11 Pages in English, 21 Pages in Chinese).

Chinese Office Action Issued on Jan. 21, 2025, in Counterpart Chinese Patent Application No. 202210115055.1 (7 Pages in English, 8 Pages in Chinese).

Chinese Office Action Issued on May 16, 2025, in Counterpart Chinese Patent Application No. 202210115055.1 (10 Pages in English, 11 Pages in Chinese).

Korean Office Action Issued on Jul. 14, 2025, in Counterpart Korean Patent Application No. 10-2021-0012364 (11 Pages in English, 9 Pages in Korean).

Chinese Office Action issued on Jan. 1, 2026, in counterpart Chinese Patent Application No. 202210115055.1 (9 pages in English, 7 pages in Chinese).

* cited by examiner

FIG. 8A                     FIG. 8B

CAMERA MODULE

CROSS-REFERENCE TO RELATED APPLICATIONS

This application claims the benefit under 35 U.S.C. § 119(a) of Korean Patent Application No. 10-2021-0012364 filed on Jan. 28, 2021 in the Korean Intellectual Property Office, the entire disclosure of which is incorporated herein by reference for all purposes.

BACKGROUND

1. Field

The following description relates to a camera module. For example, the following description relates to a camera module configured to reduce resolution degradation caused by foreign matter.

2. Description of Related Art

The resolution and field of view of a camera module may depend on a condition of a forwardmost lens. For example, foreign matter (e.g., dust, frost or water droplets) adhering to the forwardmost lens may reduce the resolution of the camera module or make an angle of view and the field of view actually narrow. In particular, frost, dew or the like may easily adhere to the forwardmost lens of the camera module, which is exposed outwardly, and the camera module may thus have a reduced resolution and a blocked field of view, due to this foreign matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a lens barrel accommodating a lens; a forwardmost lens disposed closer to an object side than the lens; an energy generation device configured to supply energy to the forwardmost lens; and an energy transfer member disposed in contact with the forwardmost lens and the energy generation device, and configured to transfer the supplied energy to the forwardmost lens.

The lens barrel may include: a first accommodating portion accommodating the lens, and a second accommodation portion accommodating the energy transfer member.

The energy generation device may be disposed in the second accommodation portion.

The camera module may further include an insulation member disposed in the second accommodation portion, and configured to block the supplied energy from being transferred to the lens barrel.

The energy generation device may be further configured to generate either one or both of thermal energy and vibration energy.

The energy generation device may be disposed between the lens barrel and the energy transfer member.

The energy transfer member may be made of a material having a thermal conductivity higher than a thermal conductivity of the lens barrel.

The energy transfer member may be in contact with a flange portion of the forwardmost lens.

The forwardmost lens and the energy transfer member may include respective inclined surfaces coupled to each other such that the forwardmost lens and the energy transfer member are aligned with each other, or the forwardmost lens may include protrusions and the energy transfer member may include grooves, and the protrusions and the grooves may be coupled to each other such that the forwardmost lens and the energy transfer member are aligned with each other.

The energy transfer member may be disposed between the forwardmost lens and the lens.

The camera module may further include a cover member coupled to the lens barrel, and configured to secure the forwardmost lens to the lens barrel.

In another general aspect, a camera module includes: a first lens barrel accommodating a lens; a second lens barrel coupled to the first lens barrel, and coupled to or in contact with a forwardmost lens disposed in front of the lens; an energy generation device disposed in contact with the second lens barrel, and configured to transfer energy to the forwardmost lens through the second lens barrel; and a cover member coupled to the first lens barrel or the second lens barrel, and configured to prevent the forwardmost lens from being separated from the lens barrel.

The second lens barrel may be made of a material having a thermal conductivity higher than a thermal conductivity of the first lens barrel.

The second lens barrel may be in contact with a flange portion of the forwardmost lens.

The second lens barrel may include an extension in contact with an inner circumferential surface of the energy generation device.

The first lens barrel may include a space or a hole, and the extension may be inserted into the space or the hole.

In another general aspect, a camera module includes: a first lens barrel accommodating one or more lenses; a second lens barrel coupled to the first lens barrel; an additional lens disposed closer to an object side of the camera module than the one or more lenses, and in contact with the second lens barrel; and an energy generation device disposed between the first lens barrel and the second lens barrel, and configured to transfer either one of thermal energy and vibration energy to the additional lens through the second lens barrel.

The energy generation device may not in contact with the first lens barrel.

The camera module may further include an insulation member disposed between the energy generation device and the first lens barrel.

The camera module may further include a buffer member disposed between the energy generation device and the first lens barrel, and configured to press the energy generation device against the second lens barrel.

A material of the second lens barrel may have a thermal conductivity higher than a thermal conductivity of a material of the first lens barrel.

Other features and aspects will be apparent from the following detailed description, the drawings, and the claims.

BRIEF DESCRIPTION OF DRAWINGS

FIGS. 7 through 8C are cross-sectional views of a camera module, according to another embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
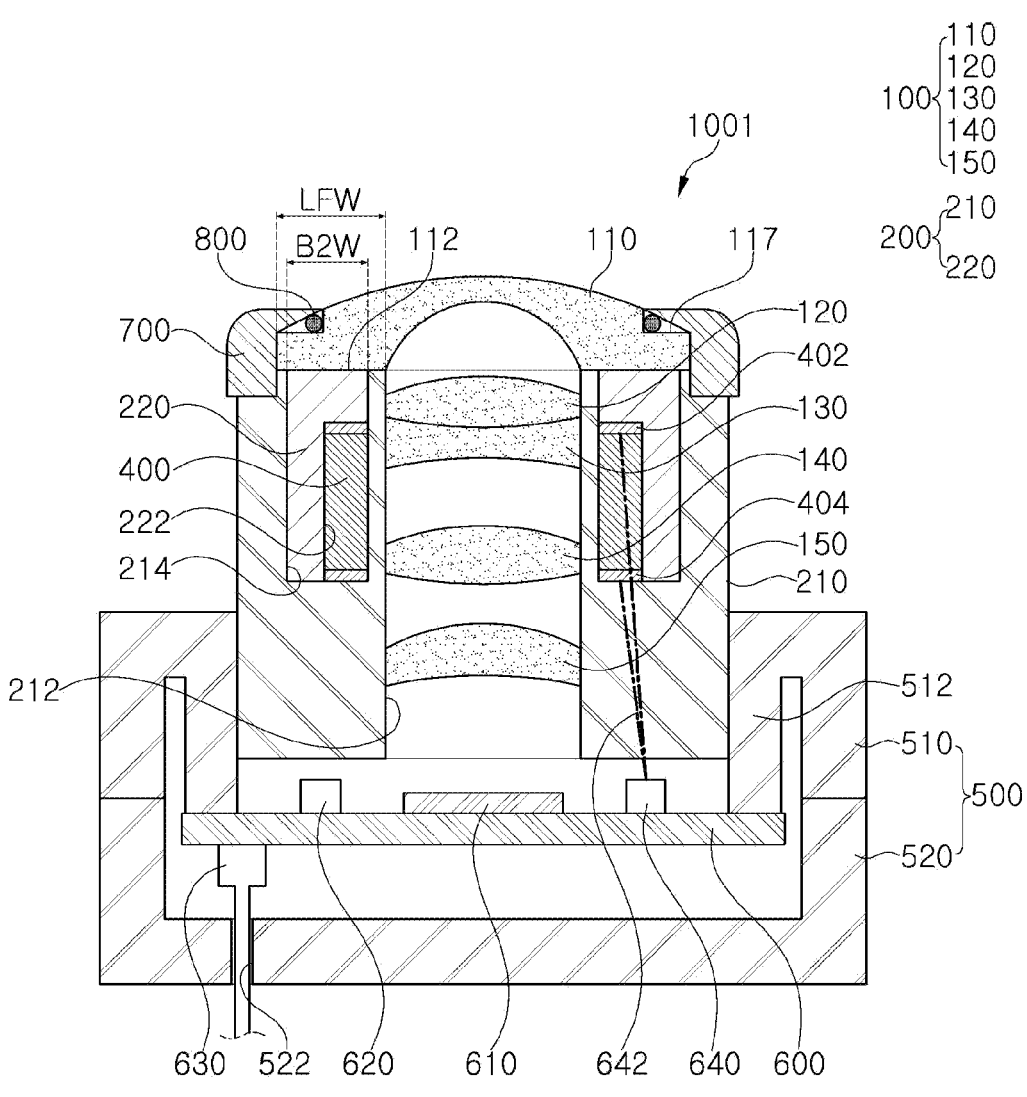
FIG. 1 is a cross-sectional view of a camera module, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

A camera module according to the disclosure herein may be mounted on a device that is easily exposed to an external environment. For example, the camera module may be mounted on a vehicle or a security monitoring device. However, a scope of use of a camera module according to this disclosure is not limited to the above-described devices. For example, a camera module according to this disclosure may be mounted on a communication device at a common entrance of an apartment complex, a communication device at a building entrance, etc.

The camera module may convert an optical signal reflected from a subject into an electrical signal. For example, the camera module may convert an optical signal incident through one or more lenses into an electrical signal through an image sensor. A resolution of the camera module may depend on an amount of light incident on the camera module. For example, the amount of light incident on the camera module may be decreased or increased due to foreign matter adhering to a glass cover panel or a forwardmost lens of the camera module. In this case, an image may not be smoothly converted through the image sensor.

A camera module according to the disclosure herein may remove the foreign matter adhering to the glass cover panel or the forwardmost lens of the camera module by using various energy shapes. For example, a camera module according to an embodiment may use thermal energy to remove water droplet, frost, moisture, ice or the like adhering to, condensed on, or aggregated on the glass cover panel or the forwardmost lens thereof. A camera module according to another embodiment may use vibration energy to remove the foreign matter adhering to the glass cover panel or the forwardmost lens thereof. A camera module according to yet another embodiment may use magnetic energy to remove the foreign matter adhering to the glass cover panel or the forwardmost lens thereof.

Hereinafter, example embodiments will be described in detail with reference to the accompanying drawings.

FIG. 1 illustrates a camera module, according to an embodiment.

Referring to FIG. 1, a camera module 1001 may include an optical system 100, a lens barrel 200 and an energy generation unit (or energy generation device) 400.

The optical system 100 may form an image at a predetermined position by using light reflected from a subject. For example, the optical system 100 may have refractive power to form the image at the predetermined position by using light incident thereon. The optical system 100 may include the plurality of lenses. For example, the optical system 100 may include five or more lenses, including a first lens 110, a second lens 120, a third lens 130, a fourth lens 140, and a fifth lens 150. However, the number of lenses included in the optical system 100 is not limited to five. For example, the optical system 100 may include four or fewer lenses or include six or more lenses.

The first to fifth lenses 110, 120, 130, 140 and 150 may be sequentially arranged from an object side. For example, the first lens 110, the second lens 120, the third lens 130, the fourth lens 140 and the fifth lens 150 may be arranged sequentially from the object side in an optical axis direction. The first lens 110 to the fifth lens 150 may each be made of a plastic or glass material. For example, the first lens 110 to the fifth lens 150 may be all made of the glass material or all made of the plastic material. However, the first lens 110 to the fifth lens 150 may not all be made of the same material. For example, at least one of the first lens 110 to the fifth lens 150 may be made of the glass material and the remainder of the first lens 110 to the fifth lens 150 may be made of the plastic material. As a specific example, the first lens 110, which is exposed outward, may be made of the glass material. As another example, a lens of the optical system 100, having strong refractive power, may be made of the glass material. The former example may reduce lens breakage due to external impact, and the latter example may reduce a change rate of a focal length of the camera module 1001 due to a temperature change.

A forwardmost lens (i.e., first lens 110) of the optical system 100, disposed closest to the object side, may have a larger diameter than that of the other lenses. For example, the first lens 110 may be sized to be in contact with an end of the lens barrel 200. Therefore, the first lens 110 may be aligned with an optical axis by careful adjustment or another process in a state in which the first lens 110 is disposed at the end of the lens barrel 200. The first lens 110 may be formed for the camera module 1001 to capture an image with a wide angle. As an example, an object-side surface of the first lens 110 may generally have a convex shape. As another example, the first lens 110 may generally have negative refractive power. As yet another example, the first lens 110 may have the convex object-side surface and the negative refractive power.

The optical system 100 may further include another component in addition to the first to fifth lenses 110, 120, 130, 140 and 150. For example, the optical system 100 may further include a filter member configured to block infrared light. However, the additional component of the optical system 100 is not limited to the filter member. For example, the optical system 100 may further include a stop disposed between the lens and the lens to control the amount of light, a spacer maintaining a constant distance between the lens and the lens, etc.

The optical system 100 may have a predetermined angle of view. For example, the optical system 100 may have an angle of view of 120 degrees or more to simultaneously capture an image over a wide area. However, the angle of view of the optical system 100 is not limited to 120 degrees or more. For example, the optical system 100 may have an angle of view of less than 120 degrees.

The lens barrel 200 may accommodate an optical system 100. For example, the lens barrel 200 may include an accommodation space accommodating the optical system 100. The lens barrel 200 may accommodate one or more of the first lens 110 to the fifth lens 150 included in the optical system 100. For example, the lens barrel 200 may accommodate the second to fifth lenses 120 to 150.

The lens barrel 200 may generally have a cylindrical shape. However, the lens barrel 200 is not limited to the cylindrical shape. For example, the lens barrel 200 may have a shape of a quadrangular prism, a rectangular prism, or the like based on a cross-sectional shape of the first to fifth lenses 110 to 150.

There may be a plurality of lens barrels 200. For example, the lens barrel 200 may include a first lens barrel 210 and a second lens barrel 220. The first lens barrel 210 and the second lens barrel 220 may be made of materials that are different from each other. As an example, the first lens barrel 210 may be made of a material having low thermal conductivity or a material having low electrical conductivity, and the second lens barrel 220 may be made of a material having high thermal conductivity or a material having high electrical conductivity. As another example, the first lens barrel 210 may be made of the plastic material, and the second lens barrel 220 may be made of a metal material.

The first lens barrel 210 may accommodate the optical system 100 and the second lens barrel 220. For example, the first lens barrel 210 may include a first accommodation portion 212 accommodating the optical system 100 and a second accommodation portion 214 accommodating the second lens barrel 220. The first accommodation portion 212 and the second accommodation portion 214 may be formed as spaces independent of each other. For example, the first accommodation portion 212 may be formed in a center of the first lens barrel 210, and the second accommodation portion 214 may be formed at a predetermined distance outward from the first accommodation portion 212. The first accommodation portion 212 and the second accommodation portion 214 may each be formed to be elongated in a longitudinal direction of the first lens barrel 210. The first accommodation portion 212 and the second accommodation portion 214 may be formed to have sizes or lengths that are different from each other. For example, the first accommodation portion 212 may be formed to completely penetrate through the first lens barrel 210, and the second accommodation portion 214 may be formed to have a predetermined length from one end of the first lens barrel 210.

The second lens barrel 220 may be disposed in the second accommodation portion 214 of the first lens barrel 210. The second lens barrel 220 may be in contact with the first lens 110 which is the forwardmost lens. For example, the second lens barrel 220 may be in contact with a flange portion 112 of the first lens 110 in a state of being mounted on the second accommodation portion 214 of the first lens barrel 210. A width B2W of one end of the second lens barrel 220 may have substantially the same size as that of a width LFW of the flange portion 112. The second lens barrel 220 satisfying the above-mentioned condition may be in contact with the flange portion 112 through a sufficient area, and may thus deliver energy supplied from an external source to the first lens 110 rapidly and effectively. However, the width B2W of the one end of the second lens barrel 220 may not necessarily have the same size as that of the width LFW of the flange portion 112. For example, the width B2W of the one end of the second lens barrel 220 may have a smaller size than the width LFW of the flange portion 112.

The second lens barrel 220 may have a predetermined space in a state of being mounted in the first lens barrel 210. For example, a concave portion 222 may be formed inside the second lens barrel 220, and a space of a significant size may be formed between the first lens barrel 210 and the second lens barrel 220. The concave portion 222 may be elongated upwardly from a distal end of the second lens barrel 220.

The second lens barrel 220 may function as an energy transfer member. For example, the second lens barrel 220 may transfer energy generated from the energy generation unit 400 to an adjacent member. As an example, the second lens barrel 220 may be made of the material having high thermal conductivity to easily transfer thermal energy of the energy generation unit 400. As an example, the second lens barrel 220 may be made of a material having a high vibration frequency to easily transfer vibration energy of the energy generation unit 400. The second lens barrel 220 according to this embodiment may be made of the metal material described above. However, the material of the second lens barrel 220 is not limited to the metal. For example, the second lens barrel 220 may be made of a material having a high specific heat to maintain the absorbed thermal energy for a long time.

The energy generation unit 400 may generate a predetermined amount of energy. For example, the energy generation unit 400 may be a heat generation device generating the thermal energy. As a specific example, the energy generation unit 400 may be a positive temperature coefficient (PTC) heater. However, the energy generation unit 400 is not limited to the heat generation device. For example, the energy generation unit 400 may be an excitation device or piezoelectric body generating the vibration energy.

The energy generation unit 400 may be disposed between the first lens barrel 210 and the second lens barrel 220. For example, the energy generation unit 400 may be disposed in the concave portion 222 of the second lens barrel 220. The energy generation unit 400 may be in close contact with the second lens barrel 220. For example, the energy generation unit 400 may have a shape substantially the same as that of a circular space formed by the concave portion 222 and the second accommodation portion 214. However, the energy generation unit 400 is not limited to the shape of the space formed by the concave portion 222 and the second accommodation portion 214.

The energy generation unit 400 may transfer the energy to the second lens barrel 220. For example, the energy generation unit 400 may be in contact with the concave portion 222 of the second lens barrel 220 to transfer the thermal energy, the vibration energy and the like, generated from the energy generation unit 400, to the second lens barrel 220. The energy generated from the energy generation unit 400 may be transferred more effectively to the second lens barrel 220 than to the first lens barrel 210. For example, the second lens barrel 220 may be made of a material that may receive thermal energy and the vibration energy more easily than that of the first lens barrel 210, and most of the energy generated from the energy generation unit 400 may thus be transferred to the second lens barrel 220 or absorbed into the second lens barrel 220.

The camera module 1001 may further include a component other than the components described above. For example, the camera module 1001 may further include a housing 500, a substrate 600, a cover member 700, and additional components.

The housing 500 may accommodate or support the lens barrel 200 and the substrate 600. For example, the housing 500 may accommodate the substrate 600 while supporting the lens barrel 200 and the substrate 600. The housing 500 may include an upper housing 510 and a lower housing 520. The upper housing 510 may support the lens barrel 200 and the substrate 600, and the lower housing 520 may seal an open space of the upper housing 510. The upper housing 510 may include a support portion 512. The support portion 512 may be elongated downward from a top end of the upper housing 510. The support portion 512 may be coupled to the lens barrel 200 and the substrate 600. For example, an inner surface of the support portion 512 may be coupled to the lens barrel 200, and a distal end of the support portion 512 may be coupled to the substrate 600. The support portion 512 and the lens barrel 200 may be fastened to each other by press-fitting, and the support portion 512 and the substrate 600 may be coupled to each other by a fastening element such as a bolt.

The substrate 600 may include an electronic component required to drive the camera module 1001. For example, the substrate 600 may be equipped with an image sensor 610, a passive element 620, and the like. The electronic components mounted on or embedded in the substrate 600 may be electrically connected to each other. For example, an electric circuit electrically connecting the electronic components to each other may be formed on one surface of, or within, the substrate 600. The substrate 600 may provide power and a control signal that are necessary to drive the camera module 1001. For example, a connection terminal 630 connected to an external power source and an external device may be formed on a rear surface of the substrate 600. The substrate 600 may be connected to the energy generation unit 400. For example, a power supply terminal 640 connected to power terminals 402 and 404 of the energy generation unit 400 may be formed on the one surface of the substrate 600. The energy generation unit 400 and the power supply terminal 640 may be electrically connected to each other by a power line 642, a flexible substrate, or the like.

The cover member 700 may secure the forwardmost lens to the lens barrel 200. For example, the cover member 700 may be coupled to the lens barrel 200 while pressing an edge of the first lens 110. The cover member 700 may be adhered or coupled to the lens barrel 200. As an example, the cover member 700 may be adhered to the lens barrel 200 by an adhesive member. As another example, the cover member 700 may be fastened to the lens barrel 200 by screw coupling. The adhering or coupling of the cover member 700 to the lens barrel 200 may improve airtightness between the cover member 700 and the lens barrel 200, and the fastening of the cover member 700 to the lens barrel by the screw coupling may increase adhesion between the first lens 110 and the lens barrel 200 by the cover member 700 to the lens barrel 200.

The cover member 700 may be generally made of a material that is the same as or similar to that of the first lens barrel 210. For example, the cover member 700 may be made of the plastic material. The cover member 700, made of the material that is the same as or similar to that of the first lens barrel 210, may be excellently coupled, adhered or fastened to the first lens barrel 210, and may thus significantly reduce a possibility that the forwardmost lens (i.e., first lens 110) becomes separated from the lens barrel 200. However, the cover member 700 is not limited to the plastic material. For example, the cover member 700 may be made of the metal material to protect the first lens 110 from the external impact.

An airtight member 800 may be disposed between the first lens 110 and the cover member 700. For example, the airtight member 800 may be disposed between a step portion 117, formed on the edge of the first lens 110, and the cover member 700. The airtight member 800 may be made of a material that may be elastically deformed or compressively deformed. For example, the airtight member 800 may be made of rubber, synthetic rubber, elastomer, or the like. However, the airtight member 800 is not limited to the above-mentioned materials. The airtight member 800 may block a gap between the first lens 110 and the cover member 700. For example, the airtight member 800 may be elastically deformed when the cover member 700 and the lens barrel 200 are coupled to each other to block the gap between the first lens 110 and the cover member 700.

The camera module 1001 configured as above may remove foreign matter adhering to the forwardmost lens (i.e., first lens 110). For example, the camera module 1001 may remove frost, moisture, dew, raindrops, or the like, adhering to the surface of the first lens 110 by using vibrations, heat, static electricity, etc.

The following description describes a method of removing the foreign matter from the camera module 1001, according to an embodiment.

The camera module 1001 may remove the foreign matter adhering to or occurring on the surface of the forwardmost lens (i.e., first lens 110) by using the energy generation unit 400.

As an example, the camera module 1001 may remove the foreign matter adhering to or occurring on the surface of the forwardmost lens (i.e., first lens 110) by always operating the energy generation unit 400 regardless of an external environment. As another example, the camera module 1001 may heat the first lens 110 by operating the energy generation unit 400 when it is recognized that a resolution value obtained by the image sensor 610 is a reference value or less.

In the case in which the energy generation unit 400 is operated regardless of the external environment, the energy generation unit 400 may be operated continuously or constantly to generate the thermal energy. For example, the energy generation unit 400 may generate the thermal energy at a predetermined time interval or may generate the thermal energy for its adjacent component (e.g., the second lens barrel 220) to maintain a constant temperature. In the case in which the energy generation unit 400 is operated when it is recognized that a resolution value obtained by the image sensor 610 is a reference value or less, the energy generation unit 400 may generate the thermal energy by being operated by an external signal.

The thermal energy of the energy generation unit 400 may be transferred to its adjacent components. For example, the thermal energy of the energy generation unit 400 may be transferred to the first lens barrel 210 and the second lens barrel 220 surrounding the energy generation unit 400 in the form of convection, conduction, radiation, etc. The thermal energy of the energy generation unit 400 may be transferred to the second lens barrel 220. For example, the second lens barrel 220 may be made of the material having higher thermal conductivity than that of the first lens barrel 210, and most of the thermal energy of the energy generation unit 400 may be transferred to the second lens barrel 220. The thermal energy transferred to the second lens barrel 220 may be transferred to the first lens 110, which is in contact with or adjacent to the second lens barrel 220, while simultaneously heating the second lens barrel 220. The thermal energy transferred to the first lens 110 may heat the first lens 110 to a predetermined temperature to evaporate raindrop, water droplet, frost or the like adhering to the surface of the first lens 110. In addition, the first lens 110 being heated to the predetermined temperature may cause a convection phenomenon in the vicinity of the first lens 110 to induce removal of dust attached to the surface of the first lens 110 or to prevent the dust from adhering to the surface of the first lens 110 in advance.

As described above, the camera module 1001 may use the energy generation unit 400 to remove raindrop, water droplet, frost, moisture, dust or the like adhering to the surface of the forwardmost lens, thereby preventing resolution degradation, distortion of a field of view of an image being captured or the like, due to the foreign matter.

Figure 2:
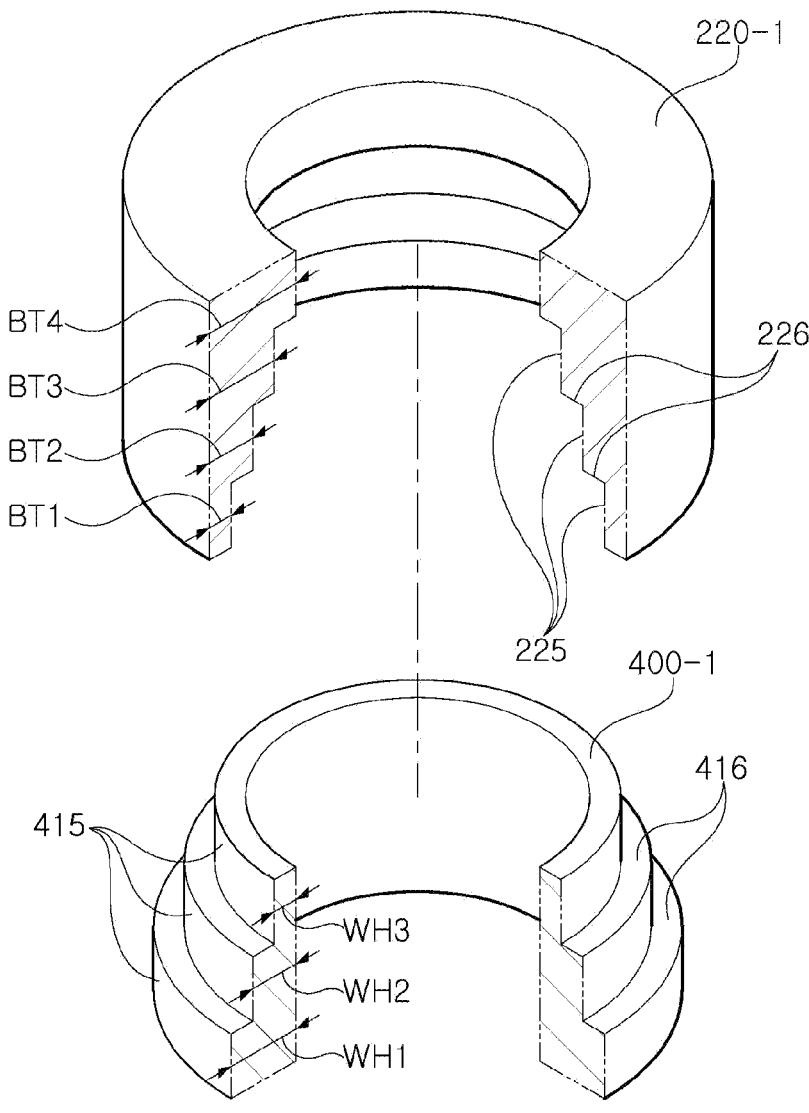
FIGS. 2 through 4 are views each illustrating other types of a second lens barrel and an energy generation unit shown in FIG. 1.
Figure 3:
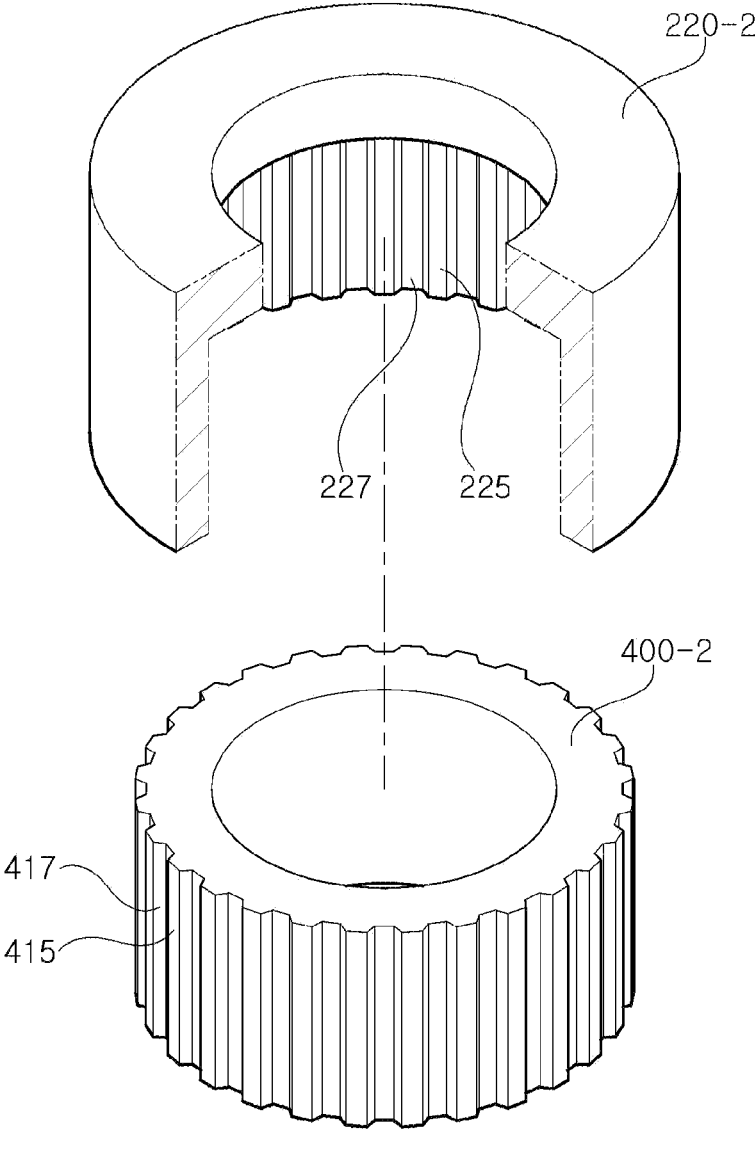
Figure 4:
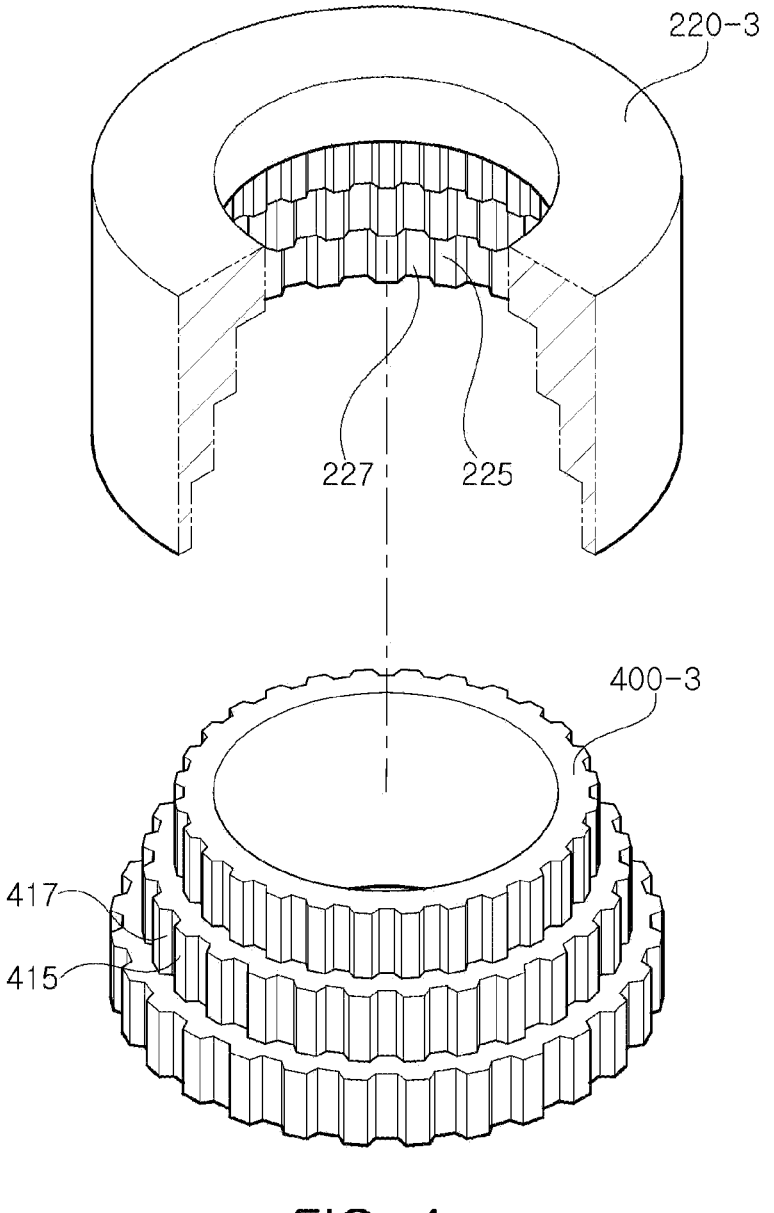

FIGS. 2 to 4 illustrate modified examples in which a second lens barrel and an energy generation unit are coupled to each other for effectively transferring the energy of the energy generation unit.

Referring to FIGS. 2 to 4, a second lens barrel and an energy generation unit may be formed to increase energy transfer efficiency. For example, the second lens barrel and the energy generation unit may increase an area in which the second lens barrel and the energy generation unit are in contact with or face each other.

Referring to FIG. 2, as an example, a second lens barrel 220-1 and an energy generation unit 400-1 may have a plurality of steps 226 and 416, respectively, as shown in FIG. 2. Referring to FIG. 3, as another example, a second lens barrel 220-2 and an energy generation unit 400-2 may have a plurality of grooves 227 and protrusions 417, respectively. Referring to FIG. 4, as another example, a second lens barrel 220-3 may have the steps 226 and the grooves 227 and an energy generation unit 400-3 may have the steps 416 and the protrusions 417.

In the embodiment illustrated in FIG. 2, the second lens barrel 220-1 and the energy generation unit 400-1 may each have a step difference. For example, the second lens barrel 220-1 may have the plurality of steps 226 formed on an inner circumferential surface 225, and the energy generation unit 400-1 may have the plurality of steps 416 formed on an outer circumferential surface 415. In general, the inner circumferential surfaces 225 and steps 226 of the second lens barrel 220-1 may be in contact with the outer circumferential surfaces 415 and steps 416 of the energy generation unit 400-1. As an example, the inner circumferential surfaces 225 of the second lens barrel 220-1 may be in contact with the outer circumferential surfaces 415 of the energy generation unit 400-1, and the steps 226 of the second lens barrel 220-1 may be in contact with the steps 416 of the energy generation unit 400-1, respectively. As another example, the inner circumferential surface 225 of the second lens barrel 220-1 may have substantially the same size (or diameter) as that of the outer circumferential surface 415 of the energy generation unit 400-1, and the step 226 of the second lens barrel 220-1 may have substantially the same size as that of the step 416 of the energy generation unit 400-1.

The second lens barrel 220-1 may have a cross-sectional area that is increased in an upward direction (i.e., toward the first lens 110). For example, thicknesses BT1, BT2, BT3 and BT4 of the second lens barrel 220 may be increased in the upward direction. The energy generation unit 400-1 may have a cross-sectional area that is decreased in the upward direction. For example, thicknesses WH1, WH2 and WH3 of the energy generation unit 400-1 may be decreased in the upward direction.

The second lens barrel 220-1 and the energy generation unit 400-1 may easily transfer the energy generated by the heat generation unit 400-1 upward. For example, the second lens barrel 220-1 may have the cross-sectional area that is increased in the upward direction, and the lower the portion of the second lens barrel 220-1, the faster the energy of the energy generation unit 400 may be absorbed or transferred. In contrast, the energy generation unit 400-1 may have the cross-sectional area that is increased in the downward direction, and the lower the portion of the energy generation unit 400-1, the greater the energy that may be generated.

In consideration of the description above, the energy generated from the energy generation unit 400-1 may not only be rapidly transferred, but may also be increased toward the lower portion of the second lens barrel 220-1. Meanwhile, the energy has a tendency to be moved from a place having a high displacement to a place having a low displacement, and the energy transferred to the second lens barrel 220-1 may thus be moved from its lower portion to its upper portion. Therefore, the energy of the energy generation unit 400-1 may be rapidly transferred or supplied to the first lens 110, which is the forwardmost lens.

Referring to FIG. 3, the second lens barrel 220-2 and the energy generation unit 400-2 may each have the grooves 227 and the protrusions 417. For example, the second lens barrel 220-2 may have the plurality of grooves 227 formed in the inner circumferential surface 225, and the energy generation unit 400-2 may have the plurality of protrusions 417 formed on the outer circumferential surface 415. The second lens barrel 220-2 may generally be mesh-coupled to the energy generation unit 400-2. As an example, the inner circumferential surfaces 225 of the second lens barrel 220-2 may be in contact with the outer circumferential surfaces 415 of the energy generation unit 400-2, and the grooves 227 of the second lens barrel 220-2 may be in mesh contact with the protrusions 417 of the energy generation unit 400.

The second lens barrel 220-2 and the energy generation unit 400-2 may have an increased area in which the second lens barrel 220-2 and the energy generation unit 400-2 are in contact with or face each other by the grooves 227 and the protrusions 417, thus improving the energy transfer efficiency through the conduction or the convection.

Referring to FIG. 4, the second lens barrel 220-3 and the energy generation unit 400-3 may have all the features shown in FIGS. 2 and 3. For example, the second lens barrel 220-3 may have the steps 226 and the grooves 227, and the energy generation unit 400-3 may have the steps 416 and the protrusions 417. Therefore, the second lens barrel 220-3 and energy generation unit 400-3 may have all the advantages of the lens barrels 220-1 and 220-2, and the energy generation units 400-1 and 400-2, shown in FIGS. 2 and 3.

FIGS. 5A through 6B illustrate modified examples in which a forwardmost lens and a second lens barrel are coupled to each other.

Figure 5A:
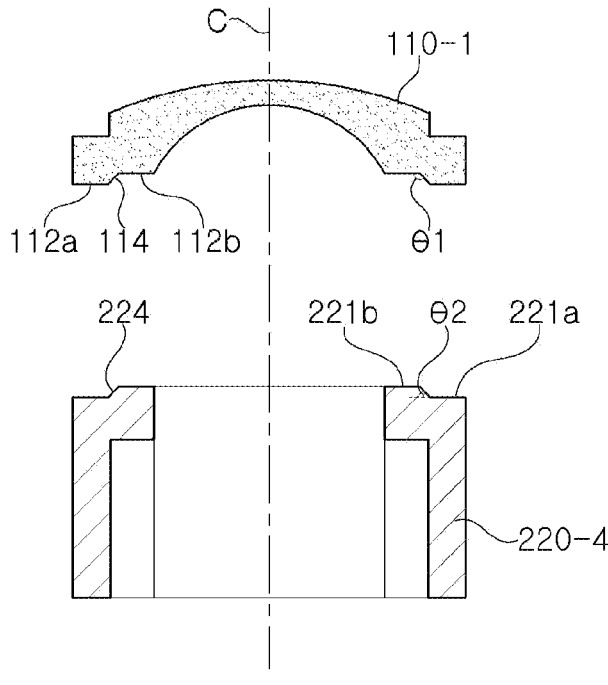
FIGS. 5A through 6B are cross-sectional views showing other types of a forwardmost lens and the second lens barrel, shown in FIG. 1, that are coupled to each other.
Figure 5B:
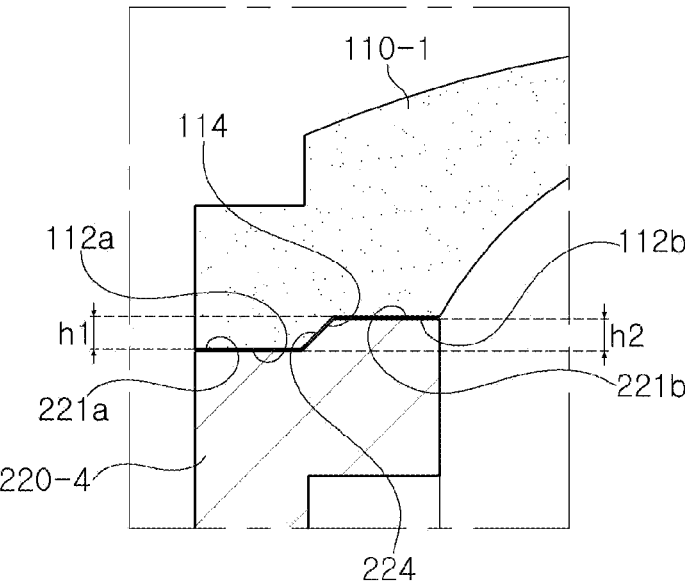
Figure 6A:
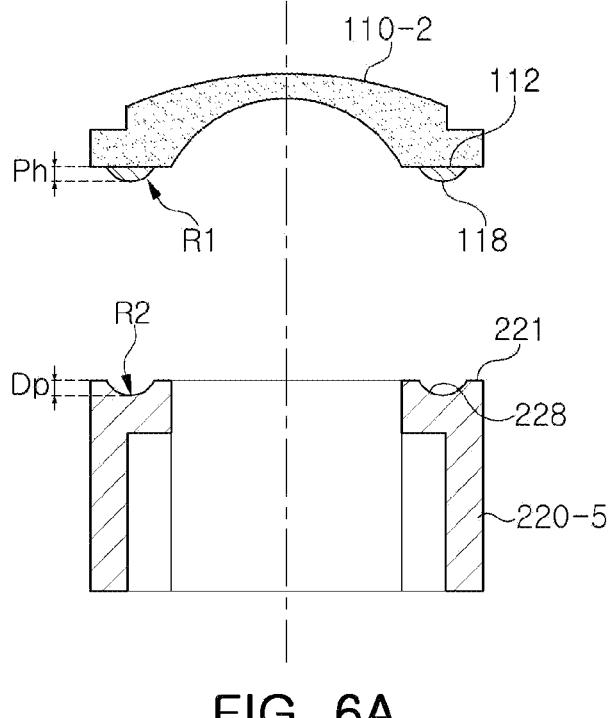
Figure 6B:
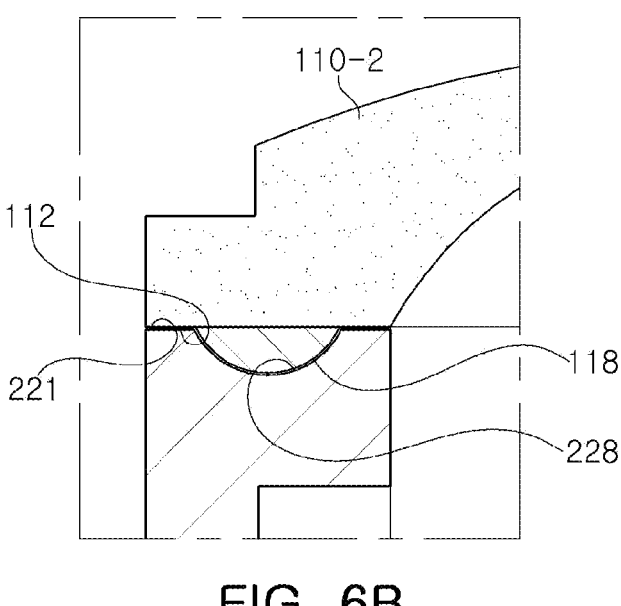

A first lens 110, which is the forwardmost lens, and a second lens barrel may be self-aligned with each other. As an example, a first lens 110-1 and a second lens barrel 220-4 may be aligned with each other by allowing their inclined surfaces to be in line contact with each other as shown in FIGS. 5A and 5B. As another example, a first lens 110-2 and a second lens barrel 220-5 may be aligned with each other by coupling a protrusion 118 and a groove 228 to each other, as shown in FIGS. 6A and 6B.

Referring to FIGS. 5A and 5B, the first lens 110-1 and the second lens barrel 220-4 may include inclined surfaces 114 and 224, respectively, having a predetermined inclination with respect to bonding surfaces 112a and 112b of the first lens 110-1, and bonding surfaces 221a and 221b of the second lens barrel 220-4, respectively. For example, the first lens 110-1 may include the inclined surface 114 having a first inclination angle θ1 with respect to the bonding surface 112*b*, and the second lens barrel 220-4 may include the inclined surface 224 having a second inclination angle θ2 with respect to the bonding surface 221*a*. The inclined surface 114 of the first lens 110-1 and the inclined surface 224 of the second lens barrel 220-4 may be generally parallel to each other. However, the inclined surface 114 of the first lens 110-1 and the inclined surface 224 of the second lens barrel 220-4 may not be necessarily parallel to each other.

The inclined surface 114 of the first lens 110-1 and the inclined surface 224 of the second lens barrel 220-4 may each have a predetermined height. For example, the inclined surface 114 of the first lens 110-1 may have a first height h1, and the inclined surface 224 of the second lens barrel 220-4 may have a second height h2. The inclined surface 114 of the first lens 110 and the inclined surface 224 of the second lens barrel 220 may have substantially the same height. For example, the first height h1 of the inclined surface 114 and the second height h2 of the inclined surface 224 may have the same size. However, the inclined surface 114 of the first lens 110-1 and the inclined surface 224 of the second lens barrel 220-4 may not necessarily have the same height.

The first lens 110-1 and the second lens barrel 220-4 may be aligned with each other by coupling the inclined surface 114 and the inclined surface 224 to each other. For example, a rotation center (or optical axis C) of the first lens 110-1 and a rotation center of the second lens barrel 220-4 may be aligned with each other by arranging the inclined surface 114 and the inclined surface 224 to be in line contact or surface contact with each other.

Therefore, the first lens 110-1 and the second lens barrel 220-4 may solve a problem in which the resolution of a camera module is degraded because a first lens is not aligned with the optical axis.

The first lens 110-1 and the second lens barrel 220-4 may be coupled to each other by the bonding surfaces 112*a*, 112*b*, 221*a* and 221*b*. For example, the first lens 110-1 and the second lens barrel 220-4 may be aligned with each other by arranging the inclined surfaces 114 and 224 to be in contact with each other, while being closely adhered to each other by simultaneously arranging the bonding surfaces 112*a*, 112*b*, 221*a* and 221*b* to be in surface contact with each other. The first lens 110-1 and the second lens barrel 220-4 may be bonded to each in a configuration in which the bonding surfaces 112*a* and 221*a* are bonded to each other and/or the bonding surfaces 112*b* and 221*b* are bonded to each other. As an example, in a case in which the inclined surface 114 and the inclined surface 224 have the same height (i.e., when h1=h2), the bonding surfaces 112*a* and 221*a* may be closely bonded to each other and the bonding surfaces 112*b* and 221*b* may be closely bonded to each other. As another example, in a case in which the inclined surface 114 and the inclined surface 224 have heights different from each other (i.e., when h1>h2 or h1<h2), either the bonding surfaces 112*a* and 221*a* may be closely bonded to each other or the bonding surfaces 112*b* and 221*b* may be closely bonded to each.

Accordingly, the first lens 110-1 and the second lens barrel 220-4 may be configured such that the first lens 110-1 and the second lens barrel 220-4 are be self-aligned with each other, while simultaneously allowing energy of an energy generation unit to be transferred by arranging the first lens 110-1 and the second lens barrel 220-4 be in close contact with each other.

Referring to FIGS. 6A and 6B, the first lens 110-2 and the second lens barrel 220-5 may respectively include protrusions 118 and grooves 228. For example, the first lens 110-2 may include the protrusion 118 protruding downwardly from the bonding surface 112, and the second lens barrel 220-5 may include the groove 228 formed in the bonding surface 221.

The protrusion 118 and the groove 228 each may generally have a hemispherical shape. For example, the protrusion 118 may have an embossed hemispherical shape having a radius of R1, and the groove 228 may have an engraved hemispherical shape having a radius of R2. The radius R1 of the protrusion 118 and the radius R2 of the groove 228 may substantially have the same size. However, the radius R1 of the protrusion 118 and the radius R2 of the groove 228 may not necessarily have the same size. For example, the radius R1 of the protrusion 118 may be smaller than the radius R2 of the groove 228. In a case in which the radius R1 of the protrusion 118 and the radius R2 of the groove 228 do not have the same size, a height of the protrusion 118 may be greater than a depth of the groove 228. The protrusion 118 and the groove 228 may each have a predetermined height and depth. For example, Ph may indicate the height of the protrusion 118, and Dp may indicate the depth of the groove 228. The height Ph of the protrusion 118 and the depth Dp of the groove 228 may have substantially the same size. However, the height Ph of the protrusion 118 and the depth Dp of the groove 228 may not necessarily have the same size. For example, the height Ph of the protrusion 118 may be less than the depth Dp of the groove 228. In the former case, the radius R1 of the protrusion 118 may be greater than the radius R2 of the groove 228.

The first lens 110-2 and the second lens barrel 220-5 may be aligned with each other by coupling the protrusion 118 and the groove 228 to each other. For example, the rotation center (or optical axis C) of the first lens 110-2 and the rotation center of the second lens barrel 220-5 may be aligned with each other by arranging the protrusion 118 and the groove 228 to be in line contact or surface contact with each other. Therefore, the first lens 110-2 and the second lens barrel 220-5 may solve a problem in which the resolution of a camera module is degraded because the first lens 110 is not aligned with the optical axis. In addition, the first lens 110-2 and the second lens barrel 220-5 may have improved reliability of bonding the first lens 110-2 and the second lens barrel 220-5 to each other by fastening the protrusion 118 and the groove 228 to each other.

For reference, although not described or shown in the present specification or the drawings, the second lens barrels 220-4 and 220-5 shown in FIGS. 5A through 6B may be modified to include one or more of the features shown in FIGS. 2 through 4. As an example, the second lens barrel 220-4 shown in FIGS. 5A and 5B may further include the feature of the second lens barrel 220-1 shown in FIG. 2. As another example, the second lens barrel 220-5 shown in FIGS. 6A and 6B may further include the feature of the second lens barrel 220-2 shown in FIG. 3. As yet another example, the second lens barrel 220-4 shown in FIGS. 5A and 5B may further include the feature of the second lens barrel 220-2 shown in FIG. 3 or the feature of the second lens barrel 220-3 shown in 4.

Figure 7:
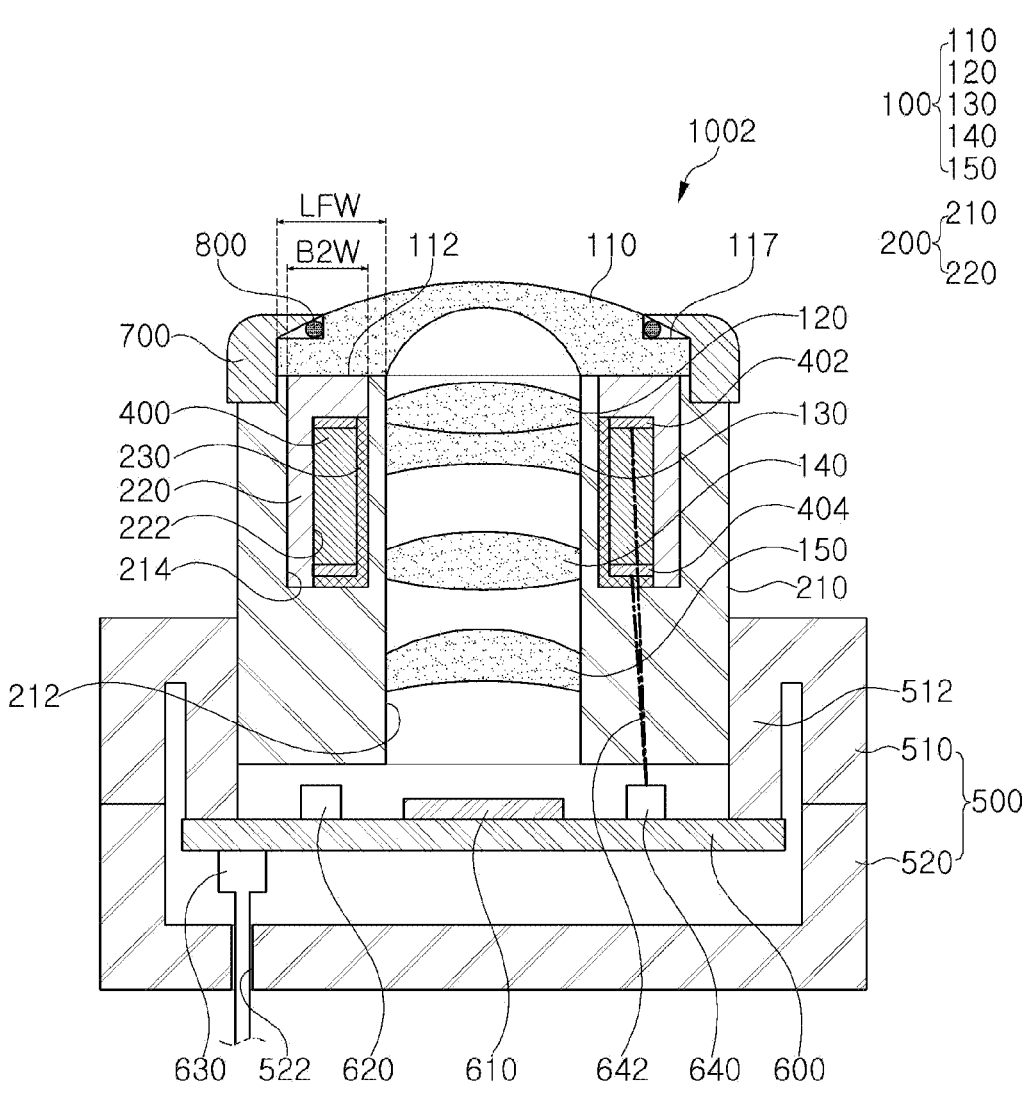

FIG. 7 shows another camera module, according to an embodiment.

Referring to FIG. 7, a camera module 1002 may include the optical system 100, the lens barrel 200, the energy generation unit 400, and a buffer member 230.

The optical system 100 may form an image at the predetermined position by using the light reflected from a subject. For example, the optical system 100 may have the refractive power to form the image at the predetermined position by using the light incident thereon. The optical system 100 may include the plurality of lenses. For example, the optical system 100 may include the five or more lenses including the first lens 110, the second lens 120, the third lens 130, the fourth lens 140, and the fifth lens 150. However, the number of lenses included in the optical system 100 is not limited to five. For example, the optical system 100 may include four or fewer lenses or include six or more lenses.

The forwardmost lens (i.e., the first lens 110) of the optical system 100, which is disposed closest to the object side, may have a diameter larger than that of the other lenses. For example, the first lens 110 may be sized to be in contact with the end of the lens barrel 200. Therefore, the first lens 110 may be aligned with the optical axis by the careful adjustment or another process in the state in which the first lens 110 is disposed at the end of the lens barrel 200. The first lens 110 may be formed for the camera module 1002 to capture the image with a wide angle. As an example, the object-side surface of the first lens 110 may generally have a convex shape. As another example, the first lens 110 may generally have a negative refractive power.

The optical system 100 may further include another component in addition to the first to fifth lenses 110, 120, 130, 140, and 150. For example, the optical system 100 may further include the filter member configured to block the infrared light. However, the additional component of the optical system 100 is not limited to the filter member. For example, the optical system 100 may further include the stop disposed between the lens and the lens to control the amount of light, and the spacer maintaining a constant distance between the lens and the lens, etc.

The optical system 100 may have a predetermined angle of view. For example, the optical system 100 may have an angle of view of 120 degrees or more to simultaneously capture an image over a wide area. However, the angle of view of the optical system 100 is not limited to 120 degrees or more. For example, the optical system 100 may have an angle of view of less than 120 degrees.

The lens barrel 200 may accommodate the optical system 100. For example, the lens barrel 200 may include the accommodation space accommodating the optical system 100. The lens barrel 200 may accommodate one or more of the first to fifth lenses 110, 120, 130, 140, and 150 included in the optical system 100. For example, the lens barrel 200 may accommodate the second to fifth lenses 120 to 150.

The lens barrel 200 may generally have a cylindrical shape. However, the lens barrel 200 is not limited to the cylindrical shape. For example, the lens barrel 200 may have the shape of a quadrangular prism, a rectangular prism, or the like, based on a cross-sectional shape of the lenses.

There may be a plurality of lens barrels 200. For example, the lens barrel 200 may include the first lens barrel 210 and the second lens barrel 220. The first lens barrel 210 and the second lens barrel 220 may be made of materials different from each other. As an example, the first lens barrel 210 may be made of a material having low thermal conductivity or the material having low electrical conductivity, and the second lens barrel 220 may be made of the material having high thermal conductivity or the material having high electrical conductivity. As another example, the first lens barrel 210 may be made of the plastic material, and the second lens barrel 220 may be made of the metal material.

The first lens barrel 210 may accommodate the optical system 100 and the second lens barrel 220. For example, the first lens barrel 210 may include the first accommodation portion 212 accommodating the optical system 100 and the second accommodation portion 214 accommodating the second lens barrel 220. The first accommodation portion 212 and the second accommodation portion 214 may be formed as the spaces independent of each other. For example, the first accommodation portion 212 may be formed in the center of the first lens barrel 210, and the second accommodation portion 214 may be formed at the predetermined distance outward from the first accommodation portion 212. The first accommodation portion 212 and the second accommodation portion 214 may each be formed to be elongated in the longitudinal direction of the first lens barrel 210. The first accommodation portion 212 and the second accommodation portion 214 may be formed to have the sizes or lengths different from each other. For example, the first accommodation portion 212 may be formed to completely penetrate through the first lens barrel 210, and the second accommodation portion 214 may be formed to have the predetermined length from one end of the first lens barrel 210.

The second lens barrel 220 may be disposed in the second accommodation portion 214 of the first lens barrel 210. The second lens barrel 220 may be in contact with the first lens 110, which is the forwardmost lens. For example, one end 221 of the second lens barrel 220 may be in contact with the flange portion 112 of the first lens 110.

The second lens barrel 220 may have the predetermined space in the state of being mounted in the first lens barrel 210. For example, the concave portion 222 may be formed inside the second lens barrel 220, and the space of a significant size may be formed between the first lens barrel 210 and the second lens barrel 220. The concave portion 222 may be elongated upwardly from the distal end of the second lens barrel 220.

The second lens barrel 220 may function as the energy transfer member. In more detail, the second lens barrel 220 may transfer the energy generated by the energy generation unit 400 to the adjacent member. As an example, the second lens barrel 220 may be made of the material having high thermal conductivity to easily transfer the thermal energy of the energy generation unit 400. As an example, the second lens barrel 220 may be made of the material having a high vibration frequency to easily transfer the vibration energy of the energy generation unit 400. The second lens barrel 220 according to this embodiment may be made of the metal material described above. However, the material of the second lens barrel 220 is not limited to the metal. For example, the second lens barrel 220 may be made of the material having a high specific heat to maintain the absorbed thermal energy for a long time.

The energy generation unit 400 may generate a predetermined amount of energy. For example, the energy generation unit 400 may be the heat generation device configured to generate the thermal energy. As an example, the energy generation unit 400 may be the positive temperature coefficient (PTC) heater. However, the energy generation unit 400 is not limited to the heat generation device. For example, the energy generation unit 400 may be the excitation device or the piezoelectric body configured to generate the vibration energy.

The energy generation unit 400 may be disposed between the first lens barrel 210 and the second lens barrel 220. For example, the energy generation unit 400 may be disposed in the concave portion 222 of the second lens barrel 220. The energy generation unit 400 may be in close contact with the second lens barrel 220. For example, the energy generation unit 400 may have the shape substantially the same as that of the circular space formed by the concave portion 222 and the second accommodation portion 214. However, the energy generation unit 400 is not limited to the shape of the space formed by the concave portion 222 and the second accommodation portion 214.

The energy generation unit 400 may transfer the energy to the second lens barrel 220. For example, the energy generation unit 400 may be in contact with the concave portion 222 of the second lens barrel 220 to transfer the thermal energy, the vibration energy, and the like, generated by the energy generation unit 400, to the second lens barrel 220. The energy generated by the energy generation unit 400 may be transferred more effectively to the second lens barrel 220 than to the first lens barrel 210. For example, the second lens barrel 220 may be made of the material that may receive the thermal energy, the vibration energy, and the like more easily than that of the first lens barrel 210, and most of the energy generated from the energy generation unit 400 may thus be transferred to the second lens barrel 220 or absorbed into the second lens barrel 220.

The buffer member 230 may be disposed between the first lens barrel 210 and the second lens barrel 220. For example, the buffer member 230 may be disposed in the concave portion 222 of the second lens barrel 220. The buffer member 230 may be made of the material that may be elastically deformed or compressively deformed. In addition, the buffer member 230 may be made of a material having strong restoring force. For example, the buffer member 230 may be made of rubber, synthetic rubber, elastomer or the like.

The buffer member 230 may allow the second lens barrel 220 and the energy generation unit 400 to be in close contact with each other. As an example, the buffer member 230 may be disposed between the first lens barrel 210 and the energy generation unit 400 to provide elastic force pressing the energy generation unit 400 toward the concave portion 222. As another example, the buffer member 230 may be disposed between the first lens barrel 210 and the second lens barrel 220 to provide elastic force pressing the second lens barrel 220 toward the flange portion 112 of the first lens 110.

Figure 8C:
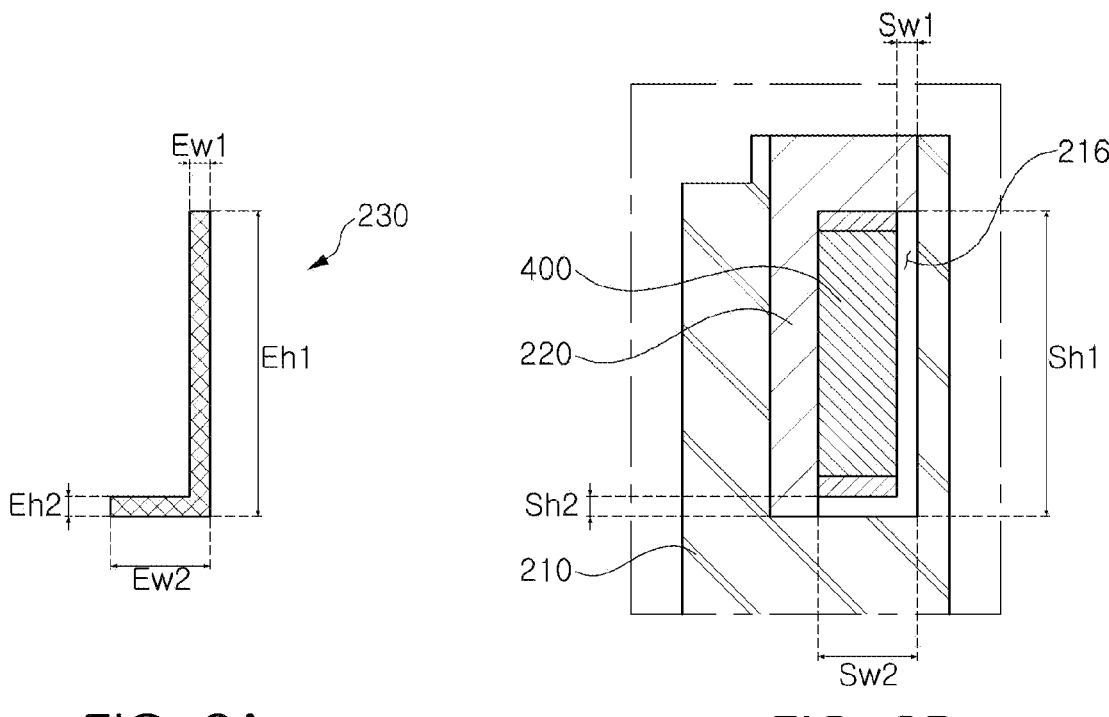
Figure 8C:
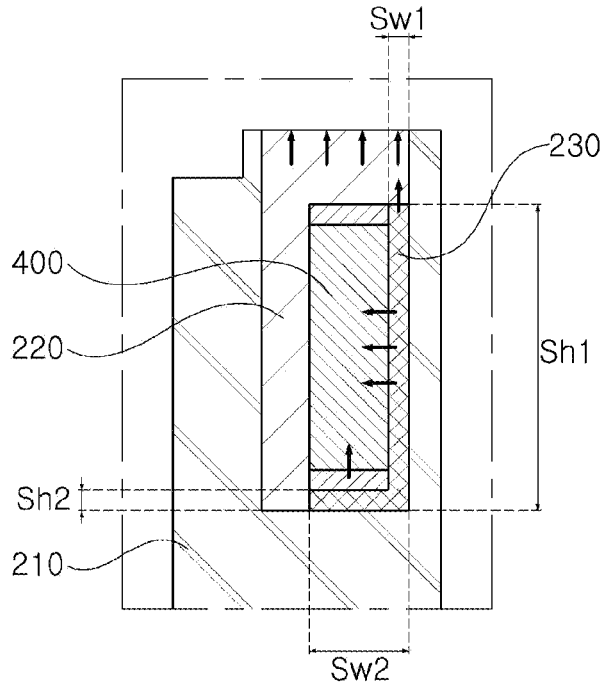

A volume of the buffer member 230 may be larger than a volume of a space formed between the lens barrels 210 and 220 and the energy generation unit 400 to achieve the above-described effect. For example, as shown in FIGS. 8A through 8C, the widths Ew1 and Ew2 and heights Eh1 and Eh2 of the buffer member 230 may be greater than the widths Sw1 and Sw2 and heights Sh1 and Sh2 of an arrangement space 216 formed between the lens barrels 210 and 220 and the energy generation unit 400. For example, the widths Ew1 and Ew2 of the buffer member 230 may be greater than the widths Sw1 and Sw2 of the arrangement space 216, and the heights Eh1 and Eh2 of the buffer member 230 may be greater than the heights Sh1 and Sh2 of the arrangement space 216. Accordingly, the buffer member 230, when inserted into the arrangement space 216, may be compressed or elastically deformed by a deviation between the volume of the buffer member 230 and that of the arrangement space 216. In addition, the restoring force accumulated by compressing or elastically deforming the buffer member 230 may act as force applied to the energy generation unit 400 to be in close contact with the second lens barrel 220 or the second lens barrel 220 to be in close contact with the first lens 110, as shown in FIG. 8C. Therefore, the camera module 1002 may transfer most of the energy generated by the energy generation unit 400 to the first lens 110 without loss due to a space between the energy generation unit 400 and the second lens barrel 220 or a space between the second lens barrel 220 and the first lens 110.

The camera module 1002 may further include a component other than the components described above. For example, the camera module 1001 may further include the housing 500, the substrate 600, the cover member 700, etc.

The housing 500 may accommodate or support the lens barrel 200 and the substrate 600. For example, the housing 500 may accommodate the substrate 600 while supporting the lens barrel 200 and the substrate 600. The housing 500 may include the upper housing 510 and the lower housing 520. The upper housing 510 may support the lens barrel 200 and the substrate 600, and the lower housing 520 may seal the open space of the upper housing 510. The upper housing 510 may include the support portion 512. The support portion 512 may be elongated downward from the top end of the upper housing 510. The support portion 512 may be coupled to the lens barrel 200 and the substrate 600. For example, the inner surface of the support portion 512 may be coupled to the lens barrel 200, and the distal end of the support portion 512 may be coupled to the substrate 600. The support portion 512 and the lens barrel 200 may be fastened to each other by the press-fit, and the support portion 512 and the substrate 600 may be coupled to each other by using the fastening element such as a bolt.

The substrate 600 may include an electronic component required to drive the camera module 1002. For example, the substrate 600 may be equipped with the image sensor 610, the passive element 620, and the like. The electronic components mounted on or embedded in the substrate 600 may be electrically connected to each other. For example, the electric circuit electrically connecting the electronic components to each other may be formed on the one surface of or in the substrate 600. The substrate 600 may provide power and a control signal, necessary to drive the camera module 1002. For example, the connection terminal 630 connected to the external power source and the external device may be formed on the rear surface of the substrate 600. The substrate 600 may be connected to the energy generation unit 400. For example, the power supply terminal 640, which is connected to the power terminals 402 and 404 of the energy generation unit 400, may be formed on the one surface of the substrate 600. The energy generation unit 400 and the power supply terminal 640 may be electrically connected to each other by the power line 642, the flexible substrate, or the like.

The cover member 700 may secure the forwardmost lens to the lens barrel 200. For example, the cover member 700 may be coupled to the lens barrel 200 while pressing the edge of the first lens 110. The cover member 700 may be adhered or coupled to the lens barrel 200. As an example, the cover member 700 may be adhered to the lens barrel 200 by the adhesive member. As another example, the cover member 700 may be fastened to the lens barrel 200 by a screw coupling. The example in which the cover member 700 is adhered to the lens barrel 200 by the adhesive member may improve the airtightness between the cover member 700 and the lens barrel 200, and the example in which the cover member 700 is fastened to the lens barrel 200 by the screw coupling may increase the adhesion between the first lens 110 and the lens barrel 200 by the cover member 700.

The cover member 700 may be generally made of the material that is the same as or similar to that of the first lens barrel 210. For example, the cover member 700 may be made of the plastic material. The cover member 700, when made of the material that is the same as or similar to that of the first lens barrel 210, may be excellently coupled, adhered, or fastened to the first lens barrel 210, and may thus significantly reduce the possibility that the forwardmost lens (i.e., first lens 110) becomes separated from the lens barrel 200. However, the cover member 700 is not limited to the plastic material. For example, the cover member 700 may be made of the metal material to protect the first lens 110 from the external impact.

The airtight member 800 may be disposed between the first lens 110 and the cover member 700. For example, the airtight member 800 may be disposed between the step portion 117, formed on the edge of the first lens 110, and the cover member 700. The airtight member 800 may be made of the material that may be elastically deformed or compressively deformed. For example, the airtight member 800 may be made of rubber, synthetic rubber, elastomer or the like. However, the airtight member 800 is not limited to the above-mentioned material. The airtight member 800 may block the gap between the first lens 110 and the cover member 700. For example, the airtight member 800 may be elastically deformed when the cover member 700 and the lens barrel 200 are coupled to each other to block the gap between the first lens 110 and the cover member 700.

The camera module 1002 may remove the foreign matter adhering to the forwardmost lens (i.e., first lens 110). For example, the camera module 1002 may remove raindrop on the first lens 110 in rain, frost, or dew occurring on the surface of the first lens 110 due to a difference between day and night temperatures, dust adhering to the surface of the first lens 110, etc.

In addition, the camera module 1002 may strengthen the adhesion between the second lens barrel 220 and the energy generation unit 400 and the second lens barrel 220 and the first lens 110 by including the buffer member 230. Therefore, the camera module 1002 may rapidly transfer the energy of the energy generation unit 400 to the second lens barrel 220 and the first lens 110.

For reference, although not described or shown in the present specification or the drawings, the first lens 110, the second lens barrel 220 and the energy generation unit 400 may be deformed into the shapes shown in FIGS. 2 through 6B. As an example, the second lens barrel 220 and the energy generation unit 400, shown in FIG. 7, may be deformed into the shapes shown in FIGS. 2 through 4. As another example, the first lens 110 and the second lens barrel 220, shown in FIG. 7, may be deformed into the shapes shown in FIGS. 5A through 6B. As yet another example, the second lens barrel 220 shown in FIG. 7 may be coupled to the first lens 110 having the shape shown in FIGS. 5A through 6B while being coupled to the energy generation unit 400 having the shape shown in FIGS. 2 through 4.

Figure 9:
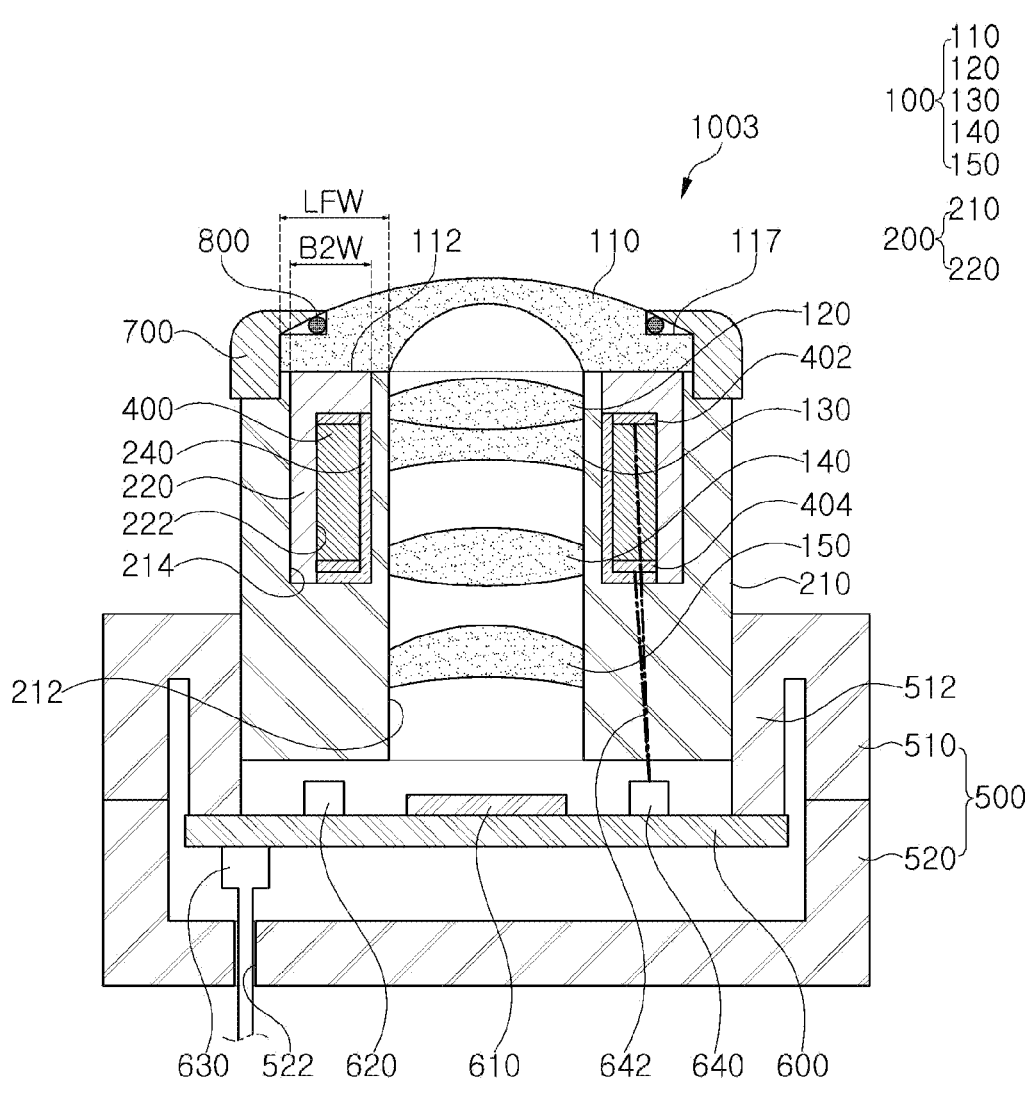
FIG. 9 is a cross-sectional view of a camera module, according to another embodiment.

FIG. 9 illustrates a camera module, according to another embodiment.

Referring to FIG. 9, a camera module 1003 may include the optical system 100, the lens barrel 200, the energy generation unit 400, and an insulation member 240.

The optical system 100 may form an image at the predetermined position by using the light reflected from a subject. For example, the optical system 100 may have the refractive power to form the image at the predetermined position by using the light incident thereon. The optical system 100 may include the plurality of lenses. For example, the optical system 100 may include five or more lenses including the first to fifth lenses 110, 120, 130, 140, and 150. However, the number of lenses included in the optical system 100 is not limited to five. For example, the optical system 100 may include four or fewer lenses or include six or more lenses.

The forwardmost lens (i.e., first lens 110) of the optical system 100, disposed closest to the object side, may have a larger diameter than the other lenses. For example, the first lens 110 may be sized to be in contact with the end of the lens barrel 200. Therefore, the first lens 110 may be aligned with the optical axis by the careful adjustment or another process in the state in which the first lens 110 is disposed at the end of the lens barrel 200. The first lens 110 may be formed for the camera module 1003 to capture the image with a wide angle. As an example, the object-side surface of the first lens 110 may generally have a convex shape. As another example, the first lens 110 may generally have a negative refractive power.

The optical system 100 may further include another component in addition to the first to fifth lenses 110, 120, 130, 140, and 150. For example, the optical system 100 may further include the filter member configured to block the infrared light. However, the additional component of the optical system 100 is not limited to the filter member. For example, the optical system 100 may further include the stop disposed between the lens and the lens to control the amount of light, the spacer maintaining a constant distance between the lens and the lens, etc.

The optical system 100 may have a predetermined angle of view. For example, the optical system 100 may have an angle of view of 120 degrees or more to simultaneously capture the image over a wide area. However, the angle of view of the optical system 100 is not limited to 120 degrees or more. For example, the optical system 100 may have an angle of view of less than 120 degrees.

The lens barrel 200 may accommodate the optical system 100. For example, the lens barrel 200 may include the accommodation space accommodating the optical system 100. The lens barrel 200 may accommodate one or more of the first to fifth lenses 110 to 150 included in the optical system 100. For example, the lens barrel 200 may accommodate the second to fifth lenses 120 to 150.

The lens barrel 200 may generally have a cylindrical shape. However, the lens barrel 200 is not limited to the cylindrical shape. For example, the lens barrel 200 may have the shape of a quadrangular prism, a rectangular prism, or the like, based on a cross-sectional shape of the lenses.

There may be the plurality of lens barrels 200. For example, the lens barrel 200 may include the first lens barrel 210 and the second lens barrel 220. The first lens barrel 210 and the second lens barrel 220 may be made of materials different from each other. As an example, the first lens barrel 210 may be made of the material having low thermal conductivity or the material having low electrical conductivity, and the second lens barrel 220 may be made of the material having high thermal conductivity or the material having high electrical conductivity. As another example, the first lens barrel 210 may be made of the plastic material, and the second lens barrel 220 may be made of the metal material.

The first lens barrel 210 may accommodate the optical system 100 and the second lens barrel 220. For example, the first lens barrel 210 may include the first accommodation portion 212 accommodating the optical system 100 and the second accommodation portion 214 accommodating the second lens barrel 220. The first accommodation portion 212 and the second accommodation portion 214 may be formed as the spaces independent of each other. For example, the first accommodation portion 212 may be formed in the center of the first lens barrel 210, and the second accommodation portion 214 may be formed at the predetermined distance outward from the first accommodation portion 212. The first accommodation portion 212 and the second accommodation portion 214 may each be formed to be elongated in the longitudinal direction of the first lens barrel 210. The first accommodation portion 212 and the second accommodation portion 214 may be formed to have the sizes or lengths different from each other. For example, the first accommodation portion 212 may be formed to completely penetrate through the first lens barrel 210, and the second accommodation portion 214 may be formed to have the predetermined length from one end of the first lens barrel 210.

The second lens barrel 220 may be disposed in the second accommodation portion 214 of the first lens barrel 210. The second lens barrel 220 may be in contact with the first lens 110, which is the forwardmost lens. For example, the one end 221 of the second lens barrel 220 may be in contact with the flange portion 112 of the first lens 110.

The second lens barrel 220 may have the predetermined space in the state of being mounted in the first lens barrel 210. For example, the concave portion 222 may be formed inside the second lens barrel 220, and the space of a significant size may be formed between the first lens barrel 210 and the second lens barrel 220. The concave portion 222 may be elongated upwardly from the distal end of the second lens barrel 220.

The second lens barrel 220 may function as the energy transfer member. In more detail, the second lens barrel 220 may transfer the energy generated by the energy generation unit 400 to the adjacent member. As an example, the second lens barrel 220 may be made of the material having high thermal conductivity to easily transfer the thermal energy of the energy generation unit 400. As an example, the second lens barrel 220 may be made of the material having a high vibration frequency to easily transfer the vibration energy of the energy generation unit 400. The second lens barrel 220 may be made of the metal material described above. However, the material of the second lens barrel 220 is not limited to the metal. For example, the second lens barrel 220 may be made of the material having a high specific heat to maintain the absorbed thermal energy for a long time.

The energy generation unit 400 may generate a predetermined amount of energy. For example, the energy generation unit 400 may be the heat generation device configured to generate the thermal energy. For example, the energy generation unit 400 may be the positive temperature coefficient (PTC) heater. However, the energy generation unit 400 is not limited to the heat generation device. For example, the energy generation unit 400 may be the excitation device or piezoelectric body configured to generate the vibration energy.

The energy generation unit 400 may be disposed between the first lens barrel 210 and the second lens barrel 220. For example, the energy generation unit 400 may be disposed in the concave portion 222 of the second lens barrel 220. The energy generation unit 400 may be in close contact with the second lens barrel 220. For example, the energy generation unit 400 may have a shape substantially the same as that of the circular space formed by the concave portion 222 and the second accommodation portion 214. However, the energy generation unit 400 is not limited to the shape of the space formed by the concave portion 222 and the second accommodation portion 214.

The energy generation unit 400 may transfer energy to the second lens barrel 220. For example, the energy generation unit 400 may be in contact with the concave portion 222 of the second lens barrel 220 to transfer the thermal energy, the vibration energy, and the like, generated by the energy generation unit 400, to the second lens barrel 220. The energy generated by the energy generation unit 400 may be transferred more effectively to the second lens barrel 220 than to the first lens barrel 210. For example, the second lens barrel 220 may be made of the material which may receive the thermal energy, the vibration energy, and the like more easily than that of the first lens barrel 210, and most of the energy generated by the energy generation unit 400 may thus be transferred to the second lens barrel 220 or absorbed into the second lens barrel 220.

The insulation member 240 may be disposed between the first lens barrel 210 and the second lens barrel 220. For example, the insulation member 240 may be disposed in the concave portion 222 of the second lens barrel 220. The insulation member 240 may be made of a material having low thermal conductivity. For example, the insulation member 240 may be made of glass, ceramic, expanded polystyrene, expanded polyurethane, polyethylene, or the like, or may be made of a synthetic material including one or more of the materials described above.

The insulation member 240 may improve heating efficiency of the second lens barrel 220. For example, the insulation member 240 may block the thermal energy of the energy generation unit 400 from being transferred toward the first lens barrel 210, thereby allowing most of the thermal energy generated by the energy generation unit 400 to be transferred to the second lens barrel 220.

Therefore, the camera module 1003 may improve the heating efficiency of the second lens barrel 220 by including the insulation member 240 and a heating rate of the first lens 110 by including the second lens barrel 220.

The camera module 1003 may further include a component other than the components described above. For example, the camera module 1001 may further include the housing 500, the substrate 600, the cover member 700, etc.

The housing 500 may accommodate or support the lens barrel 200 and the substrate 600. For example, the housing 500 may accommodate the substrate 600 while supporting the lens barrel 200 and the substrate 600. The housing 500 may include the upper housing 510 and the lower housing 520. The upper housing 510 may support the lens barrel 200 and the substrate 600, and the lower housing 520 may seal the open space of the upper housing 510. The upper housing 510 may include the support portion 512. The support portion 512 may be elongated downward from the top end of the upper housing 510. The support portion 512 may be coupled to the lens barrel 200 and the substrate 600. For example, the inner surface of the support portion 512 may be coupled to the lens barrel 200, and the distal end of the support portion 512 may be coupled to the substrate 600. The support portion 512 and the lens barrel 200 may be fastened to each other by the press-fit, and the support portion 512 and the substrate 600 may be coupled to each other by using the fastening element such as a bolt.

The substrate 600 may include an electronic component required to drive the camera module 1003. For example, the substrate 600 may be equipped with the image sensor 610, the passive element 620, and the like. The electronic components mounted on or embedded in the substrate 600 may be electrically connected to each other. For example, the electric circuit electrically connecting the electronic components to each other may be formed on the one surface of or in the substrate 600. The substrate 600 may provide power and a control signal that are necessary to drive the camera module 1003. For example, the connection terminal 630 connected to the external power source and the external device may be formed on the rear surface of the substrate 600. The substrate 600 may be connected to the energy generation unit 400. For example, the power supply terminal 640 connected to the power terminals 402 and 404 of the energy generation unit 400 may be formed on the one surface of the substrate 600. The energy generation unit 400 and the power supply terminal 640 may be electrically connected to each other by the power line 642, the flexible substrate or the like.

The cover member 700 may secure the forwardmost lens to the lens barrel 200. For example, the cover member 700 may be coupled to the lens barrel 200 while pressing the edge of the first lens 110. The cover member 700 may be adhered or coupled to the lens barrel 200. As an example, the cover member 700 may be adhered to the lens barrel 200 by the adhesive member. As another example, the cover member 700 may be fastened to the lens barrel 200 by a screw coupling. The former adhering or coupling of the cover member 700 to the lens barrel 200 may improve the airtightness between the cover member 700 and the lens barrel 200, and the fastening of the cover member 700 to the lens barrel by the screw coupling may increase the adhesion between the first lens 110 and the lens barrel 200 by the cover member 700.

The cover member 700 may be generally made of the material that is the same as or similar to that of the first lens barrel 210. For example, the cover member 700 may be made of the plastic material. The cover member 700, being made of the material which is the same as or similar to that of the first lens barrel 210, may be excellently coupled, adhered, or fastened to the first lens barrel 210, and may thus significantly reduce the possibility that the forwardmost lens (i.e., first lens 110) becomes separated from the lens barrel 200. However, the cover member 700 is not limited to the plastic material. For example, the cover member 700 may be made of the metal material to protect the first lens 110 from an external impact.

The airtight member 800 may be disposed between the first lens 110 and the cover member 700. For example, the airtight member 800 may be disposed between the step portion 117, which is formed on the edge of the first lens 110, and the cover member 700. The airtight member 800 may be made of the material which may be elastically deformed or compressively deformed. For example, the airtight member 800 may be made of rubber, synthetic rubber, elastomer or the like. However, the airtight member 800 is not limited to the above-mentioned material. The airtight member 800 may block the gap between the first lens 110 and the cover member 700. For example, the airtight member 800 may be elastically deformed when the cover member 700 and the lens barrel 200 are coupled to each other to block the gap between the first lens 110 and the cover member 700.

The camera module 1003 may remove the foreign matter adhering to the forwardmost lens (i.e., first lens 110). For example, the camera module 1003 may remove a raindrop on the first lens 110 in rain, frost or dew occurring on the surface of the first lens 110 due to the difference between day and night temperatures, dust adhering to the surface of the first lens 110, etc. In addition, the camera module 1003 may improve the heating efficiency of the second lens barrel 220 and first lens 110 by using the insulation member 240.

For example, the first lens 110, the second lens barrel 220, and the energy generation unit 400 according to the embodiment of FIG. 9 may be formed in the shapes shown in FIGS. 2 through 6B. As an example, the second lens barrel 220 and the energy generation unit 400 shown in FIG. 9 may be formed in the shapes shown in FIGS. 2 through 4. As another example, the first lens 110 and the second lens barrel 220, shown in FIG. 9, may be deformed into the shapes shown in FIGS. 5A through 6B. As yet another example, the second lens barrel 220 shown in FIG. 9 may be coupled to the first lens 110 having a shape shown in FIGS. 5A through 6B while being coupled to the energy generation unit 400 having a shape shown in FIGS. 2 through 4.

Figure 10:
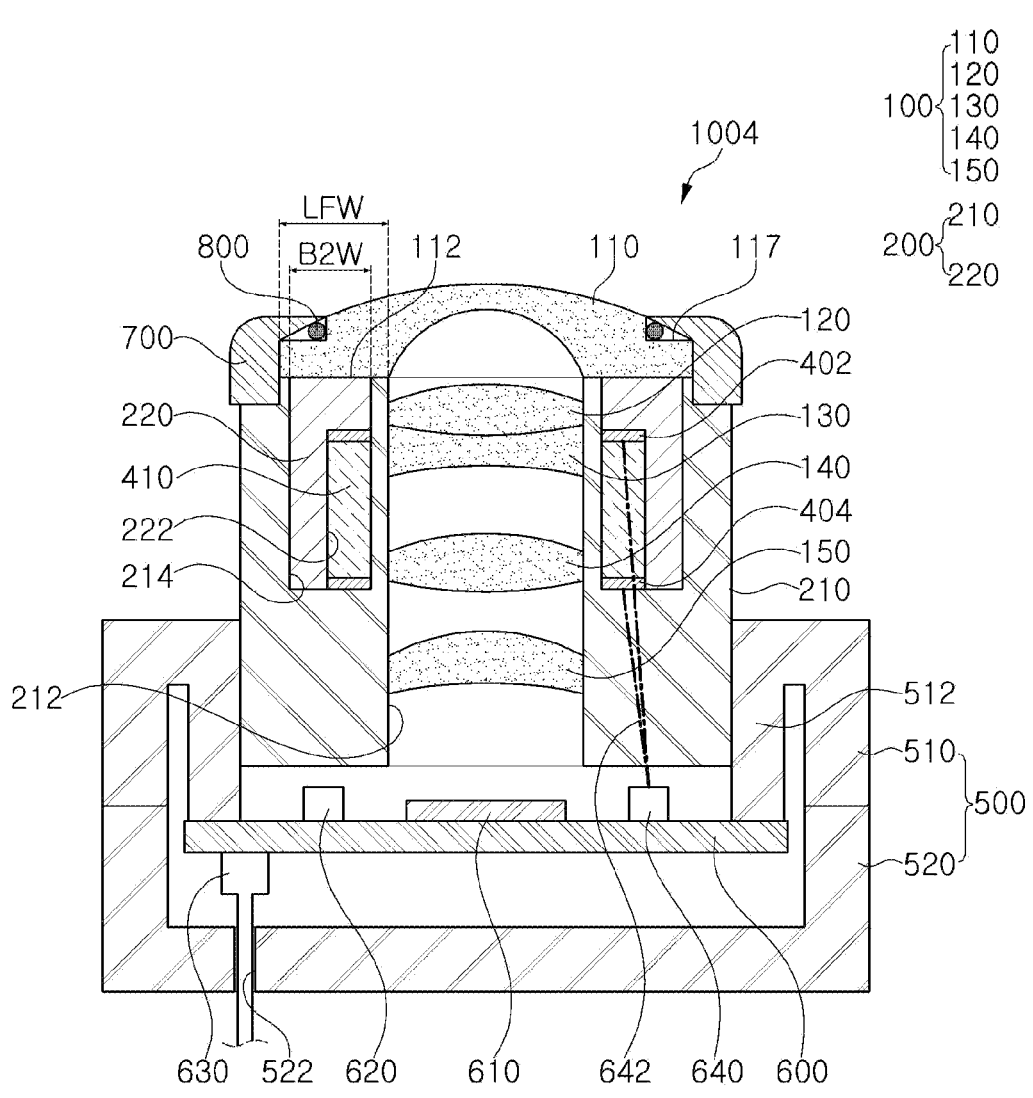
FIG. 10 is a cross-sectional view of a camera module, according to another embodiment.

FIG. 10 illustrates a camera module, according to another embodiment.

Referring to FIG. 10, a camera module 1004 may include the optical system 100, the lens barrel 200, and a heat generation device 410.

The optical system 100 may form the image at a predetermined position by using the light reflected from a subject. For example, the optical system 100 may have the refractive power to form the image at a predetermined position by using the light incident thereon. The optical system 100 may include the plurality of lenses. For example, the optical system 100 may include the five or more lenses including the first to fifth lenses 110, 120, 130, 140 and 150. However, the number of lenses included in the optical system 100 is not limited to five. For example, the optical system 100 may include four or fewer lenses or include six or more lenses.

The forwardmost lens (i.e., first lens 110) of the optical system 100, disposed closest to the object side, may have a diameter larger than that of the other lenses. For example, the first lens 110 may be sized to be in contact with the end of the lens barrel 200-1. Therefore, the first lens 110 may be aligned with the optical axis by the careful adjustment or another process in the state where the first lens 110 is disposed at the end of the lens barrel 200-1. The first lens 110 may be formed for the camera module 1004 to capture the image with a wide angle. As an example, the object-side surface of the first lens 110 may generally have a convex shape. As another example, the first lens 110 may generally have a negative refractive power.

The optical system 100 may further include another component in addition to the first to fifth lenses 110 to 150. For example, the optical system 100 may further include the filter member configured to block infrared light. However, the additional component of the optical system 100 is not limited to the filter member. For example, the optical system 100 may further include a stop disposed between the lens and the lens to control the amount of light, the spacer maintaining a constant distance between the lens and the lens, etc.

The optical system 100 may have a predetermined angle of view. For example, the optical system 100 may have an angle of view of 120 degrees or more to simultaneously capture the image over a wide area. However, the angle of view of the optical system 100 is not limited to 120 degrees or more. For example, the optical system 100 may have an angle of view of less than 120 degrees.

The lens barrel 200 may accommodate the optical system 100. For example, the lens barrel 200 may include the accommodation space accommodating the optical system 100. The lens barrel 200 may accommodate one or more of the first lens 110 to the fifth lens 150 included in the optical system 100. For example, the lens barrel 200 may accommodate the second to fifth lenses 120 to 150.

The lens barrel 200 may generally have the cylindrical shape. However, the lens barrel 200 is not limited to the cylindrical shape. For example, the lens barrel 200 may have the shape of a quadrangular prism, a rectangular prism, or the like based on a cross-sectional shape of the lenses.

There may be the plurality of lens barrels 200. For example, the lens barrel 200 may include the first lens barrel 210 and the second lens barrel 220. The first lens barrel 210 and the second lens barrel 220 may be made of materials that are different from each other. As an example, the first lens barrel 210 may be made of the material having low thermal conductivity or the material having low electrical conductivity, and the second lens barrel 220 may be made of the material having high thermal conductivity or the material having high electrical conductivity. As another example, the first lens barrel 210 may be made of the plastic material, and the second lens barrel 220 may be made of the metal material.

The first lens barrel 210 may accommodate the optical system 100 and the second lens barrel 220. For example, the first lens barrel 210 may include the first accommodation portion 212 accommodating the optical system 100 and the second accommodation portion 214 accommodating the second lens barrel 220. The first accommodation portion 212 and the second accommodation portion 214 may be formed as the spaces independent of each other. For example, the first accommodation portion 212 may be formed in the center of the first lens barrel 210, and the second accommodation portion 214 may be formed at the predetermined distance outward from the first accommodation portion 212. The first accommodation portion 212 and the second accommodation portion 214 may each be formed to be elongated in the longitudinal direction of the first lens barrel 210. The first accommodation portion 212 and the second accommodation portion 214 may be formed to have the sizes or lengths different from each other. For example, the first accommodation portion 212 may be formed to completely penetrate through the first lens barrel 210, and the second accommodation portion 214 may be formed to have the predetermined length from one end of the first lens barrel 210.

The second lens barrel 220 may be disposed in the second accommodation portion 214 of the first lens barrel 210. The second lens barrel 220 may be in contact with the first lens 110 which is the forwardmost lens. For example, the one end 221 of the second lens barrel 220 may be in contact with the flange portion 112 of the first lens 110.

The second lens barrel 220 may have the predetermined space in the state of being mounted in the first lens barrel 210. For example, the concave portion 222 may be formed inside the second lens barrel 220, and the space of a significant size may be formed between the first lens barrel 210 and the second lens barrel 220. The concave portion 222 may be elongated upwardly from the distal end of the second lens barrel 220.

The second lens barrel 220 may function as the energy transfer member. In more detail, the second lens barrel 220 may transfer the energy generated by the heat generation device 410 to the adjacent member. As an example, the second lens barrel 220 may be made of the material having high thermal conductivity to easily transfer thermal energy of the heat generation device 410. The second lens barrel 220 may be made of the metal material described above. However, the material of the second lens barrel 220 is not limited to the metal. For example, the second lens barrel 220 may be made of the material having a high specific heat to maintain the absorbed thermal energy for a long time.

The heat generation device 410 may generate the thermal energy. For example, the heat generation device 410 may be the positive temperature coefficient (PTC) heater. The heat generation device 410 may make the camera module 1004 thin. For example, the heat generation device 410 may be the PTC heater in a film shape to minimize the space formed between the first lens barrel 210 and the second lens barrel 220.

The heat generation device 410 may be disposed between the first lens barrel 210 and the second lens barrel 220. For example, the heat generation device 410 may be disposed in the concave portion 222 of the second lens barrel 220. The heat generation device 410 may be in close contact with the second lens barrel 220. For example, the heat generation device 410 may have a shape substantially the same as that of the circular space formed by the concave portion 222 and the second accommodation portion 214.

Most of the thermal energy generated by the heat generation device 410 may be transferred to the second lens barrel 220. For example, the second lens barrel 220 may be made of the material having a thermal conductivity higher than that of the first lens barrel 210, and most of the thermal energy generated from the heat generation device 410 may be transferred to the second lens barrel 220.

Figure 11:
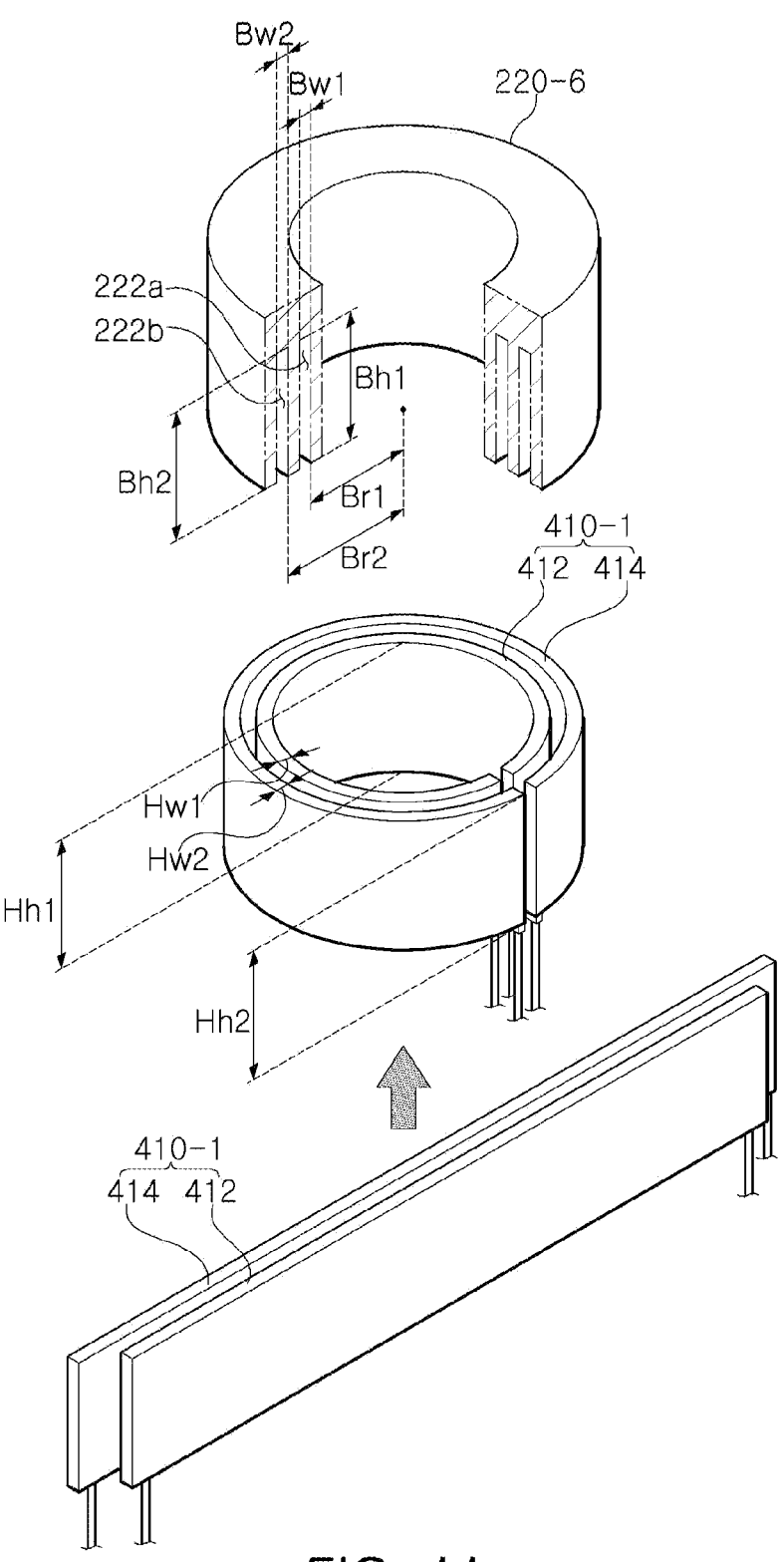
FIGS. 11 and 12 are an exploded perspective view and a combined cross-sectional view of a modified example of the second lens barrel and heat generation device shown in FIG. 10.
Figure 12:
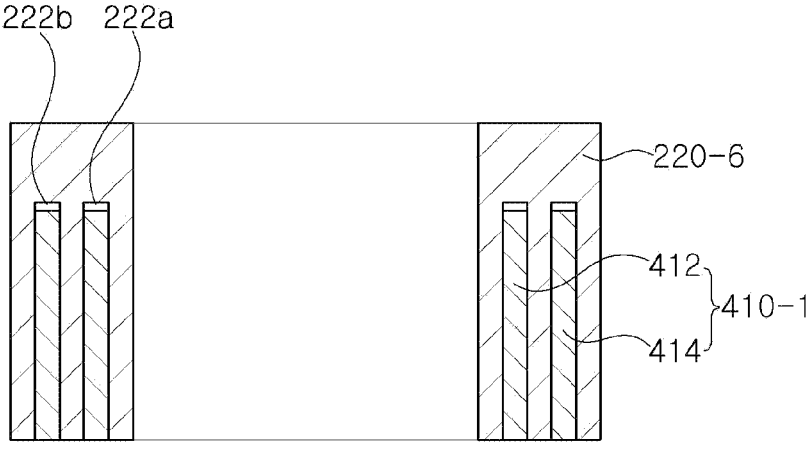

Referring to FIGS. 11 and 12, a second lens barrel 220-6 and a heat generation device 410-1 may be configured to rapidly heat the second lens barrel 220-6 by using the heat generation device 410-1. A deformed shape of the second lens barrel 220-6 and the heat generation device 410-1 is described below.

Referring to FIGS. 11 and 12, a plurality of concave portions 222a and 222b may be formed in a second lens barrel 220-6. For example, the two concave portions 222a and 222b may be formed in the second lens barrel 220-6. However, the number of the concave portions formed in the second lens barrel 220-6 is not limited to two. For example, three or more concave portions may be formed in the second lens barrel 220-6. The concave portions 222a and 222b may each have a predetermined size. For example, the concave portions 222a and 222b may have predetermined heights Bh1 and Bh2 and widths Bw1 and Bw2.

The heat generation device 410-1 (including portions 412 and 414) may have a thin shape. For example, the heat generation device 410-1 may be a positive temperature coefficient (PTC) heater in the shape of a film. The heat generation device 410-1 (including 412 and 414) may be inserted into the concave portions 222a and 222b of the second lens barrel 220-6. For example, the heights Hh1 and Hh2 and thicknesses Hw1 and Hw2 of the heat generation device 410-1 (including the portions 412 and 414) may each be substantially equal to or less than the heights Bh1 and Bh2 and widths Bw1 and Bw2 of the concave portions 222a and 222b.

The heat generation device 4101—(including 412 and 414) may be generally formed in a rectangular film shape, and may be elastically deformed. Accordingly, the heat generation device 410-1 may be elastically deformed and inserted into the circular concave portions 222a and 222b. The heat generation device 410-1 may have a predetermined length. For example, the lengths of the heat generation devices 412 and 414 may each be substantially equal to or smaller than arc lengths $2*\pi*BR1$, $2*\pi*BR2$ of the concave portions 222a and 222b. BR1 and BR2 may respectively indicate distances (radii) from the concave portions 222a and 222b to a side closest to the optical axis.

The heat generation device 410-1 (including 412 and 414) according to this embodiment may rapidly heat the second lens barrel 220-6. For example, the thermal energy generated by the heat generation devices 412 and 414 may be transferred to the second lens barrel 220-6 through both sides of each of the concave portions 222a and 222b of the second lens barrel 220-6. Therefore, the second lens barrel 220-6 and the heat generation device 410-1 may have an increased contact area therebetween, thereby rapidly heating the second lens barrel 220-6.

Referring back to FIG. 10, the camera module 1004 may further include a component other than the components described above. For example, the camera module 1004 may further include the housing 500, the substrate 600, the cover member 700, etc.

The housing 500 may accommodate or support the lens barrel 200 and the substrate 600. For example, the housing 500 may accommodate the substrate 600 while supporting the lens barrel 200 and the substrate 600. The housing 500 may include the upper housing 510 and the lower housing 520. The upper housing 510 may support the lens barrel 200 and the substrate 600, and the lower housing 520 may seal the open space of the upper housing 510. The upper housing 510 may include the support portion 512. The support portion 512 may be elongated downward from the top end of the upper housing 510. The support portion 512 may be coupled to the lens barrel 200 and the substrate 600. For example, the inner surface of the support portion 512 may be coupled to the lens barrel 200, and the distal end of the support portion 512 may be coupled to the substrate 600. The support portion 512 and the lens barrel 200 may be fastened to each other by the press-fit, and the support portion 512 and the substrate 600 may be coupled to each other by using the fastening element, such as a bolt.

The substrate 600 may include an electronic component required to drive the camera module 1004. For example, the substrate 600 may be equipped with the image sensor 610, the passive element 620, and the like. The electronic components mounted on or embedded in the substrate 600 may be electrically connected to each other. For example, the electric circuit electrically connecting the electronic components to each other may be formed on the one surface of or in the substrate 600. The substrate 600 may provide power and a control signal necessary to drive the camera module 1004. For example, the connection terminal 630 connected to the external power source and the external device may be formed on the rear surface of the substrate 600. The substrate 600 may be connected to the heat generation device 410. For example, the power supply terminal 640 connected to the heat generation device 410 may be formed on the one surface of the substrate 600. The heat generation device 410 and the power supply terminal 640 may be electrically connected to each other by the power line 642, the flexible substrate, or the like.

The cover member 700 may secure the forwardmost lens to the lens barrel 200. For example, the cover member 700 may be coupled to the lens barrel 200 while pressing the edge of the first lens 110. The cover member 700 may be adhered or coupled to the lens barrel 200. As an example, the cover member 700 may be adhered to the lens barrel 200 by the adhesive member. As another example, the cover member 700 may be fastened to the lens barrel 200 by a screw coupling. The cover member 700 being adhered to the lens barrel 200 by the adhesive member may improve the airtightness between the cover member 700 and the lens barrel 200, and the cover member 700 being fastened to the lens barrel 200 by the screw coupling may increase the adhesion between the first lens 110 and the lens barrel 200 by the cover member 700.

The cover member 700 may be generally made of a material that is the same as or similar to that of the first lens barrel 210. For example, the cover member 700 may be made of the plastic material. The cover member 700, being made of the material that is the same as or similar to that of the first lens barrel 210, may be excellently coupled, adhered, or fastened to the first lens barrel 210, and may thus significantly reduce the possibility that the forwardmost lens (i.e., first lens 110) becomes separated from the lens barrel 200. However, the cover member 700 is not limited to the plastic material. For example, the cover member 700 may be made of the metal material to protect the first lens 110 from an external impact.

The airtight member 800 may be disposed between the first lens 110 and the cover member 700. For example, the airtight member 800 may be disposed between the step portion 117, formed on the edge of the first lens 110, and the cover member 700. The airtight member 800 may be made of the material which may be elastically deformed or compressively deformed. For example, the airtight member 800 may be made of rubber, synthetic rubber, elastomer, or the like. However, the airtight member 800 is not limited to the above-mentioned material. The airtight member 800 may block the gap between the first lens 110 and the cover member 700. For example, the airtight member 800 may be elastically deformed when the cover member 700 and the lens barrel 200 are coupled to each other to block the gap between the first lens 110 and the cover member 700.

The camera module 1004 may remove the foreign matter adhering to the forwardmost lens (i.e., first lens 110). For example, the camera module 1004 may use the thermal energy of the heat generating device 410 either to remove a raindrop on the first lens 110 in rain, frost or dew occurring on the surface of the first lens 110 due to a difference between day and night temperatures, or the like, or to block the frost or the dew from occurring therefrom.

Figure 13:
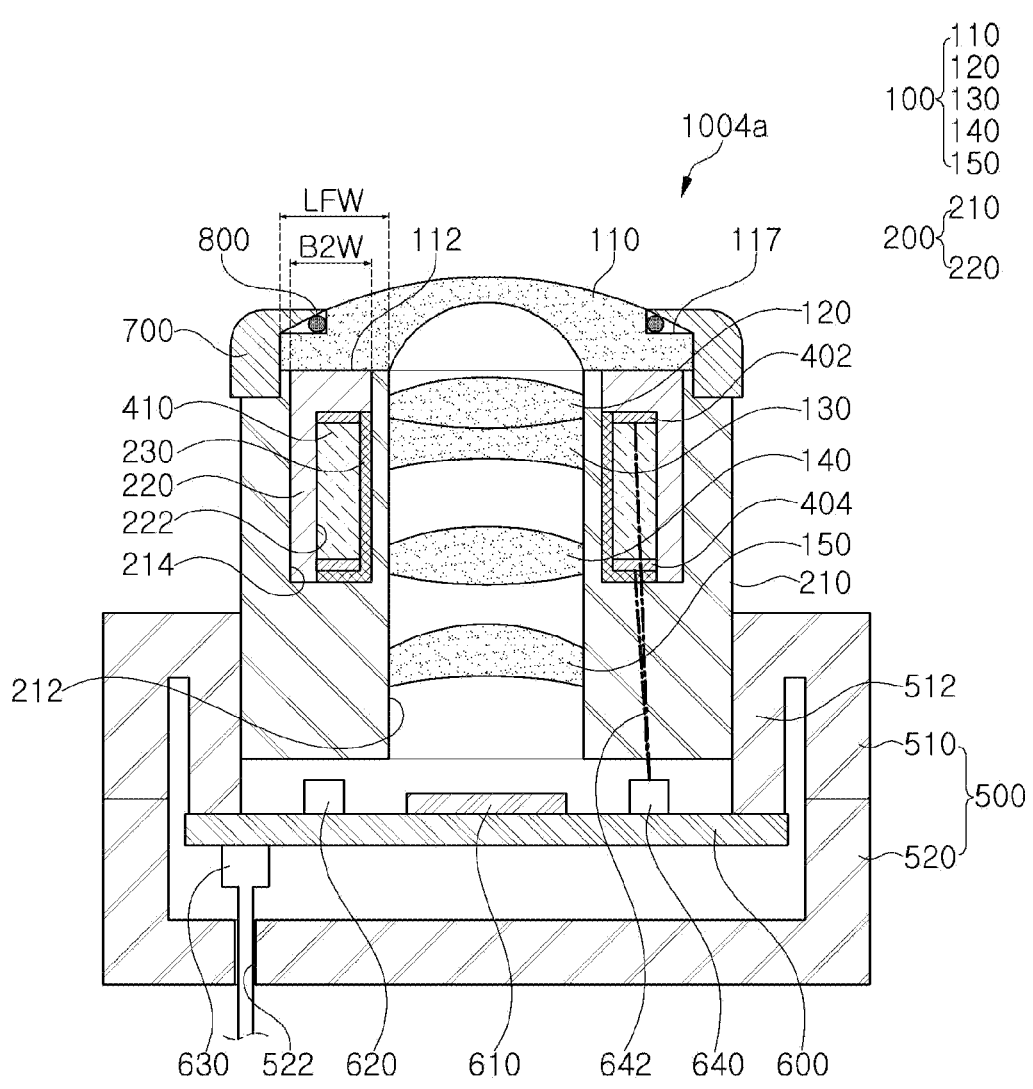
FIGS. 13 through 15 illustrate modified examples of the camera module shown in FIG. 10.
Figures 14A, 14B:
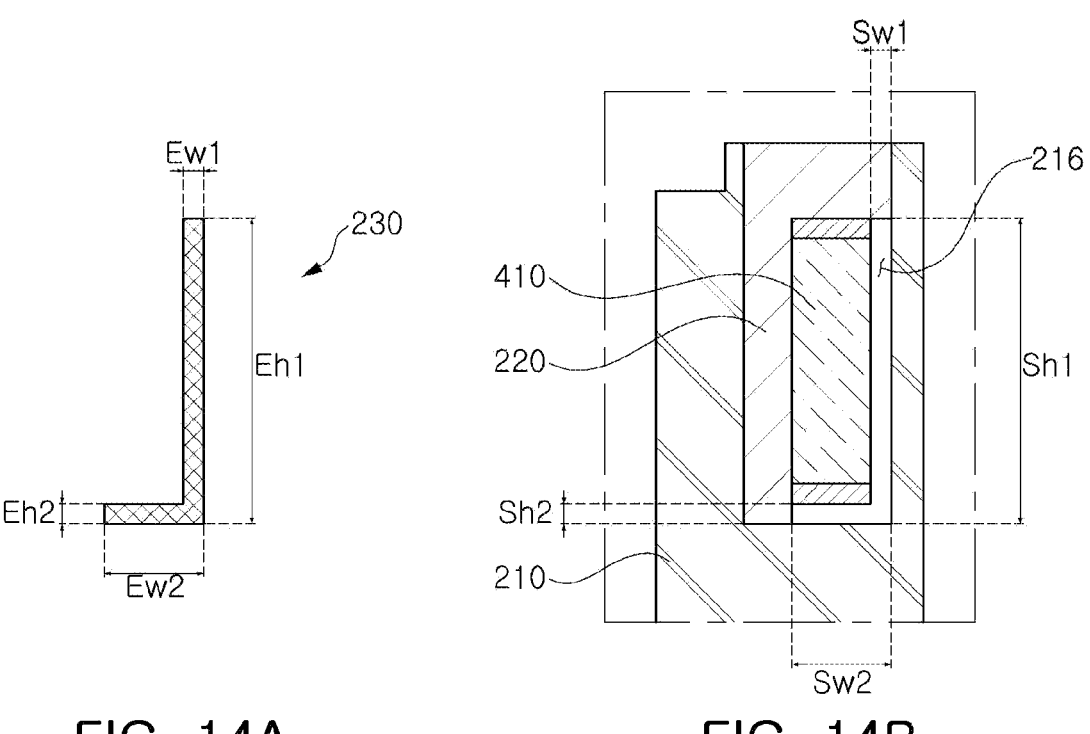
Figure 14C:
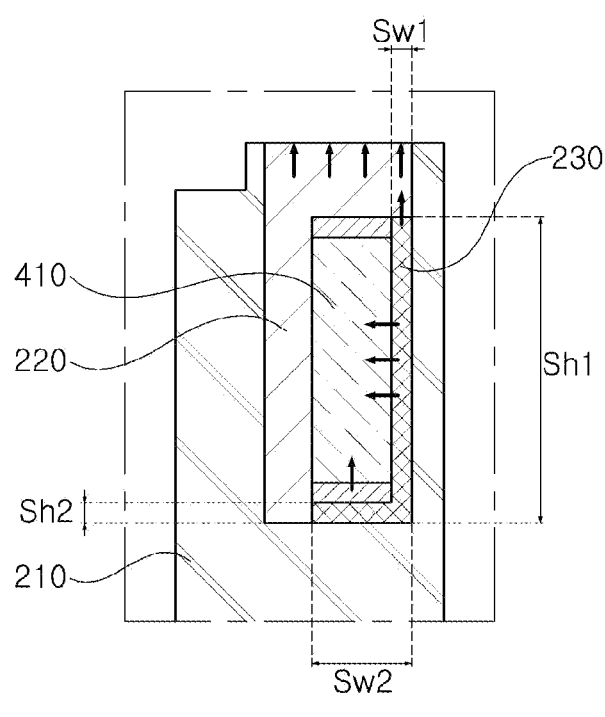

FIGS. 13 through 14C illustrate a camera module, according to another embodiment.

Referring to FIGS. 13 through 14C, a camera module 1004a may further include the buffer member 230 in addition to the features of the camera module 1004.

The buffer member 230 may be disposed between the first lens barrel 210 and the second lens barrel 220. For example, the buffer member 230 may be disposed in the concave portion 222 of the second lens barrel 220. The buffer member 230 may be made of a material which may be elastically deformed or compressively deformed. In addition, the buffer member 230 may be made of a material having strong restoring force. For example, the buffer member 230 may be made of rubber, synthetic rubber, elastomer, or the like.

The buffer member 230 may allow the second lens barrel 220 and the heat generation device 410 to be in close contact with each other. As an example, the buffer member 230 may be disposed between the first lens barrel 210 and the heat generation device 410 to provide elastic force for pressing the heat generation device 410 toward the concave portion 222. As another example, the buffer member 230 may be disposed between the first lens barrel 210 and the second lens barrel 220 to provide elastic force pressing the second lens barrel 220 toward the flange portion 112 of the first lens 110.

The volume of the buffer member 230 may be larger than a volume of a space formed between the lens barrels 210 and 220 and the heat generation device 410 to achieve the above-described effect. For example, as shown in FIGS. 14A through 14C, the widths Ew1 and Ew2 and heights Eh1 and Eh2 of the buffer member 230 may be greater than the widths Sw1 and Sw2 and heights Sh1 and Sh2 of the arrangement space 216 formed between the lens barrels 210 and 220 and the heat generation device 410. In more detail, the widths Ew1 and Ew2 of the buffer member 230 may be greater than the widths Sw1 and Sw2 of the arrangement space 216, and the heights Eh1 and Eh2 of the buffer member 230 may be greater than the heights Sh1 and Sh2 of the arrangement space 216. Accordingly, the buffer member 230, when inserted in the arrangement space 216, may be compressed or elastically deformed by the deviation between the volume of the buffer member 230 and that of the arrangement space 216. In addition, the restoring force accumulated by compressing or elastically deforming the buffer member 230 may act as force applied to the heat generation device 410 to cause the heat generation device 410 to be in close contact with the second lens barrel 220 or cause the second lens barrel 220 to be in close contact with the first lens 110, as shown in FIG. 14C. Therefore, the camera module 1004a may transfer most of the energy generated by the heat generation device 410 to the first lens 110 without loss due to a space between the heat generation device 410 and the second lens barrel 220 or the space between the second lens barrel 220 and the first lens 110.

Figure 15:
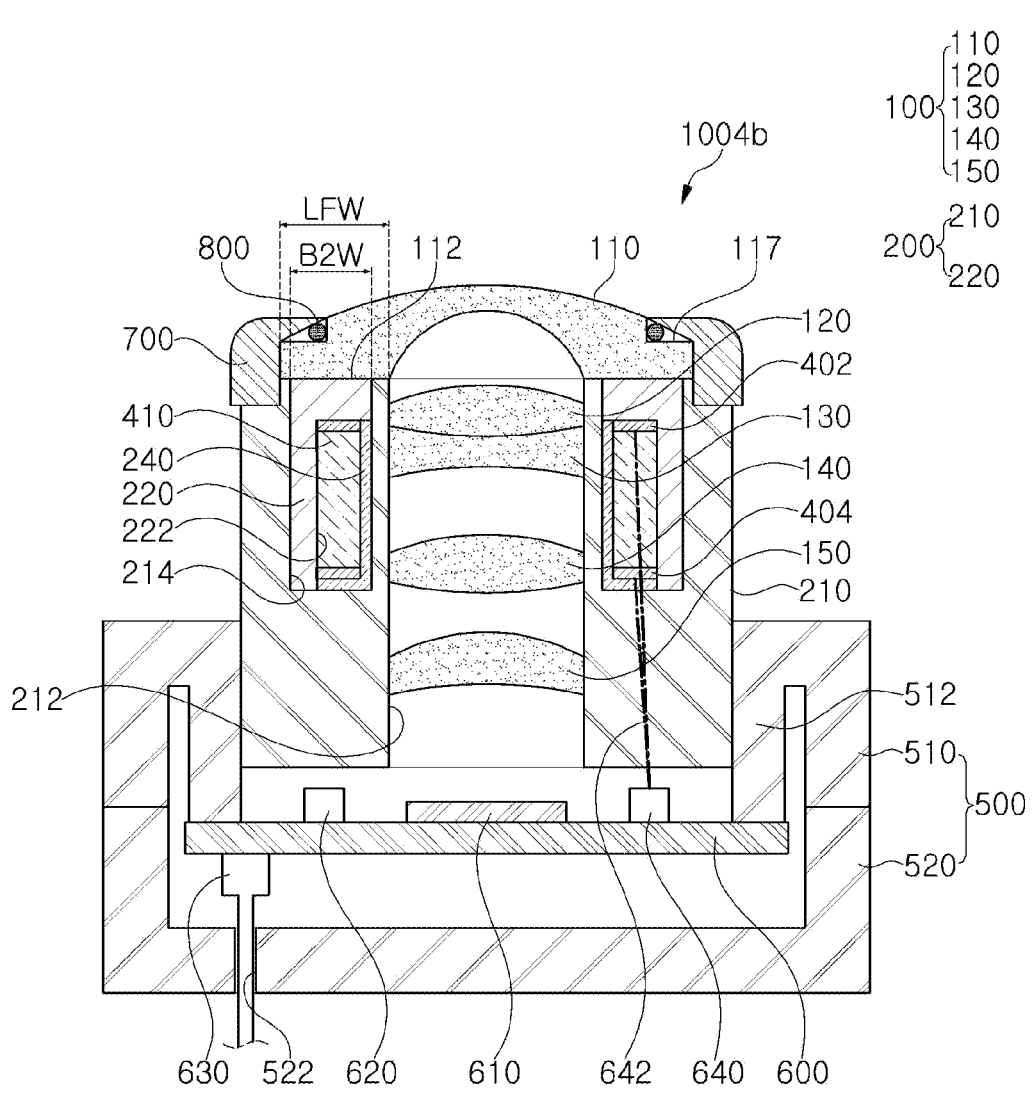

FIG. 15 illustrates a camera module, according to another embodiment.

Referring to FIG. 15, a camera module 1004b may further include the insulation member 240.

The insulation member 240 may be disposed between the first lens barrel 210 and the second lens barrel 220. For example, the insulation member 240 may be disposed in the concave portion 222 of the second lens barrel 220. The insulation member 240 may be made of the material having low thermal conductivity. For example, the insulation member 240 may be made of glass, ceramic, expanded polystyrene, expanded polyurethane, polyethylene, or the like, or may be made of the synthetic material including one or more of the materials described above.

The insulation member 240 may improve the heating efficiency of the second lens barrel 220. For example, the insulation member 240 may block the thermal energy of the heat generation device 410 from being transferred to a member other than the second lens barrel 220. In order to achieve the above-described effect, the insulation member 240 may enclose every region of the heat generation device 410 that is not in contact with the second lens barrel 220.

Therefore, the camera module 1004b may improve the heating efficiency of the second lens barrel 220 by including the insulation member 240, and may improve the heating rate of the first lens 110 by including the second lens barrel 220.

For reference, the first lens 110 and the second lens barrel 220 may be deformed into the shapes shown in FIGS. 5A through 6B. For example, the first lens 110 and the second lens barrel 220 shown in FIGS. 10 and 13 through 14C may be deformed into the shapes shown in FIGS. 5A through 6B.

Figure 16:
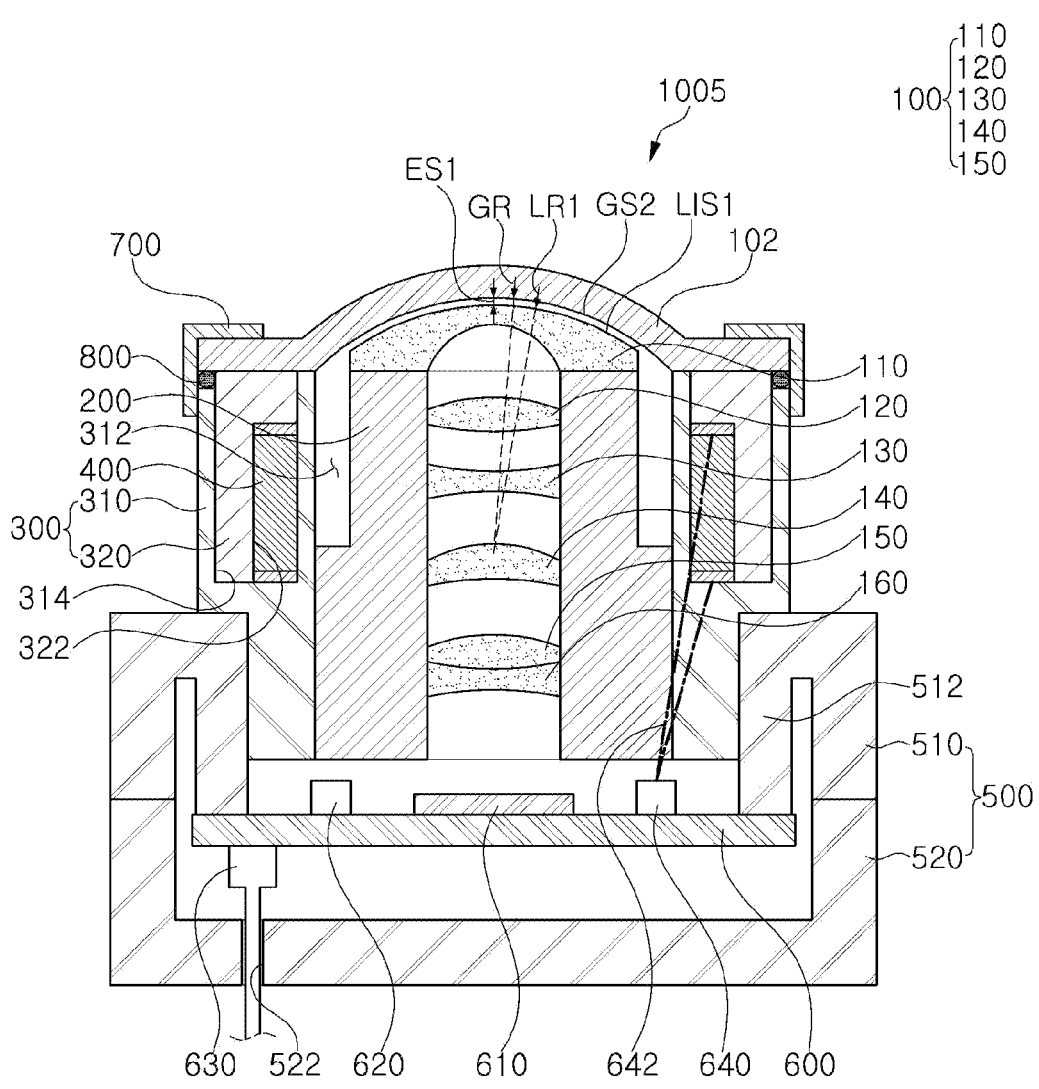
FIG. 16 is a cross-sectional view of a camera module, according to another embodiment.

FIG. 16 illustrates a camera module, according to another embodiment.

Referring to FIG. 16, a camera module 1005 may include the optical system 100, the lens barrel 200, a barrel holder 300 and the energy generation unit 400.

The optical system 100 may form an image at the predetermined position by using the light reflected from a subject. For example, the optical system 100 may have the refractive power to form the image at a predetermined position by using the light incident thereon. The optical system 100 may include the plurality of lenses. For example, the optical system 100 may include six or more lenses including the first lens 110, the second lens 120, the third lens 130, the fourth lens 140, the fifth lens 150, and a sixth lens 160. However, the number of lenses included in the optical system 100 is not limited to six. For example, the optical system 100 may include five or fewer lenses or include seven or more lenses.

The first to sixth lenses 110, 120, 130, 140, 150, and 160 may be sequentially arranged from the object side. For example, the first lens 110, the second lens 120, the third lens 130, the fourth lens 140, the fifth lens 150, and the sixth lens 160 may be sequentially arranged along the optical axis from the object side. The first to sixth lenses 110 to 160 may each be made of a plastic or glass material. For example, the first to sixth lenses 110 to 160 may be all made of the glass material or all made of the plastic material. However, the first to sixth lenses 110 to 160 may not all be made of the same material. For example, at least one of the first to sixth lenses 110 to 160 may be made of the glass material and the rest of the first to sixth lenses 110 to 160 may be made of the plastic material. As an example, the first lens 110 may be made of the glass material. As another specific example, a lens of the optical system 100 having a strong refractive power may be made of the glass material.

The optical system 100 may have a predetermined angle of view. For example, the optical system 100 may have an angle of view of 120 degrees or more. However, the angle of view of the optical system 100 is not limited to 120 degrees or more. For example, the optical system 100 may have an angle of view of less than 120 degrees.

The optical system 100 may be accommodated in the lens barrel 200. For example, the first to sixth lenses 110 to 160 may be sequentially accommodated in the lens barrel 200. However, not all the components of the optical system 100 may be arranged inside the lens barrel 200. For example, some components of the optical system 100 may be disposed outward from the lens barrel 200.

The optical system 100 may further include a component protecting the first lens 110 from an external impact. For example, the optical system 100 may further include a glass cover panel 102 disposed in front (or on the object side) of the first lens 110.

Figure 20:
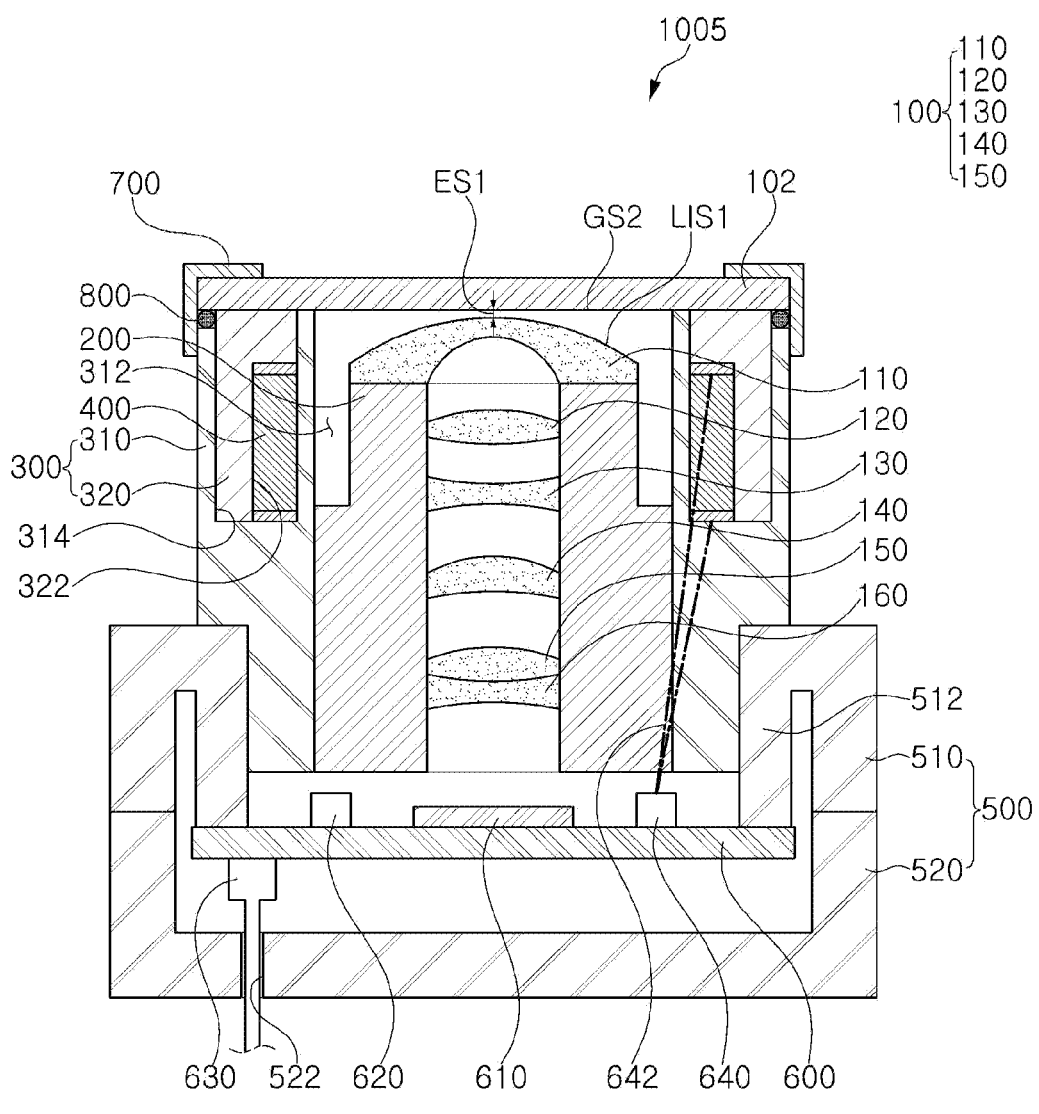
FIG. 20 shows a modified example of the camera module shown in FIG. 16.

The glass cover panel 102 may not affect performance of the optical system 100. For example, the glass cover panel 102 may transfer light incident thereon as it is, without refracting the light. The glass cover panel 102 may be resistant to an external impact. For example, the glass cover panel 102 may be made of a glass material that is resistant to an external impact. However, the material of the glass cover panel 102 is not limited to the glass. For example, the glass cover panel 102 may be made of the plastic material having sufficient strength. The glass cover panel 102 may be coupled to the barrel holder 300. For example, an edge of the glass cover panel 102 may be in contact with or coupled to one end of the barrel holder 300. The glass cover panel 102 may be convex to the object side. For example, a curvature radius Gr of an inner surface of the glass cover panel 102 may be substantially equal to or greater than a curvature radius LR1 of the object-side surface of the first lens 110. However, the glass cover panel 102 may not be necessarily convex. For example, the glass cover panel 102 may be flat as shown in FIG. 20. A predetermined space ES1 may be formed between an inner surface GS2 of the glass cover panel 102 and the object-side surface L1S1 of the first lens 110. The space ES1 may prevent the inner surface GS2 of the glass cover panel 102 and the object-side surface L1S1 of the first lens 110 from being in direct contact with each other. In addition, the space ES1 may reduce or block the external heat or cold air of the glass cover panel 102 from being transferred to the first lens 110. Therefore, the camera module 1005 may minimize change in an optical feature (e.g., refractive index) of the optical system 100, due to change in a temperature of the external environment.

The optical system 100 may further include the filter member configured to block the infrared light. In addition, the optical system 100 may further include the stop disposed between the lens and the lens to control the amount of light, the spacer maintaining a constant distance between the lens and the lens, etc. However, the optical system 100 may not necessarily include the filter member, the spacer, the stop and the like, described above. As an example, the optical system 100 may omit the filter member.

The lens barrel 200 may accommodate the optical system 100. For example, the lens barrel 200 may include the accommodation space accommodating the optical system 100. The lens barrel 200 may accommodate one or more of the first lens 110 to the sixth lens 160 included in the optical system 100. For example, the lens barrel 200 may accommodate all of the first lens 110 to the sixth lens 160. The lens barrel 200 may generally have the cylindrical shape. However, the lens barrel 200 is not limited to the cylindrical shape. For example, the lens barrel 200 may have the shape of a quadrangular prism, a rectangular prism, or the like based on a cross-sectional shape of the lenses.

For example, the barrel holder 300 may accommodate the lens barrel 200. The barrel holder 300 may secure the lens barrel 200 to the housing 500. For example, the barrel holder 300 may be firmly coupled to the housing 500 while accommodating the lens barrel 200.

The barrel holder 300 may include a plurality of members. For example, the barrel holder 300 may include a first barrel holder 310 and a second barrel holder 320. The first barrel holder 310 and the second barrel holder 320 may be made of materials different from each other. As an example, the first barrel holder 310 may be made of the material having low thermal conductivity or the material having low electrical conductivity, and the second barrel holder 320 may be made of the material having high thermal conductivity or the material having high electrical conductivity. As another example, the first barrel holder 310 may be made of the plastic material, and the second barrel holder 320 may be made of the metal material.

The first barrel holder 310 may accommodate the lens barrel 200 and the second barrel holder 320. For example, the first barrel holder 310 may include a first accommodation portion 312 accommodating the lens barrel 200 and a second accommodation portion 314 accommodating the second barrel holder 320. The first accommodation portion 312 and the second accommodation portion 314 may be formed as the spaces independent of each other. For example, the first accommodation portion 312 may be formed in a center of the first barrel holder 310, and the second accommodation portion 314 may be formed along an edge of the first barrel holder 310 at a predetermined distance from the first accommodation portion 312. The first accommodation portion 312 and the second accommodation portion 314 may each be formed to be elongated in the longitudinal direction of the first barrel holder 310. The first accommodation portion 312 and the second accommodation portion 314 may be formed to have sizes or lengths that are different from each other. For example, the first accommodation portion 312 may be formed to completely penetrate through the first barrel holder 310, and the second accommodation portion 314 may be formed to have a predetermined length from one end of the first barrel holder 310.

The second barrel holder 320 may be disposed in the second accommodation portion 314 of the first barrel holder 310. The second barrel holder 320 may be in contact with the glass cover panel 102. For example, the second barrel holder 320 may be in contact with the edge of the glass cover panel 102 while being mounted in the second accommodation portion 314 of the first barrel holder 310.

A predetermined space may be formed between the first barrel holder 310 and the second barrel holder 320. For example, a concave portion 322 may be formed inside the second barrel holder 320, and a space of a significant size may be formed between the first barrel holder 310 and the second barrel holder 320. The concave portion 322 may be elongated upwardly from a distal end of the second barrel holder 320.

The second barrel holder 320 may function as the energy transfer member. In more detail, the second barrel holder 320 may transfer the energy generated from the energy generation unit 400. As an example, the second barrel holder 320 may be made of a material having high thermal conductivity to easily transfer the thermal energy of the energy generation unit 400. As another example, the second barrel holder 320 may be made of a material having a high vibration frequency to easily transfer the vibration energy of the energy generation unit 400. The second barrel holder 320 may be made of the metal material to easily transfer the thermal energy or the vibration energy. However, the material of the second barrel holder 320 is not limited to the metal. For example, the second barrel holder 320 may be made of the material having a high specific heat to maintain the absorbed thermal energy for a long time.

The energy generation unit 400 may generate the predetermined amount of energy. For example, the energy generation unit 400 may be the heat generation device configured to generate thermal energy. As an example, the energy generation unit 400 may be the positive temperature coefficient (PTC) heater. However, the energy generation unit 400 is not limited to the heat generation device. For example, the energy generation unit 400 may be the excitation device or piezoelectric body configured to generate vibration energy.

The energy generation unit 400 may be disposed between the first barrel holder 310 and the second barrel holder 320. For example, the energy generation unit 400 may be disposed in the concave portion 322 of the second barrel holder 320. The energy generation unit 400 may be in close contact with the second barrel holder 320. For example, the energy generation unit 400 may have a shape substantially the same as that of a circular space formed by the concave portion 322 and the second accommodation portion 314. However, the energy generation unit 400 is not limited to the shape of the space formed by the concave portion 322 and the second accommodation portion 314.

The energy generation unit 400 may transfer energy to the second barrel holder 320. For example, the energy generation unit 400 may be in contact with the concave portion 322 of the second barrel holder 320 to transfer the thermal energy, the vibration energy, and the like, generated by the energy generation unit 400, to the second barrel holder 320. The energy generated by the energy generation unit 400 may be transferred effectively to the second barrel holder 320 than to the first barrel holder 310. For example, the second barrel holder 320 may be made of a material which may receive the thermal energy, the vibration energy, and the like more easily than that of the first barrel holder 310, and most of the energy generated from the energy generation unit 400 may thus be transferred to the second barrel holder 320 or absorbed into the second barrel holder 320.

The camera module 1005 may further include a component other than the components described above. For example, the camera module 1005 may further include the housing 500, the substrate 600, the cover member 700, etc.

The housing 500 may accommodate or support the first barrel holder 310 and the substrate 600. For example, the housing 500 may accommodate the substrate 600 while supporting the first barrel holder 310 and the substrate 600. The housing 500 may include the upper housing 510 and the lower housing 520. The upper housing 510 may support the first barrel holder 310 and the substrate 600, and the lower housing 520 may seal the open space of the upper housing 510. The upper housing 510 may include the support portion 512. The support portion 512 may be elongated downward from the top end of the upper housing 510. The support portion 512 may be coupled to the first barrel holder 310 and the substrate 600. For example, the inner surface of the support portion 512 may be coupled to the first barrel holder 310, and the distal end of the support portion 512 may be coupled to the substrate 600. The support portion 512 and the first barrel holder 310 may be fastened to each other by the press-fit, and the support portion 512 and the substrate 600 may be coupled to each other by using the fastening element such as a bolt.

The substrate 600 may include an electronic component required to drive the camera module 1005. For example, the substrate 600 may be equipped with the image sensor 610, the passive element 620 and the like. The electronic components mounted on or embedded in the substrate 600 may be electrically connected to each other. For example, the electric circuit electrically connecting the electronic components to each other may be formed on the one surface of or in the substrate 600. The substrate 600 may provide power and a control signal necessary to drive the camera module 1005. For example, the connection terminal 630, which is connected to the external power source and the external device, may be formed on the rear surface of the substrate 600. The substrate 600 may be connected to the energy generation unit 400. For example, the power supply terminal 640 connected to the power terminals 402 and 404 of the energy generation unit 400 may be formed on the one surface of the substrate 600. The energy generation unit 400 and the power supply terminal 640 may be electrically connected to each other by the power line 642, the flexible substrate or the like.

The cover member 700 may secure the glass cover panel 102 to the barrel holder 300. For example, the cover member 700 may be coupled to the barrel holder 300 while pressing the edge of the glass cover panel 102. The cover member 700 may be adhered or coupled to the barrel holder 300. As an example, the cover member 700 may be adhered to the barrel holder 300 by the adhesive member. As another example, the cover member 700 may be fastened to the barrel holder 300 by screw coupling. The cover member 700 being adhered or coupled to the barrel holder 300 may improve airtightness between the cover member 700 and the barrel holder 300, and the cover member 700 being fastened to the barrel holder 300 by screw coupling may increase adhesion between the glass cover panel 102 and the barrel holder 300 by the cover member 700.

The cover member 700 may be generally made of a material which is the same as or similar to that of the first barrel holder 310. For example, the cover member 700 may be made of the plastic material. The cover member 700, when made of the material that is the same as or similar to that of the first barrel holder 310, may be excellently coupled, adhered, or fastened to the first barrel holder 310, and may thus significantly reduce a possibility that the glass cover panel 102 becomes separated from the first barrel holder 310. However, the cover member 700 is not limited to the plastic material.

The airtight member 800 may be disposed between the glass cover panel 102 and the first barrel holder 310. The airtight member 800 may be made of the material which may be elastically deformed or compressively deformed. For example, the airtight member 800 may be made of rubber, synthetic rubber, elastomer or the like. However, the airtight member 800 is not limited to the above-mentioned material. The airtight member 800 may block a gap between the glass cover panel 102 and the first barrel holder 310. For example, the airtight member 800 may be elastically deformed when the cover member 700 and the first barrel holder 310 are coupled to each other to block the gap between the glass cover panel 102 and the first barrel holder 310.

The camera module 1005 may remove the foreign matter adhering to the glass cover panel 102. For example, the camera module 1005 may remove frost, moisture, dew, a raindrop, or the like adhering to a surface of the glass cover panel 102 by using vibration, heat, static electricity, etc.

Figure 17:
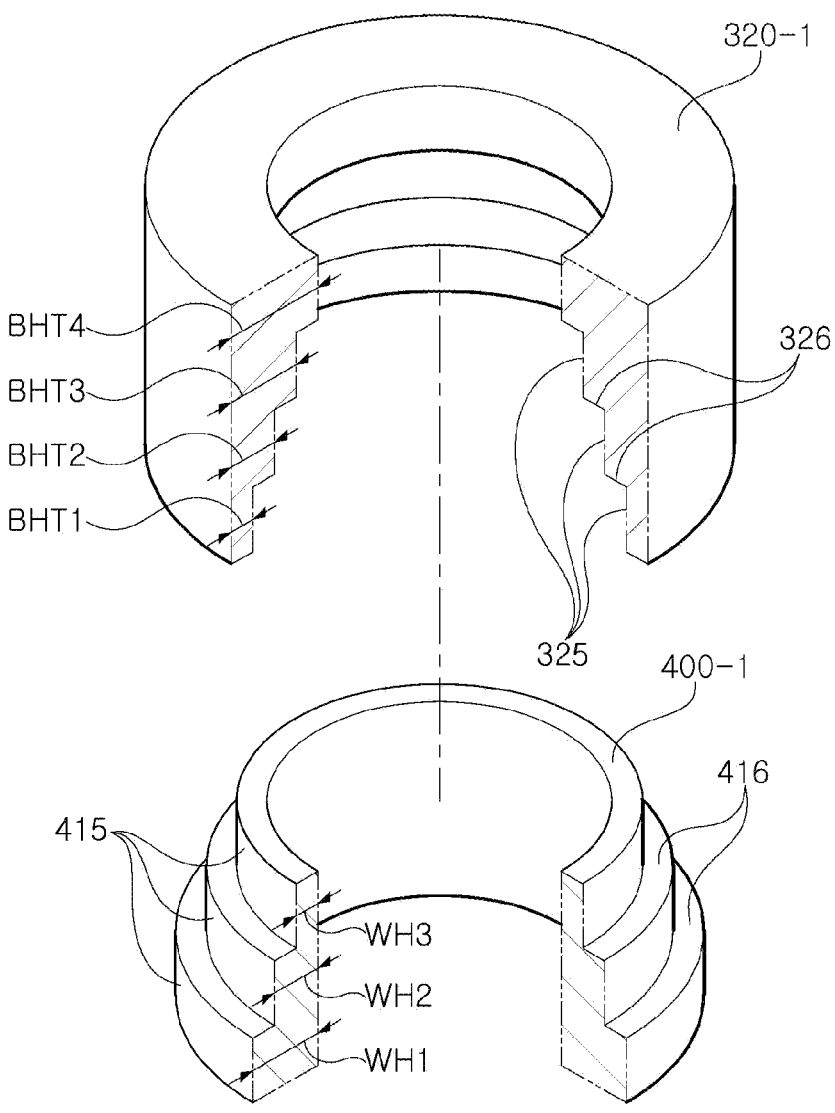
FIGS. 17 through 19 illustrate other types of a barrel holder and an energy generation unit shown in FIG. 16.
Figure 18:
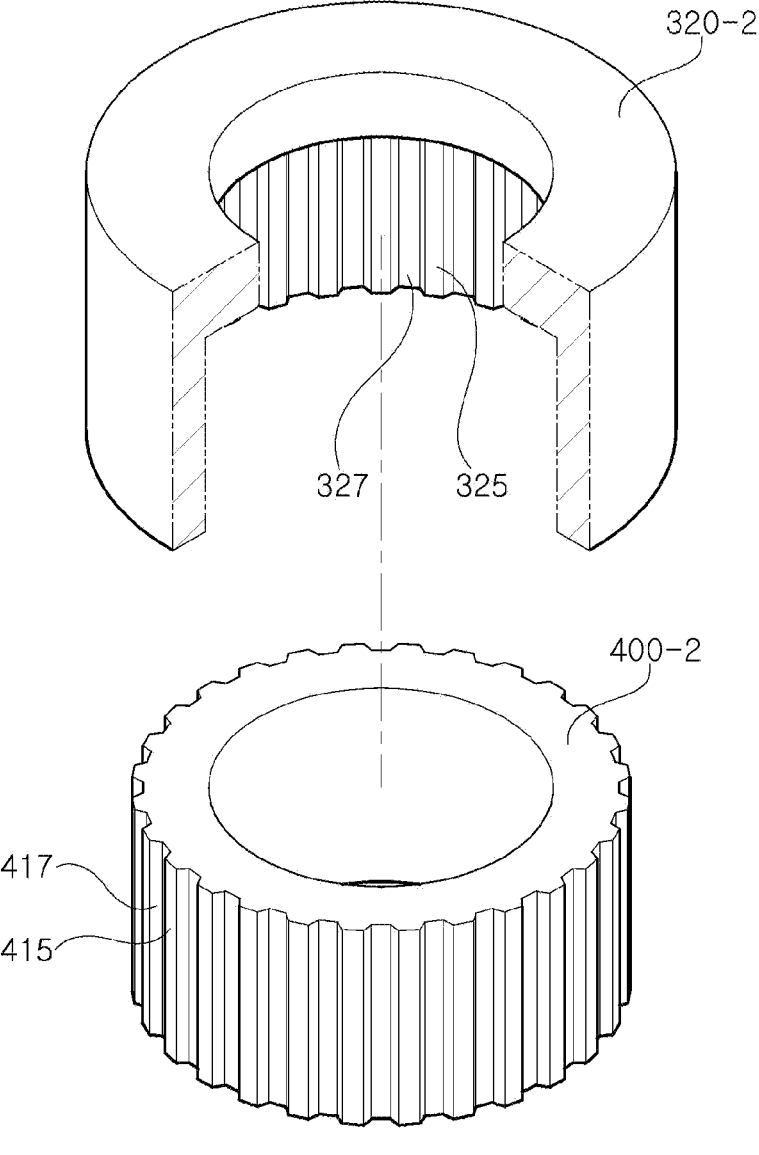
Figure 19:
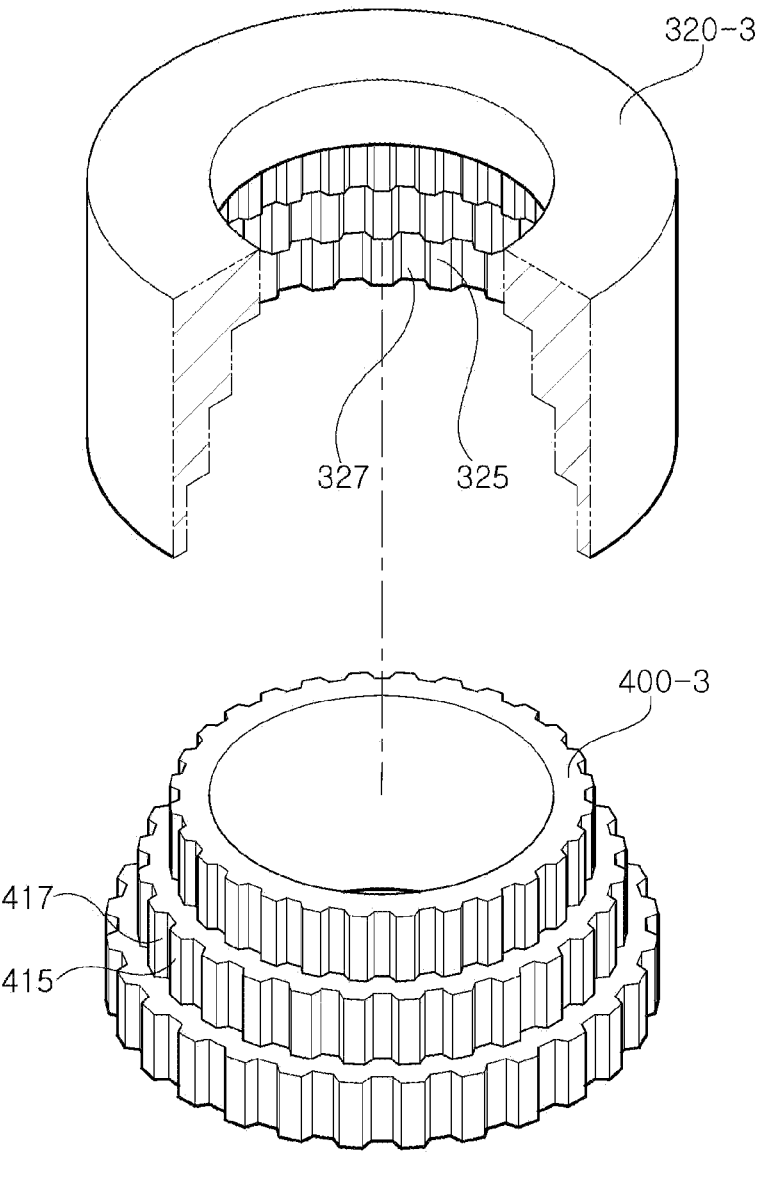

FIGS. 17 through 19 illustrate modified examples in which a second barrel holder and an energy generation unit are coupled to each other for effectively transferring the energy of the energy generation unit, according to an embodiment.

The second barrel holder and the energy generation unit may be formed to increase energy transfer efficiency. For example, the second barrel holder and the energy generation unit may have an increased area in which the second barrel holder and the energy generation unit are in contact with or face each other.

Referring to FIG. 17, as an example, a second barrel holder 320-1 and the energy generation unit 400-1 may have a plurality of steps 326 and 416, respectively. Referring to FIG. 18, as another example, a second barrel holder 320-2 and the energy generation unit 400-2 may have a plurality of grooves 327 and protrusions 417, respectively. Referring to FIG. 19, as another example, a second barrel holder 320-3 may have the steps 326 and the grooves 327 and the energy generation unit 400-3 may have the steps 416 and the protrusions 417.

Referring to FIG. 17, the second barrel holder 320-1 and the energy generation unit 400-1 may each have a step difference. For example, the second barrel holder 320-1 may have the plurality of steps 326 formed in an inner circumferential surface 325, and the energy generation unit 400-1 may have the plurality steps 416 formed on the outer circumferential surface 415. The inner circumferential surfaces 325 and steps 326 of the second barrel holder 320-1 may generally be in contact with the outer circumferential surfaces 415 and steps 416 of the energy generation unit 400-1. As an example, the inner circumferential surfaces 325 of the second barrel holder 320-1 may be in contact with the outer circumferential surfaces 415 of the energy generation unit 400-1, and the steps 326 of the second barrel holder 320-1 may be in contact with the steps 416 of the energy generation unit 400-1. As another example, the inner circumferential surface 325 of the second barrel holder 320-1 may have substantially the same size (or diameter) as the outer circumferential surface 415 of the energy generation unit 400-1, and the step 326 of the second barrel holder 320-1 may have substantially the same size as the step 416 of the energy generation unit 400-1.

The second barrel holder 320-1 may have a cross-sectional area which is increased in the upward direction (i.e., toward the glass cover panel 102). For example, thicknesses BHT1, BHT2, BHT3 and BHT4 of the second barrel holder 320-1 may be increased in the upward direction. The energy generation unit 400-1 may have the cross-sectional area which is decreased in the upward direction. For example, the thicknesses WH1, WH2 and WH3 of the energy generation unit 400-1 may be decreased in the upward direction.

The second barrel holder 320-1 and the energy generation unit 400-1 may easily transfer energy upward. For example, the second barrel holder 320-1 may have the cross-sectional area that is increased in the upward direction, and the lower the portion of the second barrel holder 320-1, the faster the energy of the energy generation unit 400 may be absorbed or transferred. In contrast, the energy generation unit 400-1 may have the cross-sectional area that is increased in the downward direction, and the lower the portion of the energy generation unit 400-1, the greater the energy that may be generated.

In consideration of the description above, the energy generated from the energy generation unit 400-1 not only be rapidly transferred but also be increased, toward the lower portion of the second barrel holder 320-1. Meanwhile, the energy has a tendency to be moved from a place having a high displacement to a place having a low displacement, and the energy transferred to the second barrel holder 320-1 may thus be moved from its lower portion to its upper portion. Therefore, according to the second barrel holder 320-1 and the energy generation unit 400-1, the energy of the energy generation unit 400-1 may be rapidly transferred or supplied to the glass cover panel 102 positioned at a forwardmost of camera module 1005.

Referring to FIG. 18, the second barrel holder 320-2 and the energy generation unit 400-2 may have the grooves 327 and the protrusions 417, respectively. For example, the second barrel holder 320-2 may have the plurality of grooves 327 formed in the inner circumferential surface 325, and the energy generation unit 400-2 may have the plurality of protrusions 417 formed on the outer circumferential surface 415. The second barrel holder 320-2 may generally be mesh-coupled to the energy generation unit 400-2. As an example, the inner circumferential surfaces 325 of the second barrel holder 320-2 may be in contact with the outer circumferential surfaces 415 of the energy generation unit 400-2, and the grooves 327 of the second barrel holder 320-2 may be in mesh contact with the protrusions 417 of the energy generation unit 400-2

The second barrel holder 320-2 and the energy generation unit 400-2 may have an increased area in which the second barrel holder 320-2 and the energy generation unit 400-2 are in contact with or face each other by the grooves 327 and the protrusions 417, thus improving the energy transfer efficiency through the conduction or the convection.

Referring to FIG. 19, the second barrel holder 320-3 and the energy generation unit 400-3 may include all the features shown in FIGS. 17 and 18. For example, the second barrel holder 320-3 may have the steps 326 and the grooves 327, and the energy generation unit 400-3 may have the steps 416 and the protrusions 417. Therefore, the second barrel holder 320-3 and the energy generation unit 400-3 may have all the advantages of the barrel holder 320-1 and the energy generation unit 400-1 shown in FIG. 17, and the barrel holder 320-2 and the energy generation unit 400-2 shown in FIG. 18.

Referring to FIGS. 21A through 22B, a second barrel holder and an energy generation unit may be in close contact with each other. For example, a groove accommodating an energy generation unit may be formed in the second barrel holder and the energy generation unit may have a shape allowing the groove of the second barrel holder to be inserted thereinto.

Figure 21A:
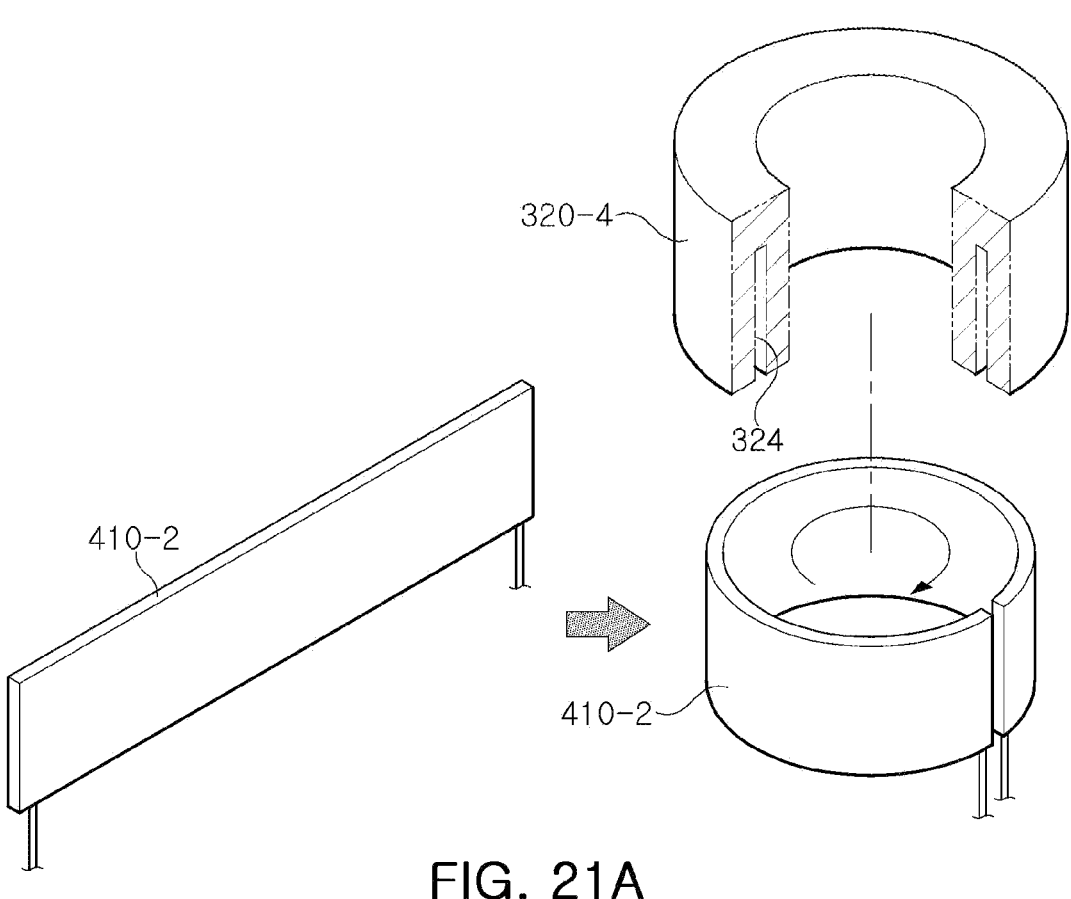
FIGS. 21A through 22B are exploded perspective views and combined cross-sectional views of modified examples of the second barrel holder and the energy generation unit shown in FIG. 16.
Figure 21B:
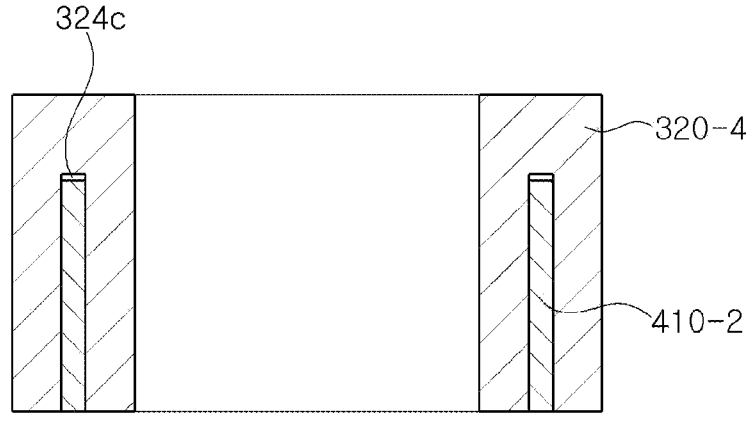

Referring to FIGS. 21A and 21B, an energy generation unit 410-2 may be a heat generation device. For example, the energy generation unit 410-2 may be a heat generation device of a film shape. The heat generation device 410-2 may prevent overheating of a heating object. For example, the heat generation device 410-2 may be a positive temperature coefficient (PTC) heater that is always maintained at a constant temperature. However, the heat generation device 410-2 is not limited to the PTC heater. The heat generation device 410-2 may be coupled to the groove 324 of a second barrel holder 320-4. For example, the heat generation device 410-2 may have the shape of a film which may be easily deformed, and may be inserted into the groove 324 of the second barrel holder 320-4. The heat generation device 410-2 may heat the second barrel holder 320-4. For example, the heat generation device 410-2 may dissipate heat while being mounted in the groove 324 to heat the second barrel holder 320-4.

Figure 22A:
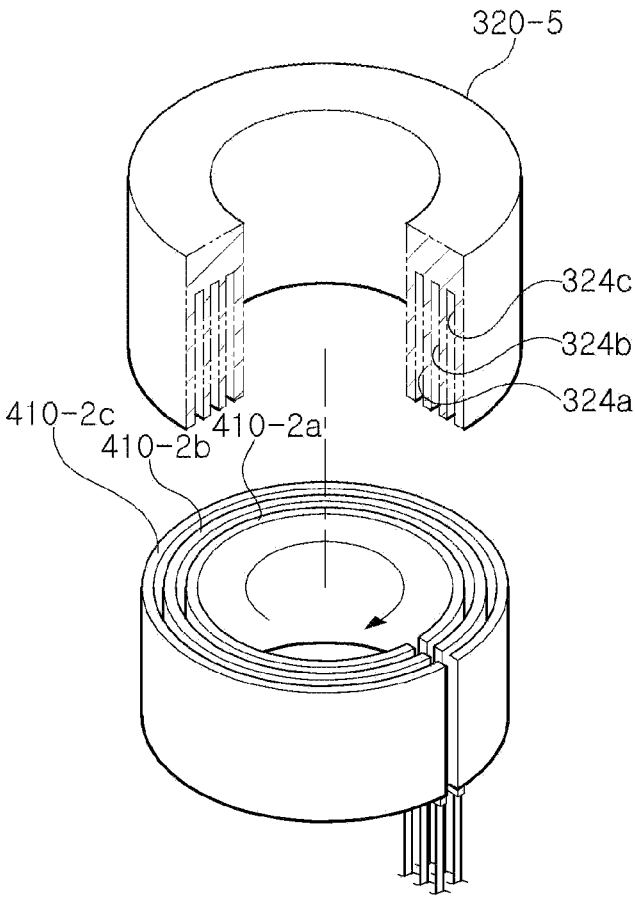
Figure 22B:
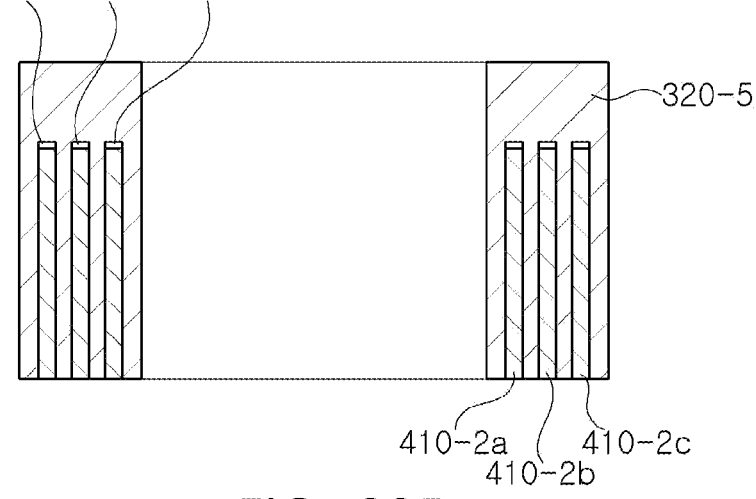

The number of the grooves and the number of heat generation devices formed in the second barrel holder may be increased or decreased as needed. For example, as shown in FIGS. 22A and 22B, three grooves 324a, 324b and 324c may be formed in a second barrel holder 320-5. In addition, the same number of heat generation devices 410-2a, 410-2b and 410-2c may be formed in the grooves 324a, 324b and 324c.

In the modified examples of FIGS. 21A to 22B described above, the second barrel holder and the heat generation device(s) may not only be easily coupled to each other, but also have an increased area in which the second barrel holder and the heat generation device(s) transfer heat to each other, thereby rapidly heating the second barrel holder by using the heat generation device(s).

Figure 23:
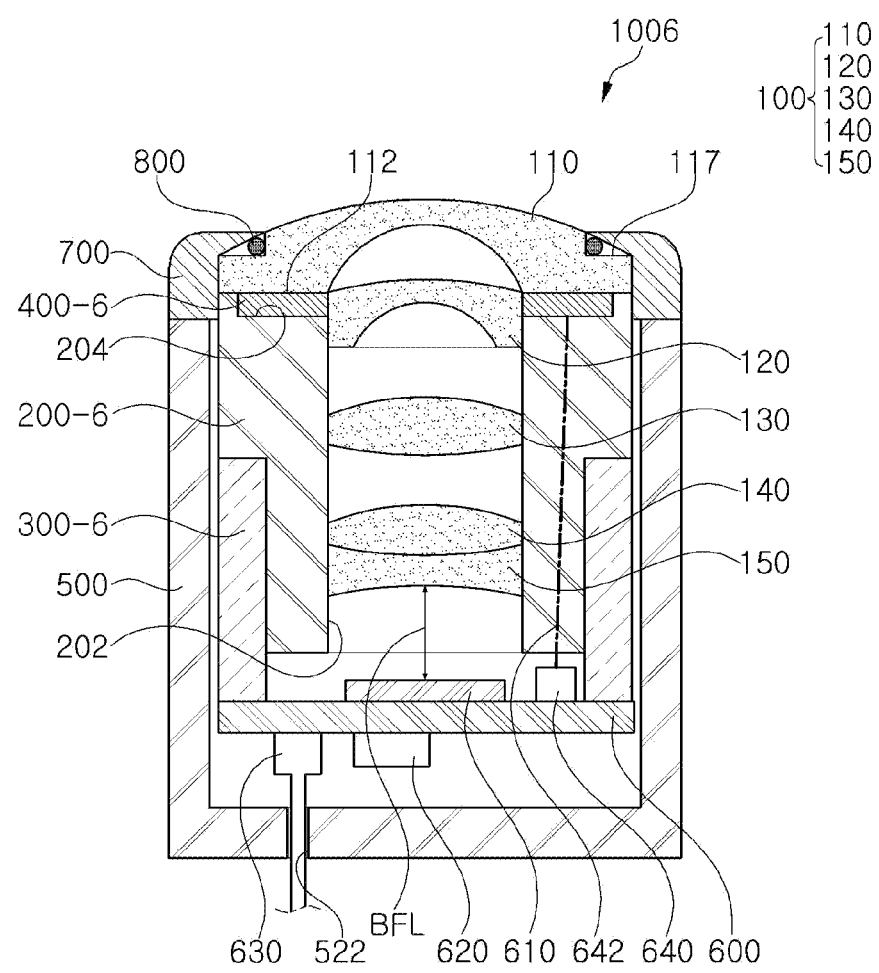
FIG. 23 is a cross-sectional view of a camera module, according to another embodiment.

FIG. 23 illustrates a camera module, according to another embodiment.

Referring to FIG. 23, a camera module 1006 may include the optical system 100, a lens barrel 200-6, a barrel holder 300-6, and an energy generation unit 400-6.

The optical system 100 may form an image at a predetermined position by using the light reflected from a subject. For example, the optical system 100 may have the refractive power to form the image at the predetermined position by using the light incident thereon. The optical system 100 may include the five or more lenses, including the first to fifth lenses 110, 120, 130, 140, and 150. However, the number of lenses included in the optical system 100 is not limited to five. For example, the optical system 100 may include four or fewer lenses or include six or more lenses.

The front lens (i.e., first lens 110) of the optical system 100, which is disposed closest to the object side, may have a larger diameter than the other lenses. For example, the first lens 110 may be sized to be in contact with the end of the lens barrel 200-6. Therefore, the first lens 110 may be aligned with the optical axis by the careful adjustment or another process in the state where the first lens 110 is disposed at the end of the lens barrel 200-6.

The optical system 100 may further include another component in addition to the first to fifth lenses 110, 120, 130, 140, and 150. For example, the optical system 100 may further include a filter member configured to block infrared light. However, the additional component of the optical system 100 is not limited to the filter member. For example, the optical system 100 may further include a stop disposed between the lens and the lens to control the amount of light, the spacer maintaining a constant distance between the lens and the lens, etc. However, the optical system 100 may not necessarily include the filter member, the stop, the spacer, and the like. For example, the optical system 100 may optionally omit the filter member, the stop, or the spacer. The optical system 100 may be formed for the camera module 1006 to capture the image with a wide angle. For example, the first lens 110 may have the convex object-side surface and the negative refractive power.

The lens barrel 200-6 may accommodate the optical system 100. For example, the lens barrel 200 may include an accommodation space 202 accommodating the optical system 100. The lens barrel 200-6 may accommodate one or more of the first to fifth lenses 110 to 150 included in the optical system 100. For example, the lens barrel 200-6 may accommodate the second to fifth lenses 120 to 150. The lens barrel 200-6 may generally have the cylindrical shape. However, the lens barrel 200-6 is not limited to the cylindrical shape. For example, the lens barrel 200-6 may have the shape of a quadrangular prism, a rectangular prism, or the like based on a cross-sectional shape of the lenses.

The lens barrel 200-6 may accommodate the energy generation unit 400-6. For example, a seating portion 204 accommodating the energy generation unit 400-6 may be formed on one side of the lens barrel 200-6. The seating portion 204 may have a predetermined depth from a top portion of the lens barrel 200-6. In addition, the seating portion 204 may be open toward the accommodation space 202 of the lens barrel 200-6. Accordingly, a member disposed on the seating portion 204 may be in contact with both the first lens 110 disposed on the top portion of the lens barrel 200-6 and the second lens 120 disposed in the accommodation space 202.

The lens barrel -6 may absorb the deformation of the optical system 100 caused by a temperature change. For example, the lens barrel 200-6 may be made of a material having a thermal expansion coefficient similar to that of the optical system 100. For example, the lens barrel 200-6 may be made of a plastic material. However, the lens barrel 200 is not limited to the plastic material.

The barrel holder 300-6 may be coupled to the lens barrel 200-6. For example, the barrel holder 300-6 may be coupled with the lens barrel 200-6 by screw a coupling, a press-fit, etc. The barrel holder 300-6 may be coupled with the substrate 600. For example, the barrel holder 300-6 may be coupled with the substrate 600 by a fastening element such as a bolt, a screw, or the like.

The barrel holder 300-6 may maintain a constant back focal length (BFL, that is, a distance from a rearmost lens to a top surface of the image sensor 610) of the optical system 100. As an example, the barrel holder 300-6 may maintain the constant back focal length (BFL) of the optical system 100 by adjusting the amount of force applied to fasten the barrel holder 300-6 and the lens barrel 200-6 to each other.

The barrel holder 300-6 may minimize an amount of change in the back focal length (BFL) based on the temperature change. For example, the barrel holder 300-6 may be made of a material having a thermal expansion coefficient substantially the same as or similar to the amount of change in the back focal length (BFL) based on the temperature change. For example, the barrel holder 300-6 may be made of the plastic material which may be easily stretched and contracted based on the temperature change. However, the barrel holder 300-6 is not limited to the plastic material.

The energy generation unit 400-6 may generate a predetermined amount of energy. For example, the energy generation unit 400-6 may be a heat generation device configured to generate the thermal energy. As a specific example, the energy generation unit 400-6 may be the positive temperature coefficient (PTC) heater. However, the energy generation unit 400-6 is not limited to the heat generation device. For example, the energy generation unit 400-6 may be an excitation device or a piezoelectric body configured to generate vibration energy.

The energy generation unit 400-6 may be disposed in the seating portion 204 of the lens barrel 200-6. The energy generation unit 400-6 may have a size substantially the same as or similar to a volume of the seating portion 204. For example, the energy generation unit 400 may have the same disc shape as the seating portion 204. However, the energy generation unit 400-6 is not limited to the disc shape.

The energy generation unit 400-6 may provide energy to the forwardmost lens. For example, the energy generation unit 400-6 may supply the energy to the first lens 110 positioned at the forwardmost of the optical system 100. The energy generation unit 400-6 may be in direct or indirect contact with the first lens 110 to supply the energy to the first lens 110. For example, the energy generation unit 400-6 may be in contact with the flange portion 112 of the first lens 110, and transfer the energy through the flange portion 112.

The energy generation unit 400-6 may remove the foreign matter adhering to the forwardmost lens. As an example, the energy generation unit 400 may remove frost, moisture and water droplet, adhering to the surface of the first lens 110 by heating the first lens 110. As another example, the energy generation unit 400 may vibrate the first lens 110 to remove the foreign matter such as dust or the like, adhering to the surface of the first lens 110.

The energy generation unit 400-6 may provide the energy to the plurality of lenses. For example, the energy generation unit 400 may provide the energy to the second lens 120 in addition to the first lens 110. For example, the energy generation unit 400-6 may be in contact with the second lens 120 disposed in the accommodation space 202, and may transfer the thermal energy and the vibration energy to the second lens 120 as well.

The energy generation unit 400-6 may serve to maintain a constant performance of the optical system 100. For example, the energy generation unit 400 may maintain the first lens 110 and the second lens 120 at the constant temperature, and may thus reduce a possibility that the refractive indices of the first lens 110 and second lens 120 are changed by the external temperature change.

Therefore, the camera module 1006 may remove the foreign matter adhering to the forwardmost lens by using the energy generation unit 400-6, and may simultaneously maintain the constant performance of the optical system 100.

The camera module 1006 may further include a component other than the components described above. For example, the camera module 1006 may further include the housing 500, the substrate 600, the cover member 700, etc.

The housing 500 may accommodate or support the lens barrel 200-6 and the substrate 600. For example, the housing 500 may accommodate the substrate 600 while supporting the lens barrel 200-6 and the substrate 600.

The substrate 600 may include an electronic component required to drive the camera module 1006. For example, the substrate 600 may be equipped with the image sensor 610, the passive element 620, and the like. The electronic components mounted on or embedded in the substrate 600 may be electrically connected to each other. For example, the electric circuit electrically connecting the electronic components to each other may be formed on the one surface of or in the substrate 600. The substrate 600 may provide power and a control signal, necessary to drive the camera module 1006. For example, the connection terminal 630, which is connected to the external power source and the external device, may be formed on the rear surface of the substrate 600. The substrate 600 may be connected to the energy generation unit 400-6. For example, the power supply terminal 640 connected to a power terminal of the energy generation unit 400-6 may be formed on the one surface of the substrate 600. The energy generation unit 400-6 and the power supply terminal 640 may be electrically connected to each other by the power line 642, the flexible substrate, or the like.

The cover member 700 may secure the forwardmost lens to the lens barrel 200-6. For example, the cover member 700 may be coupled to the lens barrel 200-6 while pressing the edge of the first lens 110. The cover member 700 may be adhered or coupled to the lens barrel 200-6. As an example, the cover member 700 may be adhered to the lens barrel 200-6 by the adhesive member. As another example, the cover member 700 may be fastened to the lens barrel 200-6 by a screw coupling. The cover member 700 being adhered to the lens barrel 200-6 by the adhesive member may improve the airtightness between the cover member 700 and the lens barrel 200-6, and the cover member 700 being fastened to the lens barrel 200-6 by the screw coupling may increase the adhesion between the first lens 110 and the lens barrel 200-6 by the cover member 700.

The cover member 700 may be generally made of a material which is the same as or similar to that of the lens barrel 200-6. For example, the cover member 700 may be made of the plastic material. The cover member 700, made of the material which is the same as or similar to that of the lens barrel 200-6, may be excellently coupled, adhered or fastened to the lens barrel 200-6, and may thus significantly reduce the possibility that the front lens (i.e., first lens 110) is separated from the lens barrel 200-6. However, the cover member 700 is not limited to the plastic material. For example, the cover member 700 may be made of the metal material to protect the first lens 110 from an external impact.

The airtight member 800 may be disposed between the first lens 110 and the cover member 700. For example, the airtight member 800 may be disposed between the step portion 117, formed on the edge of the first lens 110, and the cover member 700. The airtight member 800 may be made of the material which may be elastically deformed or compressively deformed. For example, the airtight member 800 may be made of rubber, synthetic rubber, elastomer, or the like. However, the airtight member 800 is not limited to the above-mentioned material. The airtight member 800 may block the gap between the first lens 110 and the cover member 700. For example, the airtight member 800 may be elastically deformed when the cover member 700 and the lens barrel 200 are coupled to each other to block the gap between the first lens 110 and the cover member 700.

Figure 24:
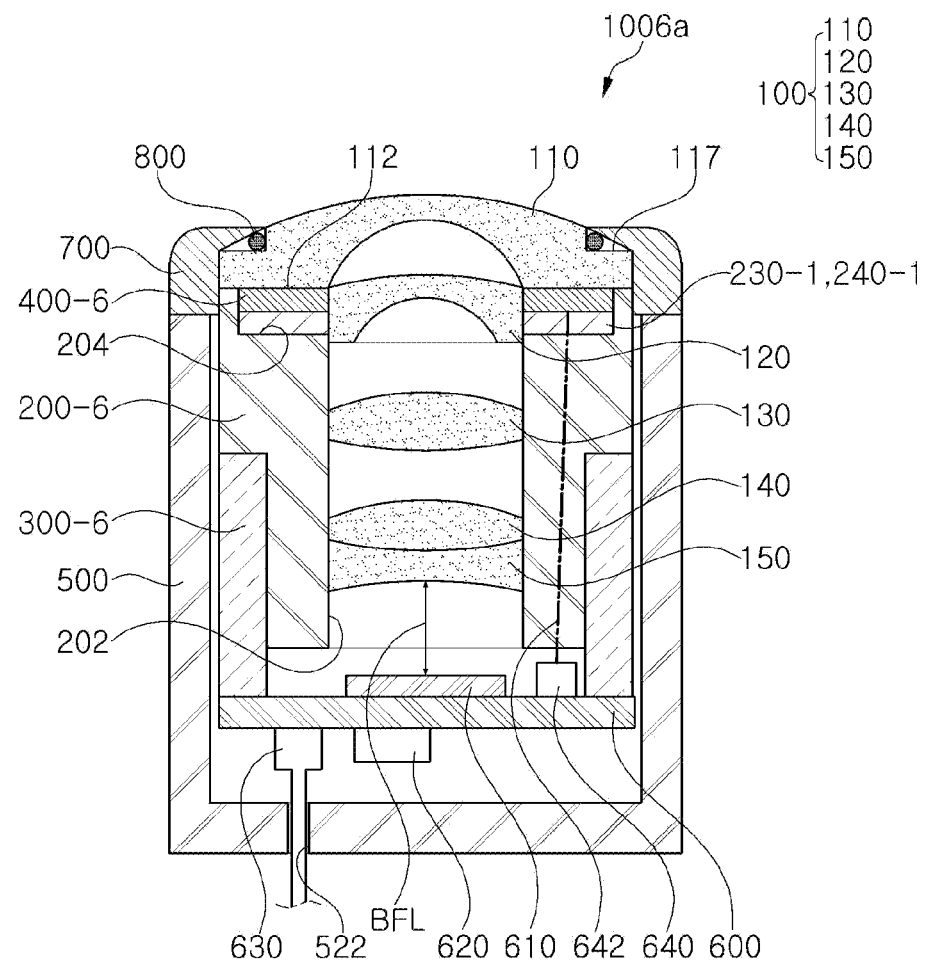
FIG. 24 is a cross-sectional view of a modified example of the camera module shown in FIG. 23.

FIG. 24 illustrates a camera module, according to another embodiment.

Referring to FIG. 24, a camera module 1006a may include the elements of the camera module 1006 of FIG. 23, and may further include a component that may allow the first lens 110 and the energy generation unit 400-6 to be in close contact with each other, or a component that may minimize energy loss occurring between the first lens 110 and the energy generation unit 400-6. For example, the camera module 1006a may further include a buffer member 230-1 or an insulation member 240-1.

In an example in which the camera module 1006a includes the buffer member 230-1, the buffer member 230-1 may be disposed in the seating portion 204 of the lens barrel 200-6. For example, the buffer member 230-1 may be disposed between the seating portion 204 and the energy generation unit 400-6. The buffer member 230-1 may be made of a material that may be elastically deformed or compressively deformed. In addition, the buffer member 230-1 may be made of a material having strong restoring force. For example, the buffer member 230-1 may be made of rubber, synthetic rubber, elastomer, or the like.

The buffer member 230-1 may allow the first lens 110 and the energy generation unit 400-6 to be in close contact with each other. For example, the buffer member 230-1 may press the energy generation unit 400-6 upward for the energy generation unit 400-6 to be in close contact with the flange portion 112 of the first lens 110.

In an example in which the camera module 1006a includes the insulation member 240-1, the insulation member 240-1 may be disposed in the seating portion 204 of the lens barrel 200-6. For example, the insulation member 240-1 may be disposed between the seating portion 204 and the energy generation unit 400-6. The insulation member 240-1 may minimize energy loss. As an example, the insulation member 240-1 may surround an outer surface of the energy generation unit 400-6 except for a portion where the energy generation unit 400 and the first lens 110 are in contact with each other. As another example, the insulation member 240 may surround the outer surface of the energy generation unit -6 except for the portion where the energy generation unit 400-6 and the first lens 110 are in contact with each other and a portion where the energy generation unit 400-6 and the second lens 120 are in contact with each other.

The insulation member 240-1 may be made of a material having low thermal conductivity or a material having low energy transfer rate. For example, the insulation member 240-1 may be made of glass, ceramic, expanded polystyrene, expanded polyurethane, polyethylene, or the like, or may be made of the synthetic material including one or more of the materials described above. However, the insulation member 240-1 is not limited to the above-mentioned materials.

In the camera module 1006a including the insulation member 240-1, most of the energy generated by the energy generation unit 400-6 may be transferred only to the first lens 110 or the first lens 110 and the second lens 120, and may thus have improved efficiency of removing the foreign matter by using the energy generation unit 400-6.

Figure 25:
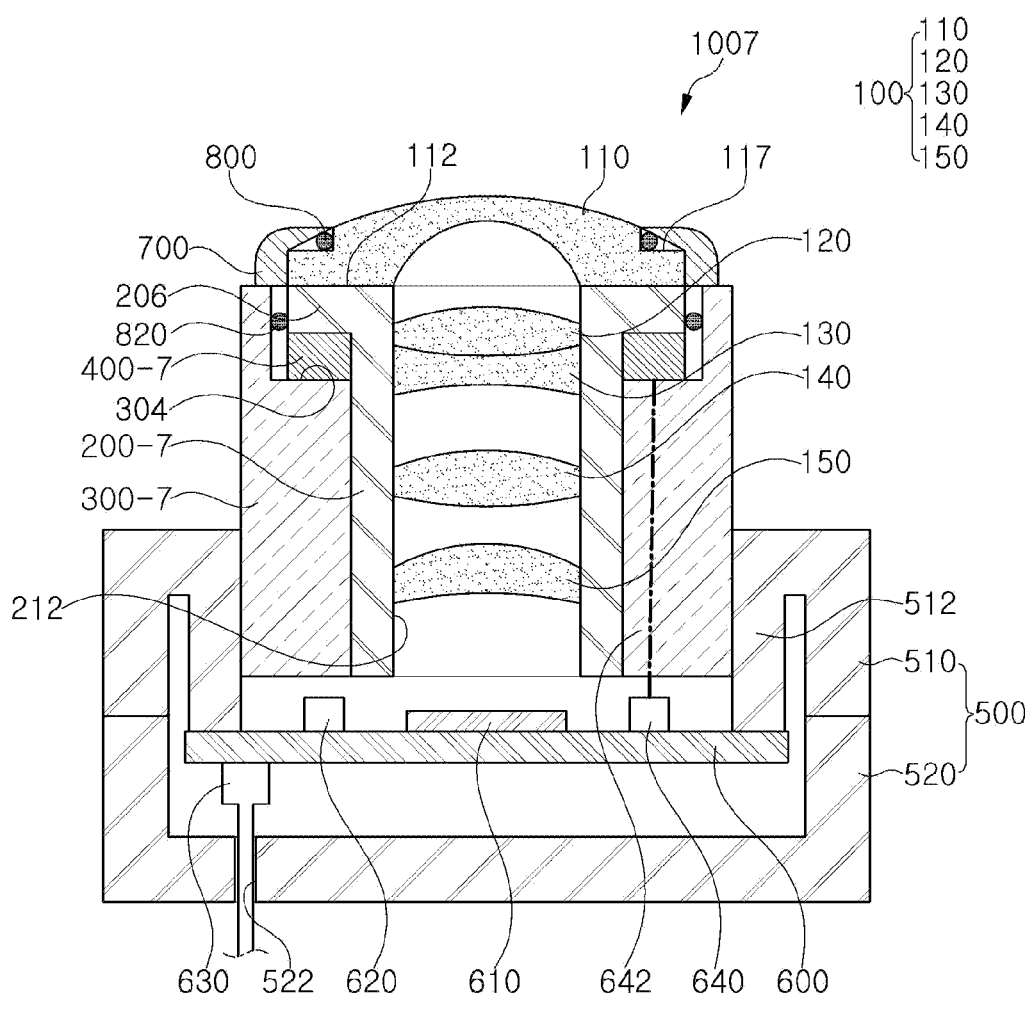
FIG. 25 is a cross-sectional view of a camera module, according to another embodiment.

FIG. 25 illustrates a camera module, according to another embodiment.

Referring to FIG. 25, a camera module 1007 may include the optical system 100, a lens barrel 200-7, a barrel holder 300-7 and an energy generation unit 400-7.

The optical system 100 may form an image at a predetermined position by using the light reflected from a subject. For example, the optical system 100 may have a refractive power to form the image at the predetermined position by using the light incident thereon. The optical system 100 may include the five or more lenses including the first to fifth lenses 110, 120, 130, 140 and 150. However, the number of lenses included in the optical system 100 is not limited to five. For example, the optical system 100 may include four or fewer lenses or include six or more lenses.

The forwardmost lens (i.e., first lens 110) of the optical system 100, which is disposed closest to the object side, may have a diameter larger than that of the other lenses. For example, the first lens 110 may be sized to be in contact with the end of the lens barrel 200-7. Therefore, the first lens 110 may be aligned with the optical axis by the careful adjustment or another process in the state where the first lens 110 is disposed at the end of the lens barrel 200-7.

The lens barrel 200-7 may accommodate the optical system 100. For example, the lens barrel 200-7 may include the accommodation space 202 accommodating the optical system 100. The lens barrel 200 may accommodate one or more of the second to fifth lenses 120 to 150 included in the optical system 100. The lens barrel 200-7 may be made of a material which may easily transfer energy. For example, the lens barrel 200-7 may be made of a metal material. However, the lens barrel -7 is not limited to the metal material.

The lens barrel 200-7 may be in contact with the flange portion 112 of the first lens 110. For example, the lens barrel 200-7 may include a flange portion 206 in contact with the flange portion 112 of the first lens 110. The flange portion 206 of the lens barrel 200 may have substantially the same size as the flange portion 112 of the first lens 110. The flange portion 206 of the lens barrel 200-7 may not necessarily have the same size as the flange portion 112 of the first lens 110. For example, the flange portion 206 of the lens barrel 200-7 may have a larger size or a smaller size than the flange portion 112 of the first lens 110.

The barrel holder 300-7 may be coupled to the lens barrel 200-7. For example, the barrel holder 300-7 may be coupled with the lens barrel 200-7 by a screw coupling, a press-fit, etc. The barrel holder 300-7 may include a space in which the flange portion 206 of the lens barrel 200-7 and the energy generation unit 400-7 are disposed. For example, a seating portion 304 may be formed in the barrel holder 300-7. The seating portion 304 may be sized to accommodate the flange portion 206 of the lens barrel 200-7. For example, the seating portion 304 may have substantially the same size as the flange portion 206.

The energy generation unit 400-7 may generate a predetermined amount of energy. For example, the energy generation unit 400-7 may be a heat generation device configured to generate thermal energy. As a specific example, the energy generation unit 400-7 may be a positive temperature coefficient (PTC) heater. However, the energy generation unit 400-7 is not limited to the heat generation device. For example, the energy generation unit 400-7 may be an excitation device or a piezoelectric body configured to generate vibration energy.

The energy generation unit 400-7 may be disposed in the seating portion 304 of the barrel holder 300-7. In more detail, the energy generation unit 400-7 may be disposed between the seating portion 304 and the flange portion 206. The energy generation unit 400-7 may substantially have a disc shape. However, the energy generation unit 400-7 is not limited to the disc shape.

The energy generation unit 400-7 may provide energy to the forwardmost lens. For example, the energy generation unit 400-7 may supply the energy to the first lens 110 positioned at the forwardmost of the optical system 100. The energy generation unit 400-7 may be in indirect contact with the first lens 110 to supply the energy to the first lens 110. For example, the energy generation unit 400-7 may transfer the energy to the first lens 110 through the lens barrel 200-7.

The energy generation unit 400-7 may remove foreign matter adhering to the forwardmost lens. As an example, the energy generation unit 400-7 may remove frost, moisture and water droplets adhering to the surface of the first lens 110 by providing the thermal energy to the first lens 110. As another example, the energy generation unit 400-7 may provide the vibration energy to the first lens 110 to remove the foreign matter such as dust, adhering to the surface of the first lens 110.

The energy generation unit 400-7 may provide the energy to the plurality of lenses. For example, the energy generation unit 400-7 may provide the energy to the second to fifth lenses 120 to 150 through the lens barrel 200-7. In more detail, the energy generation unit 400-7 may directly heat the lens barrel 200-7 to indirectly heat the second to fifth lenses 120 to 150.

The energy generation unit 400-7 may function to maintain the constant performance of the optical system 100. For example, the energy generation unit 400-7 may heat the lens barrel 200-7 and thus maintain the constant temperature of the second to fifth lenses 120 to 150, as described above. Therefore, the camera module 1007 may remove foreign matter adhering to the forwardmost lens by using the energy generation unit 400-7, and may simultaneously maintain constant performance of the optical system 100.

The camera module 1007 may further include a component other than the components described above. For example, the camera module 1007 may further include the housing 500, the substrate 600, the cover member 700, etc.

The housing 500 (including the upper and lower housings 510 and 520) may accommodate or support the lens barrel 200-7 and the substrate 600. For example, the housing 500 may accommodate the substrate 600 while supporting the lens barrel 200-7 and the substrate 600.

The substrate 600 may include an electronic component required to drive the camera module 1007. For example, the substrate 600 may be equipped with the image sensor 610, the passive element 620 and the like. The electronic components mounted on or embedded in the substrate 600 may be electrically connected to each other. For example, the electric circuit electrically connecting the electronic components to each other may be formed on the one surface of or in the substrate 600. The substrate 600 may provide power and a control signal that are necessary to drive the camera module 1007. For example, the connection terminal 630 connected to the external power source and the external device may be formed on the rear surface of the substrate 600. The substrate 600 may be connected to the energy generation unit 400-7. For example, the power supply terminal 640 connected to the power terminal of the energy generation unit 400-7 may be formed on the one surface of the substrate 600. The energy generation unit 400-7 and the power supply terminal 640 may be electrically connected to each other by the power line 642, the flexible substrate or the like.

The cover member 700 may secure the forwardmost lens to the lens barrel 200-7. For example, the cover member 700 may be coupled to the lens barrel 200-7 while pressing the edge of the first lens 110. The cover member 700 may be adhered or coupled to the lens barrel 200-7. As an example, the cover member 700 may be adhered to the lens barrel 200-7 by the adhesive member. As another example, the cover member 700 may be fastened to the lens barrel 200-7 by screw coupling. The cover member 700 being adhered to the lens barrel 200-7 by the adhesive member may improve the airtightness between the cover member 700 and the lens barrel 200-7, and the latter example may increase the adhesion between the first lens 110 and the lens barrel 200-7 by the cover member 700.

The cover member 700 may be generally made of the material that is the same as or similar to that of the lens barrel 200-7. For example, the cover member 700 may be made of a plastic material. The cover member 700, which is made of the material which is the same as or similar to that of the lens barrel 200-7, may be excellently coupled, adhered or fastened to the lens barrel 200-7, and may thus significantly reduce the possibility that the front lens (i.e., first lens 110) is separated from the lens barrel 200-7. However, the cover member 700 is not limited to the plastic material. For example, the cover member 700 may be made of a metal material to protect the first lens 110 from the external impact.

The airtight member 800 may be disposed between the first lens 110 and the cover member 700. For example, the airtight member 800 may be disposed between the step portion 117, formed on the edge of the first lens 110, and the cover member 700. The airtight member 800 may be made of the material that may be elastically deformed or compressively deformed. For example, the airtight member 800 may be made of rubber, synthetic rubber, elastomer, or the like. However, the airtight member 800 is not limited to the above-mentioned material. The airtight member 800 may block the gap between the first lens 110 and the cover member 700. For example, the airtight member 800 may be elastically deformed when the cover member 700 and the lens barrel 200-7 are coupled to each other to block the gap between the first lens 110 and the cover member 700.

The camera module 1007 may further include another airtight member. For example, an airtight member 820 may be additionally disposed between the second lens barrel 200-7 and the barrel holder 300-7. The airtight member 820 may block external air and moisture from penetrating through a gap between the lens barrel 200-7 and the barrel holder 300-7. For example, the airtight member 820 may be disposed between a top end of the lens barrel 200-7 and a top end of the barrel holder 300-7. The airtight member 820 may allow the lens barrel 200-7 to be aligned with the optical axis based on the barrel holder 300-7. For example, the airtight member 820 may have predetermined elastic force and elastic deformation force, and may thus allow the lens barrel 200-7 to be aligned with the optical axis based on the barrel holder 300.

FIGS. 26A through 27B illustrate other types of a lens barrel and an energy generation unit, according to embodiments.

The lens barrel and the energy generation unit may have improved efficiency of supplying the energy transferred to the first lens 110. As an example, the lens barrel and the energy generation unit may allow the energy generation unit and the first lens 110 to be in direct contact with each other. As another example, the lens barrel may further include a member having high energy transfer efficiency.

Figure 26A:
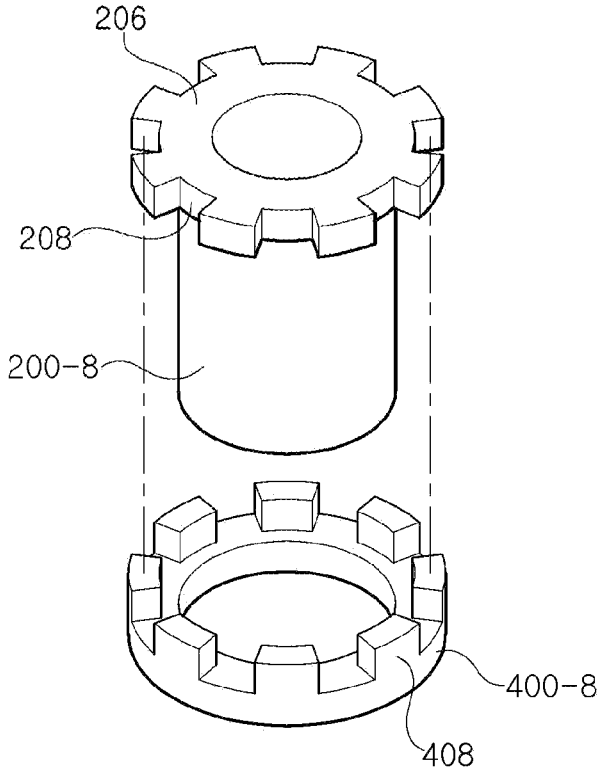
FIGS. 26A through 27B are exploded perspective views of other types of a lens barrel and an energy generation unit.
Figure 26B:
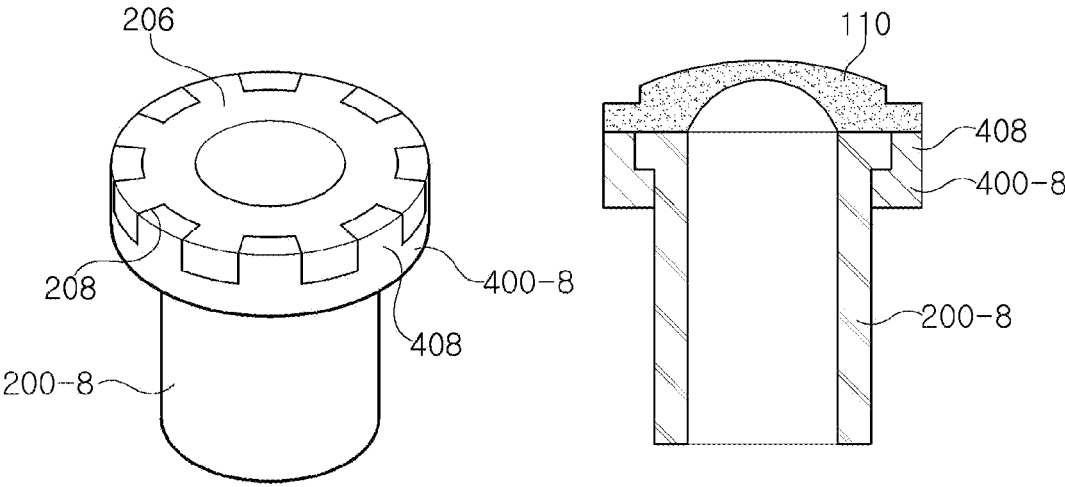

Referring to FIGS. 26A and 26B, a lens barrel 200-8 and energy generation unit 400-8 may have grooves and protrusions, respectively. For example, a plurality of grooves 208 may be formed in the flange portion 206 of a lens barrel 200-8, and a plurality of protrusions 408 may be formed in an energy generation unit 400-8. The grooves 208 may penetrate through the flange portion 206 in a vertical direction, and may be spaced apart from each other in a circumferential direction of the flange portion 206. The same number of protrusions 408 may be disposed in the grooves 208, and the protrusion 408 may be inserted into the groove 208 to protrude at the same height as a top surface of the flange portion 206 or higher than the top surface of the flange portion 206.

The lens barrel 200-8 and energy generation unit 400-8 may be coupled to each other by the grooves 208 and protrusions 408. For example, the energy generation unit 400-8 may be coupled to the lens barrel 200 by the protrusion 408 inserted into the groove 208.

The energy generation unit 400-8 may be in direct contact with the first lens 110. For example, the energy generation unit 400-8 may be in direct contact with the first lens 110 by the protrusion 408 exposed or protruding from the surface of the flange portion 206. Therefore, the energy of the energy generation unit 400-8 may be rapidly transferred to the first lens 110 through the protrusion 408, thereby removing foreign matter adhering to the surface of the first lens 110.

Figure 27A:
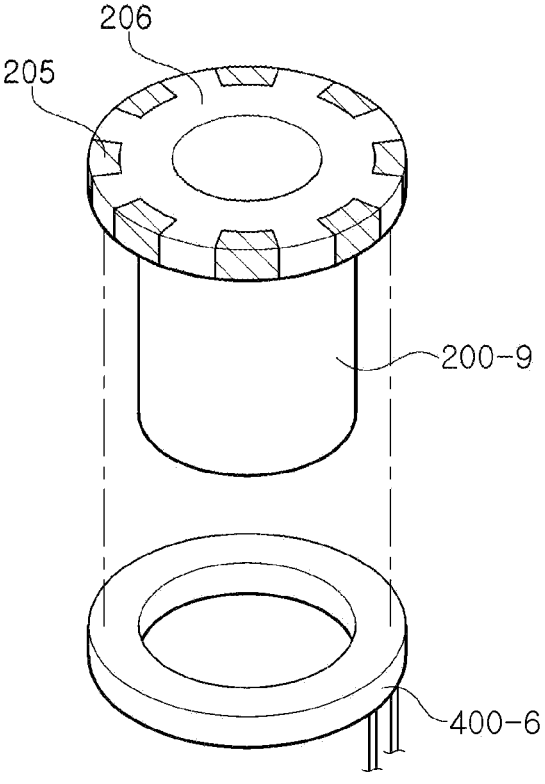
Figure 27B:
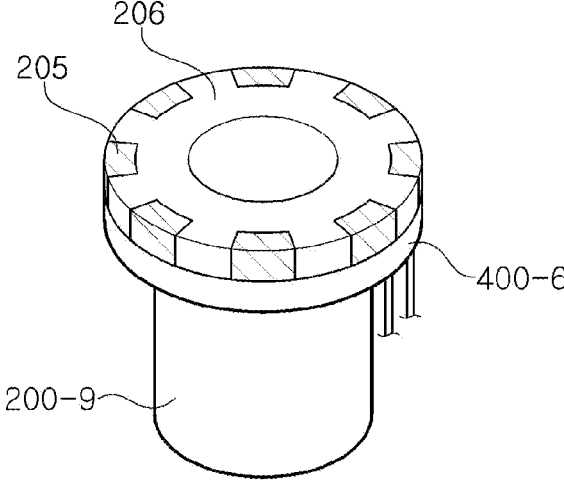

FIGS. 27A and 27B illustrate another type of the lens barrel, according to an embodiment.

Referring to FIGS. 27A and 27B, a lens barrel 200-9 may include a component configured to rapidly transfer the energy of the energy generation unit 400-6. For example, a reinforcing member 205 may be formed on the flange portion 206 of the lens barrel 200-9. The reinforcing member 205 may be made of a different material from that of the lens barrel 200-9. For example, the lens barrel 200-9 may be made of a plastic material, and the reinforcing member 205 may be made of a metal material. However, the material of the reinforcing member 205 is not limited to the metal. For example, the reinforcing member 205 may be made of any other material as long as the reinforcing member 205 may transfer thermal energy and vibration energy. As an example, the reinforcing member 205 may be made of a ceramic material which may transfer vibration energy. The reinforcing member 205 may be integrally formed with the lens barrel 200-9. For example, the reinforcing member 205 may be integrally formed with the flange portion 206 of the lens barrel 200-9 by insert injection. However, the reinforcing member 205 is not limited to being formed by the insert injection method.

The energy generated by the energy generation unit 400-6 may be transferred to the first lens 110 through the reinforcing member 205. For example, the thermal energy of the energy generation unit 400-6 may be rapidly transferred to the first lens 110 through the reinforcing member 205 made of the metal material, and may hardly be transferred to the first lens 110 through the lens barrel 200-9 and the flange portion 206 made of the plastic material. Accordingly, the energy generated by the energy generation unit 400-6 may be transferred to none of the second to fifth lenses 120 to 150 accommodated in the lens barrel 200-9. That is, the lens barrel 200-9 may transfer most of the energy generated by the energy generation unit 400-6 only to the first lens 110.

Therefore, the lens barrel 200-9 and the energy generation unit 400-6 may be useful for rapidly removing foreign matter adhering to the first lens 110.

Figure 28:
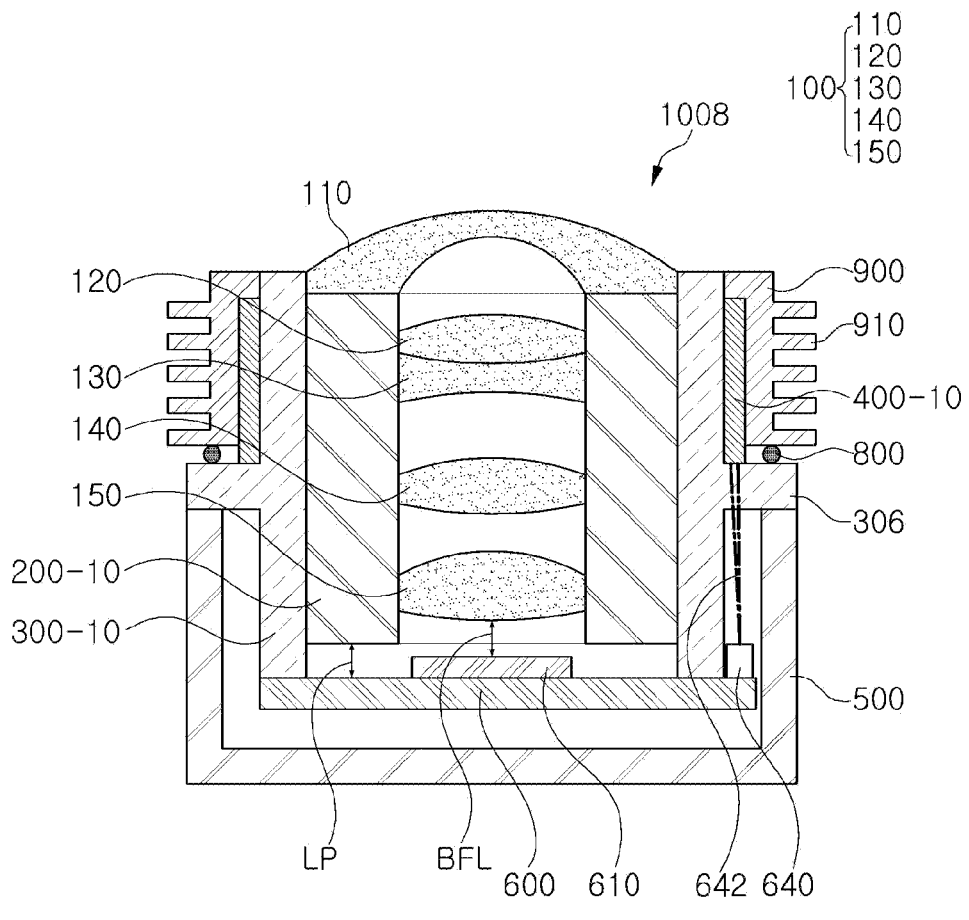
FIG. 28 is a cross-sectional view of a camera module, according to another embodiment.

FIG. 28 illustrates a camera module, according to another embodiment.

Referring to FIG. 28, a camera module 1008 may include the optical system 100, a lens barrel 200-10, a barrel holder 300-10, an energy generation unit 400-10 and a heat dissipation member 900.

The optical system 100 may form an image at a predetermined position by using the light reflected from a subject. For example, the optical system 100 may have a refractive power to form the image at the predetermined position by using the light incident thereon. The optical system 100 may include the plurality of lenses. For example, the optical system 100 may include the five or more lenses including the first to fifth lenses 110, 120, 130, 140 and 150. However, the number of lenses included in the optical system 100 is not limited to five. For example, the optical system 100 may include four or fewer lenses or include six or more lenses.

The forwardmost lens (i.e., first lens 110) of the optical system 100, which is disposed closest to the object side, may have a larger diameter than the other lenses. For example, the first lens 110 may be sized to be in contact with the end of the lens barrel 200-10.

The optical system 100 may further include another component in addition to the lens. For example, the optical system 100 may further include a filter member configured to block the infrared light. However, the additional component of the optical system 100 is not limited to the filter member. For example, the optical system 100 may further include a stop disposed between the lens and the lens to control the amount of light, the spacer maintaining a constant distance between the lens and the lens, etc. However, the optical system 100 may not necessarily include the filter member, the stop, the spacer, and the like. For example, the optical system 100 may omit the filter member or the spacer as needed.

The optical system 100 may have a predetermined angle of view. For example, the optical system 100 may have an angle of view of 120 degrees or more to simultaneously capture the image over a wide area. However, the angle of view of the optical system 100 is not limited to 120 degrees or more. For example, the optical system 100 may have an angle of view of less than 120 degrees.

The lens barrel 200 may accommodate the optical system 100. For example, the lens barrel 200-10 may include the accommodation space accommodating the optical system 100. The lens barrel 200-10 may accommodate one or more of the first to fifth lenses 110 to 150 included in the optical system 100. For example, the lens barrel 200-10 may accommodate the second to fifth lenses 120 to 150.

The lens barrel 200-10 may generally have a cylindrical shape. However, the lens barrel 200-10 is not limited to the cylindrical shape. For example, the lens barrel 200 may have the shape of a quadrangular prism, a rectangular prism, or the like based on a cross-sectional shape of the lenses.

The lens barrel 200-10 may minimize change in the performance of the optical system 100 based on the change in the temperature of the external environment. For example, the lens barrel 200-10 may be made of a material having low thermal conductivity to minimize the external heat or cold air from being transferred to the first to fifth lenses 120, 130, 140 and 150 in the accommodation space. For example, the lens barrel 200-10 may be made of a plastic material. However, the lens barrel 200-10 is not limited to the plastic material.

The barrel holder 300-10 may be coupled to the lens barrel 200-10. For example, the barrel holder 300-10 may be coupled with the lens barrel 200-10 by a screw coupling, a press-fit, adhesive fixation, etc. The barrel holder 300 may secure the lens barrel 200-10 to a body of the camera module 1008. For example, the barrel holder 300-10 may be fixed to the housing 500 while being coupled with the lens barrel 200. The barrel holder 300-10 may be coupled with the substrate 600. For example, the barrel holder 300-10 may be coupled with the substrate 600 by using the bolt, the screw, an adhesive, or the like. The barrel holder 300-10 may adjust a distance between the lens barrel 200-10 and the substrate 600. For example, the barrel holder 300-10 may change a position where the barrel holder 300-10 is coupled with the lens barrel 200-10 to adjust a distance (LP) from an end of the lens barrel 200-10 to the substrate 600 and the back focal length (BLF, that is, the distance from the image side of the rearmost lens 150 to the top surface of the image sensor 610) of the optical system 100.

Figure 29A:
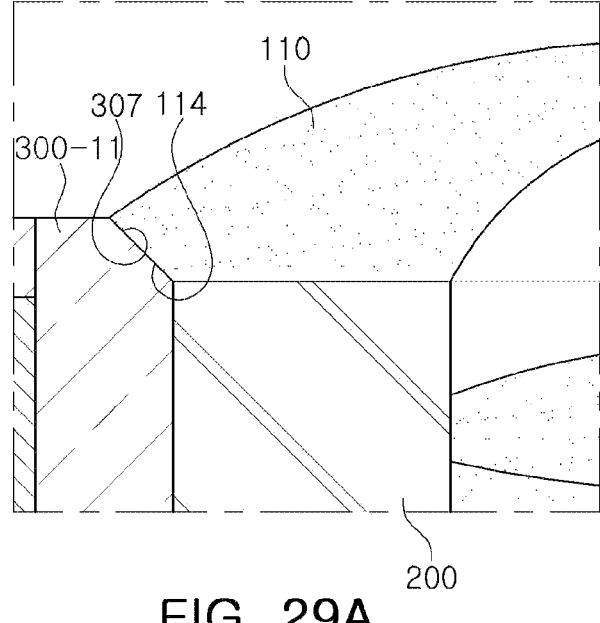
FIGS. 29A and 29B are cross-sectional views each illustrating modified examples of a first lens and a barrel holder that are coupled to each other.
Figure 29B:
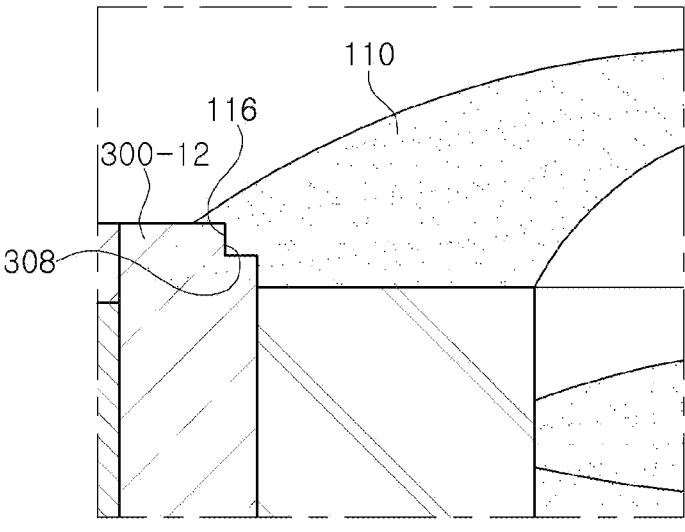

The barrel holder 300-10 may be in contact with the forwardmost lens. For example, the barrel holder 300-10 may be in contact with an outer circumferential surface of the first lens 110. In modified examples, a barrel holder and the first lens 110 may maximize an area in which the barrel holder and the first lens 110 are in contact with each other. As an example, a barrel holder 300-11 and the first lens 110 may increase the contact area therebetween by using an inclined surface 307 and the inclined surface 114 in contact with each other, as shown in FIG. 29A. As another example, a barrel holder 300-12 and the first lens 110 may increase the contact area therebetween by using a stair 308 and a stair 116 meshing with each other, as shown in FIG. 29B. The barrel holder 300-11/300-12 and the first lens 110 as described above may allow the barrel holder 300-11/300-12 and the first lens 110 to have improved coupling force therebetween, and allow energy to be easily transferred between the barrel holder 300-11/300-12 and the first lens 110. It is to be understood that the following description of the barrel holder 300-10 of FIG. 28 also applies to the barrel holders 300-1 and 300-12 of FIGS. 29A and 29B.

The barrel holder 300-10 may be made of a material that may easily transfer the energy generated from the energy generation unit 400. For example, the barrel holder 300-10 may be made of a metal material having high thermal conductivity. However, the barrel holder 300-10 is not limited to the metal material.

The barrel holder 300-10 may be coupled with the housing 500. For example, the barrel holder 300-10 may be coupled with the housing 500 by a screw coupling, a press-fit, the adhesive, etc. The barrel holder 300-10 may include a component determining a portion where the barrel holder 300-10 is fixed to the housing 500. For example, the barrel holder 300-10 may include a flange portion 306 in contact with an end of the housing 500. The flange portion 306 may be fixed to the housing 500 by the adhesive.

The energy generation unit 400-10 may be disposed in the barrel holder 300-10. For example, the energy generation unit 400-10 may be disposed on an outer circumferential surface of the barrel holder 300-10. The energy generation unit 400-10 may provide the energy to the first lens 110. For example, the energy generation unit 400-10 may indirectly provide the energy to the first lens 110 through the barrel holder 300-10. The energy generation unit 400-10 may easily provide the energy to the first lens 110. For example, the energy generation unit 400-10 may be disposed adjacent to the first lens 110 on the outer circumferential surface of the barrel holder 300-10. However, the position at which the energy generation unit 400-10 is disposed is not limited to the above-described position.

Figure 30A:
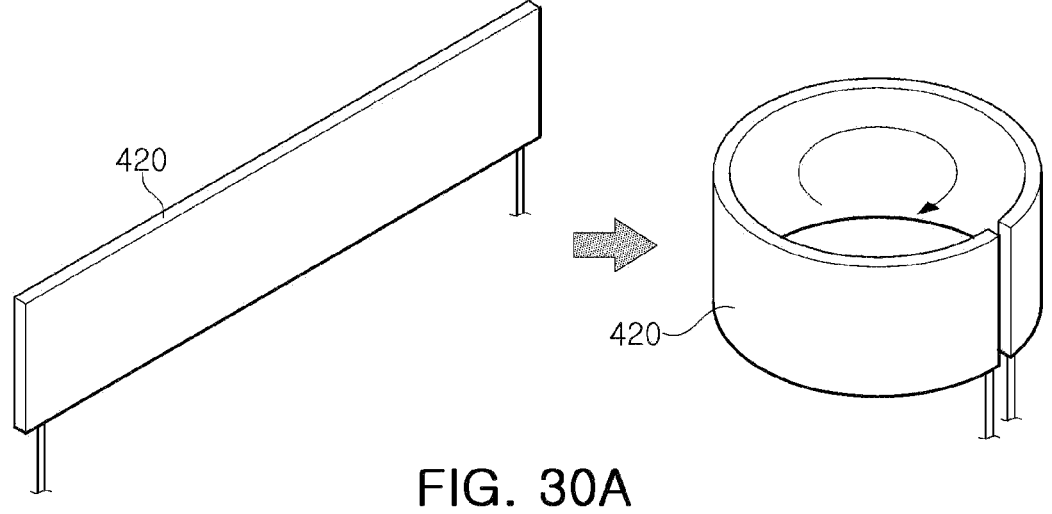
FIGS. 30A and 30B are perspective views of modified examples of an energy generation unit.
Figure 30B:
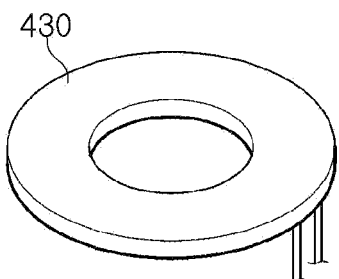

The energy generation unit 400-10 may generate a predetermined amount of energy. As an example, the energy generation unit 400-10 may provide the thermal energy. As an example, the energy generation unit 400-10 may be a PTC heater 420, as shown in FIG. 30A. The PTC heater 420 may have a film shape. The film-shaped PTC heater 420 may be freely bent to be deformed, and may thus be easily attached or disposed on the outer circumferential surface of the barrel holder 300-10. However, the shape of heat generation device 410-10 is not limited to the PTC heater. In addition, a PTC heater is not limited to the film shape. For example, a PTC heater 420 may have the disk shape, similar to the shape of a vibration device 430 shown in FIG. 30B.

As another example, the energy generation unit 400-10 may provide the vibration energy. As a specific example, the energy generation unit 400-10 may be the vibration device 430. The vibration device may generally have a disk shape similar to that shown for the PTC heater 430 in FIG. 30B. However, the vibration device is not limited to the disk shape.

The heat dissipation member 900 may be disposed on the barrel holder 300-10. For example, the heat dissipation member 900 may be disposed on the outer circumferential surface of the barrel holder 300-10. However, the position at which the heat dissipation member 900 is disposed is not limited to the outer circumferential surface of the barrel holder 300. The heat dissipation member 900 may easily dissipate heat. As an example, the heat dissipation member 900 may be made of copper, aluminum, or an alloy of copper and aluminum, having high thermal conductivity. However, the heat dissipation member 900 is not limited to the material of copper or aluminum. As another example, the heat dissipation member 900 may include a plurality of heat dissipation fins 910 to increase a contact area between the heat dissipation member 900 and the external air. The heat dissipation fin 910 may be formed on a surface of the heat dissipation member 900 to outwardly dissipate heat transferred to the heat dissipation member 900.

The heat dissipation member 900 may prevent overheating of the camera module 1008. As an example, the heat dissipation member 900 may prevent overheating of the optical system 100. As a specific example, the heat dissipation member 900 may absorb heat from the first lens 110 overheated by the incident light thereon, and dissipate the heat outward. Alternatively, the heat dissipation member 900 may absorb heat from the first lens 110 overheated by the energy generation unit 400-10, and dissipate the heat outward. The heat of the first lens 110 may be transferred to the heat dissipation member 900 through the metal barrel holder 300-10. As another example, the heat dissipation member 900 may prevent overheating of a control device of the camera module 1008. As a specific example, the heat dissipation member 900 may absorb heat from the substrate 600 and the image sensor 610 through the metal barrel holder 300-10 to dissipate the heat outward. As yet another example, the heat dissipation member 900 may prevent overheating of the energy generation unit 400-10. For example, the heat dissipation member 900 may be in direct contact with the energy generation unit 400-10, thereby dissipating outward, some of the heat generated during an operation of the energy generation unit 400-10.

The camera module 1008 may further include a component other than the components described above. For example, the camera module 1008 may further include the housing 500, the substrate 600, the cover member 700, etc.

The housing 500 may accommodate or support the lens barrel 200-10, barrel holder 300-10, and the substrate 600. For example, the housing 500 may accommodate the lens barrel 200-10, the barrel holder 300-10, and the substrate 600, and may be coupled with the barrel holder 300-10 to firmly support the lens barrel 200-10 and the substrate 600 for the lens barrel 200 and the substrate 600 not to be shaken by the external impact.

The substrate 600 may include an electronic component required to drive the camera module 1008. For example, the substrate 600 may be equipped with the image sensor 610, the passive element 620, and the like. The electronic components mounted on or embedded in the substrate 600 may be electrically connected to each other. For example, the electric circuit electrically connecting the electronic components to each other may be formed on the one surface of or in the substrate 600. The substrate 600 may provide power and a control signal that are necessary to drive the camera module 1008. For example, the connection terminal 630 connected to the external power source and the external device may be formed on the rear surface of the substrate 600. The substrate 600 may be connected to the energy generation unit 400-10. For example, the power supply terminal 640 connected to the power terminals 402 and 404 of the energy generation unit 400-10 may be formed on the one surface of the substrate 600. The energy generation unit

400-10 and the power supply terminal 640 may be electrically connected to each other by the power line 642, the flexible substrate, or the like.

The airtight member 800 may maintain the airtightness of the energy generation unit 400-10. For example, the airtight member 800 may be disposed between the barrel holder 300-10 and the heat dissipation member 900. However, the position where the airtight member 800 is disposed is not limited to the position between the barrel holder 300-10 and the heat dissipation member 900. For example, the airtight member 800 may also be disposed between the first lens 110 and the barrel holder 300-10, between the lens barrel 200-10 and the barrel holder 300-10, etc. The airtight member 800 may be made of a material that may be elastically deformed or compressively deformed. For example, the airtight member 800 may be made of rubber, synthetic rubber, elastomer or the like. However, the airtight member 800 is not limited to the above-mentioned material. The airtight member 800 may block the gap between the first lens 110 and the cover member 700. For example, the airtight member 800 may be elastically deformed when the cover member 700 and the lens barrel 200-10 are coupled to each other to block the gap between the first lens 110 and the cover member 700.

The camera module 1008 configured may remove foreign matter adhering to the front lens (i.e., first lens 110). For example, the camera module 1008 may evaporate a liquid foreign material such as a raindrop, frost, dew and moisture adhering to the surface of the first lens 110, thereby removing the same. In addition, the camera module 1008 may absorb the heat of the first lens 110 and substrate 600 through the heat dissipation member 900 to prevent the overheating of the first lens 110 and substrate 600.

Figure 31:
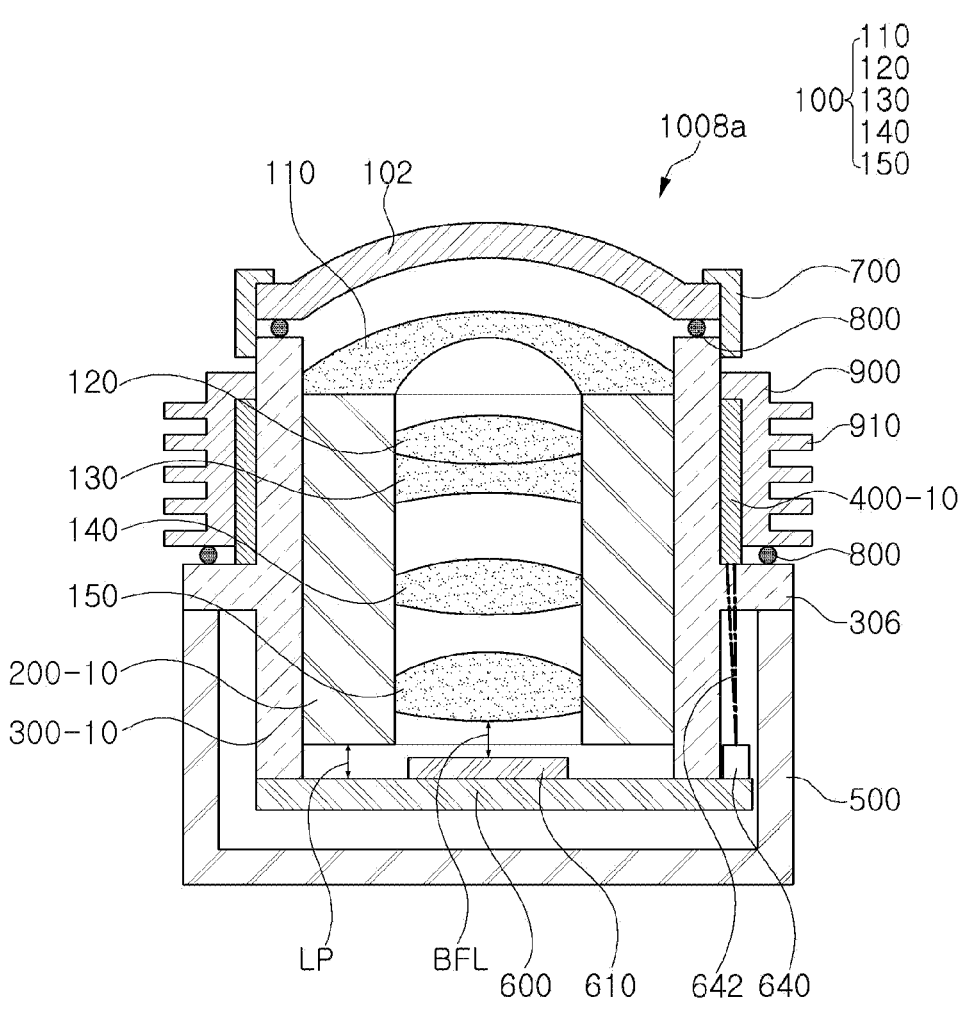
FIG. 31 is a cross-sectional view of a modified example of the camera module shown in FIG. 28.

FIG. 31 illustrates a camera module, according to another embodiment.

Referring to FIG. 31, a camera module 1008a may further include the glass cover panel 102, in addition to the elements included in the camera module 1008 in FIG. 28. The glass cover panel 102 may be disposed in front of the first lens 110. The glass cover panel 102 may not affect the performance of the optical system 100. For example, the glass cover panel 102 may transmit the light incident thereon as it is, without refracting the light. The glass cover panel 102 may be resistant to an external impact. For example, the glass cover panel 102 may be made of the glass material resistant to an external impact. However, the material of the glass cover panel 102 is not limited to the glass.

The glass cover panel 102 may be coupled with the barrel holder 300-10. For example, the glass cover panel 102 may be coupled to the barrel holder 300-10 by a separate fixation member 700. However, the coupling between the glass cover panel 102 and the barrel holder 300-10 is not limited to the coupling therebetween by the fixation member 700. As an example, the glass cover panel 102 may be adhered to the barrel holder 300-10 by an adhesive.

The energy generation unit 400-10 may provide the energy to the first lens 110. In addition, the energy generation unit 400-10 may provide additional energy to the glass cover panel 102. For example, energy generated from the energy generation unit 400-10 may be transferred to the first lens 110 through the barrel holder 300-10 to heat the first lens 110, and heat radiant from the heated first lens 110 may be transferred to the glass cover panel 102. The energy provided to the glass cover panel 102 may remove the foreign matter adhering to the glass cover panel 102. As an example, the thermal energy provided to the glass cover panel 102 may evaporate frost, moisture, a water droplet, or the like, adhering to the surface of the glass cover panel 102.

As another example, vibration energy provided to the glass cover panel 102 may separate dust adhering to the surface of the glass cover panel 102 therefrom.

The energy generation unit 400-10 may be selected from the heat generation device, the vibration device, etc. As an example, the energy generation unit 400-10 may be the PTC heater 420 in the film shape shown in FIGS. 29A and 29B. As another example, the energy generation unit 400-10 may be the vibration device 430 shown in FIGS. 30A and 30B. As yet another example, the energy generation unit 400-10 may have a shape in which the PTC heater 420 and the vibration device 430 are integrated with each other. However, the energy generation unit 400-10 is not limited to the above-mentioned devices.

In the camera module 1008a, the glass cover panel 102 may be disposed in front of the first lens 110, and it is thus possible to reduce a possibility that the first lens 110 is damaged by an external impact. In addition, the camera module 1008a may remove foreign matter adhering to the glass cover panel 102 as well as the first lens 110 by using the energy generation unit 400-10, thereby reducing resolution degradation and a blocked field of view caused by the foreign matter.

A camera module, according to other embodiments, may provide energy to an optical member positioned at a forwardmost position of the camera module. For example, the camera module may provide the energy to a forwardmost lens or a forwardmost glass cover panel to remove the foreign matter adhering to the forwardmost lens or forwardmost glass cover panel.

Figure 32:
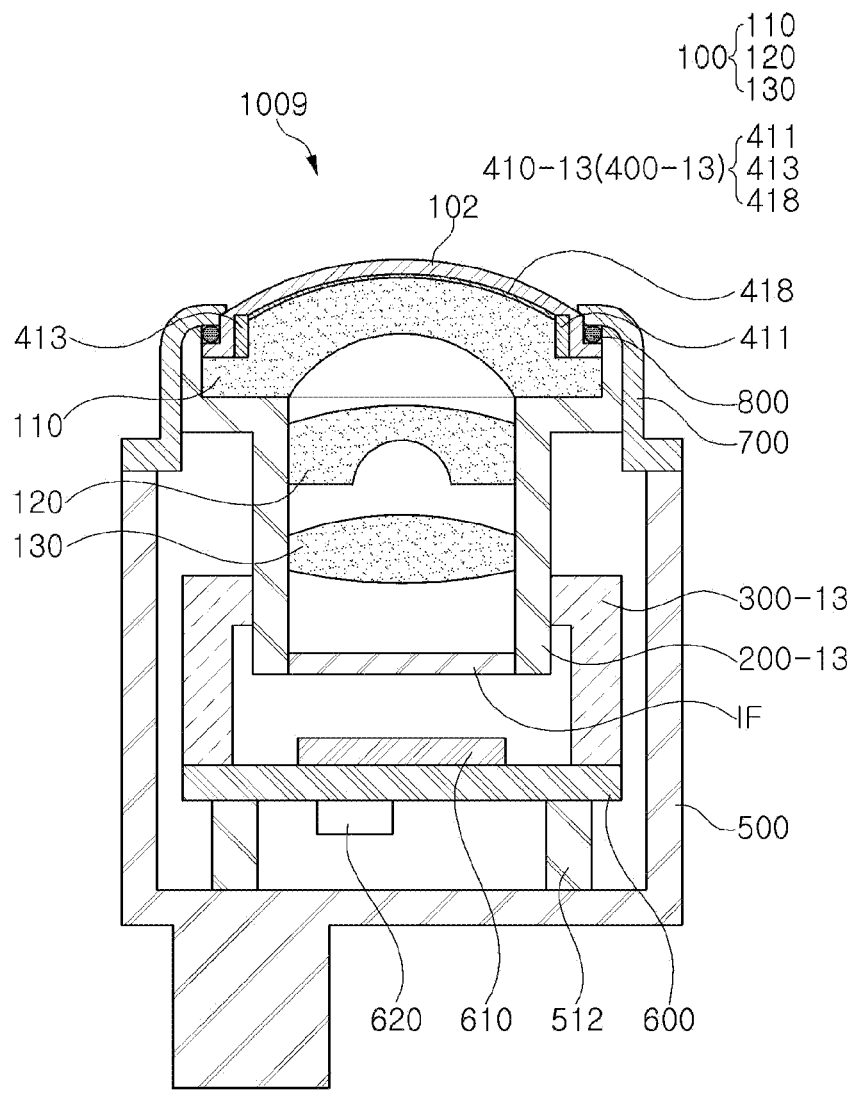
FIGS. 32 through 34 are cross-sectional views of a camera module, according to another embodiment.

FIG. 32 illustrates a camera module configured to provide energy to an optical member positioned at the forwardmost position of a camera module, according to an embodiment.

Referring to FIG. 32, a camera module 1009 may include the optical system 100, a lens barrel 200-13, a barrel holder 300-13, an energy generation unit 400-13, the housing 500, the substrate 600, and the cover member 700.

The optical system 100 may form an image at a predetermined position by using the light reflected from a subject. For example, the optical system 100 may have a refractive power to form the image at the predetermined position by using the light incident thereon. The optical system 100 may include three or more lenses including the first to third lenses 110, 120 and 130. However, the number of lenses included in the optical system 100 is not limited to three. For example, the optical system 100 may include four or more lenses.

The optical system 100 may further include another component in addition to the first to third lenses 110, 120 and 130. For example, the optical system 100 may further include a filter member (IF) configured to block infrared light. However, the additional component of the optical system 100 is not limited to the filter member (IF). For example, the optical system 100 may further include a stop disposed between the lens and the lens to control the amount of light, a spacer maintaining a constant distance between the lens and the lens, etc. However, the optical system 100 may not necessarily include the filter member, the stop, and the spacer. For example, the optical system 100 may omit the filter member or the spacer as needed.

The optical system 100 may have a predetermined angle of view. For example, the optical system 100 may have an angle of view of 120 degrees or more to simultaneously capture the image over a wide area. However, the angle of view of the optical system 100 is not limited to 120 degrees or more. For example, the optical system 100 may have an angle of view of less than 120 degrees.

The optical system 100 may further include the glass cover panel 102. The glass cover panel 102 may be disposed in front of the first lens 110. The glass cover panel 102 may not affect the performance of the optical system 100. For example, the glass cover panel 102 may transmit the light incident thereon as it is, without refracting the light. The glass cover panel 102 may be resistant to an external impact. For example, the glass cover panel 102 may be made of the glass material resistant to an external impact. However, the material of the glass cover panel 102 is not limited to the glass.

The lens barrel 200-13 may accommodate the optical system 100. For example, the lens barrel 200 may include the accommodation space accommodating the optical system 100. The lens barrel 200-13 may generally have the cylindrical shape. However, the lens barrel 200-13 is not limited to the cylindrical shape. For example, the lens barrel 200-13 may have the shape of a quadrangular prism, a rectangular prism, or the like, based on a cross-sectional shape of the lenses.

The lens barrel 200-13 may minimize the change in the performance of the optical system 100 based on the change in the temperature of the external environment. For example, the lens barrel 200-13 may be made of a material having low thermal conductivity to minimize the external heat or cold air from being transferred to the first to third lenses 110, 120 and 130 in the accommodation space. For example, the lens barrel 200-13 may be made of a plastic material. However, the lens barrel 200-13 is not limited to the plastic material.

The barrel holder 300-13 may be coupled to the lens barrel 200-13 and the substrate 600. For example, one end of the barrel holder 300-13 may be coupled to the lens barrel 200-13, and the other end thereof may be coupled to the substrate 600. The barrel holder 300-13 may adjust the distance between the lens barrel 200 and the substrate 600. For example, the barrel holder 300-13 may change a position at which the barrel holder 300-13 is coupled with the lens barrel 200-13 to adjust the distance from an end of the lens barrel 200-13 to the substrate 600.

The barrel holder 300-13 may be made of a material that is substantially the same as or similar to that of the lens barrel 200-13. For example, the barrel holder 300-13 may be made of a plastic material. However, the barrel holder 300-13 is not limited to a plastic material. For example, the barrel holder 300-13 may be made of any other material as long as the barrel holder 300-13 may be adhered or fastened to the lens barrel 200-13.

The energy generation unit 400-13 may remove foreign matter adhering to the glass cover panel 102. For example, the energy generation unit 400-13 may be disposed between the glass cover panel 102 and the first lens 110 to directly provide energy required to remove the foreign matter adhering to the glass cover panel 102 from the glass cover panel 102. However, the energy generation unit 400-13 is not limited to the above-described shape.

The energy generation unit 400-13 may generate thermal energy. For example, the energy generation unit 400-13 may be a heat generation device 410-13 including power terminals 411 and 413 and a heating member 418. The power terminals 412-13 and 414 may be electrically connected to the substrate 600. For example, the power terminals 411 and 413 may be connected to the power supply terminal of the substrate 600 by the flexible substrate or a wire. However, the electrical connection between the power terminals 411 and 413 and the substrate 600 is not limited to the flexible substrate and the wire. For example, the power terminals 411 and 413 may be electrically connected to the substrate 600 by a molded interconnected device MID (e.g., printed circuit) formed on the lens barrel 200-13 and the barrel holder 300-13.

The heating member 418 may be formed on one surface of the first lens 110. For example, the heating member 418 may be formed on the object-side surface of the first lens 110. However, the position at which the heating member 418 is formed is not limited to the surface of the first lens 110. For example, the heating member 418 may be formed on one surface of the glass cover panel 102. The heating member 418 may remove liquid foreign material adhering to the first lens 110 and glass cover panel 102. For example, the heating member 418 may heat the first lens 110 or the glass cover panel 102, thereby evaporating the liquid foreign material adhering to the first lens 110 or glass cover panel 102. The heating member 418 may be a resistor that dissipates heat by electric current supplied from the power terminals 411 and 413. The heating member 418 may be disposed between the glass cover panel 102 and the first lens 110. For example, the heating member 418 may have the film shape to be disposed in a narrow space between the glass cover panel 102 and the first lens 110. However, the heating member 418 may not necessarily have the film shape. The heating member 418 may have a shape allowing the light to pass therethrough. For example, the heating member 418 may be a transparent film on which an indium tin oxide (ITO) electrode is formed.

The housing 500 may accommodate or support the lens barrel 200-13, the barrel holder 300-13 and the substrate 600. For example, the housing 500 may accommodate the lens barrel 200, the barrel holder 300 and the substrate 600, and may firmly support the substrate 600 by interposing a support member 512 therebetween. The housing 500 may be made of the material resistant to the external impact. For example, the housing 500 may be made of the metal material. However, the housing 500 is not limited to the metal material. For example, the housing 500 may be made of the material which is the same as or similar to that of the barrel holder 300-13 to be easily bonded or fused to the barrel holder 300-13.

The substrate 600 may include an electronic component required to drive the camera module 1009. For example, the substrate 600 may be equipped with the image sensor 610, the passive element 620, and the like. The electronic components mounted on or embedded in the substrate 600 may be electrically connected to each other. For example, the electric circuit electrically connecting the electronic components to each other may be formed on the one surface of or in the substrate 600. The substrate 600 may provide power and a control signal that are necessary to drive the camera module 1009.

The cover member 700 may secure the glass cover panel 102 and the first lens 110 to the lens barrel 200-13. The cover member 700 may be coupled to the lens barrel 200-13 or the housing 500. As another example, the cover member 700 may be fastened to the lens barrel 200-13 by a screw coupling. As another example, the cover member 700 may be fixed to the housing 500 by adhesive. However, the coupling between the cover member 700, the lens barrel 200-13 and the housing 500 is not limited to the above-described method.

The cover member 700 may improve the airtightness by using the airtight member 800. For example, the cover member 700 may press the airtight member 800 while being coupled to the lens barrel 200-13 for the airtight member 800 to be elastically deformed or compressively deformed. The airtight member 800, when elastically deformed or compressively deformed, may block a minute gap between the glass cover panel 102 and the lens barrel 200-13. Therefore, the airtight member 800 pressed by the cover member 700 may block the gap between the glass cover panel 102 and the lens barrel 200-13 more firmly.

The airtight member 800 may block the gap between the glass cover panel 102 and the cover member 700. For example, the airtight member 800 may be disposed between the glass cover panel 102 and the cover member 700 to block the external air or the foreign matter from intruding into the gap between the glass cover panel 102 and the cover member 700. However, the position at which the airtight member 800 is disposed is not limited to the position between the glass cover panel 102 and the member 700. The airtight member 800 may be made of a material which may be elastically deformed or compressively deformed. For example, the airtight member 800 may be made of rubber, synthetic rubber, elastomer or the like. However, the airtight member 800 is not limited to the above-mentioned material.

In the first-type camera module 1009, the energy generation unit 400-13 may be disposed between the first lens 110 and the glass cover panel 102, thereby protecting the energy generation unit 400-13 from the external impact and also removing foreign matter adhering to the glass cover panel 102.

Figure 33:
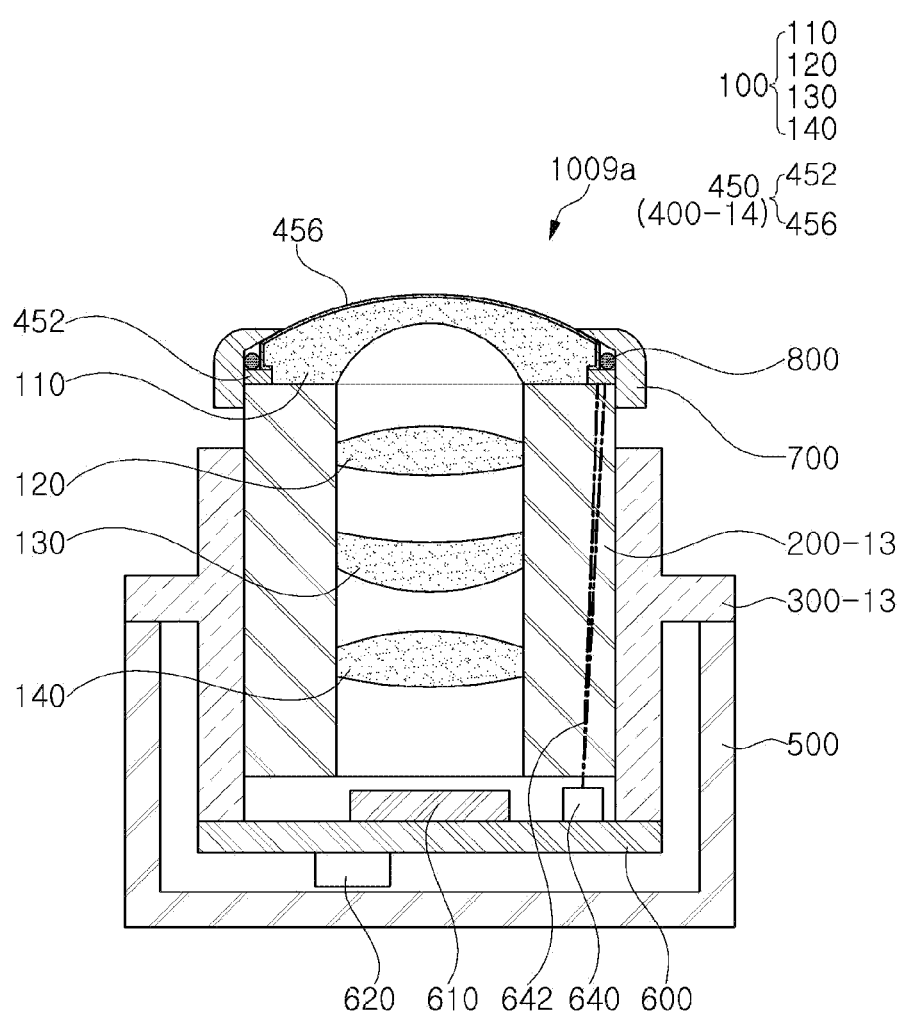

FIG. 33 illustrates a camera module configured to provide energy to an optical member positioned at the forwardmost position of a camera module, according to an embodiment.

Referring to FIG. 33, a camera module 1009a, according to an embodiment, may include the optical system 100, the lens barrel 200-13, the barrel holder 300-13, an energy generation unit 400-14, the housing 500, the substrate 600, and the cover member 700.

The optical system 100 may form an image at a predetermined position by using the light reflected from a subject. For example, the optical system 100 may have a refractive power to form the image at the predetermined position by using the light incident thereon. The optical system 100 may include four or more lenses, including first to fourth lenses 110, 120, 130 and 140. However, the number of lenses included in the optical system 100 is not limited to four. For example, the optical system 100 may include five or more lenses.

The optical system 100 may further include another component in addition to the lens. For example, the optical system 100 may further include a filter member configured to block infrared light. However, the additional component of the optical system 100 is not limited to the filter member. For example, the optical system 100 may further include a stop disposed between the lens and the lens to control the amount of light, the spacer maintaining a constant distance between the lens and the lens, etc. However, the optical system 100 may not necessarily include the filter member, the stop, and the spacer. For example, the optical system 100 may omit the filter member or the spacer as needed.

The optical system 100 may have a predetermined angle of view. For example, the optical system 100 may have an angle of view of 120 degrees or more to simultaneously capture the image over a wide area. However, the angle of view of the optical system 100 is not limited to 120 degrees or more. For example, the optical system 100 may have the angle of view of less than 120 degrees.

The lens barrel 200-13 may accommodate the optical system 100. For example, the lens barrel 200-13 may include the accommodation space accommodating the optical system 100. The lens barrel 200-13 may generally have the cylindrical shape. However, the lens barrel 200-13 is not limited to the cylindrical shape. For example, the lens barrel 200-13 may have the shape of a quadrangular prism, a rectangular prism, or the like, based on a cross-sectional shape of the lenses.

The lens barrel 200-13 may minimize the change in the performance of the optical system 100 based on the change in the temperature of the external environment. For example, the lens barrel 200-13 may be made of a material having low thermal conductivity to minimize the external heat or cold air from being transferred to the second to third lenses 120, 130 and 140 in the accommodation space. For example, the lens barrel 200-13 may be made of the plastic material. However, the lens barrel 200-13 is not limited to the plastic material.

The barrel holder 300-13 may be coupled to the lens barrel 200-13 and the substrate 600. For example, one end of the barrel holder 300-13 may be coupled to the lens barrel 200-13, and the other end thereof may be coupled to the substrate 600. The barrel holder 300-13 may adjust the distance between the lens barrel 200-13 and the substrate 600. For example, the barrel holder 300-13 may change the position at which the barrel holder 300-13 is coupled with the lens barrel 200-13 to adjust the distance from an end of the lens barrel 200-13 to the substrate 600.

The barrel holder 300-13 may be made of a material which is substantially the same as or similar to that of the lens barrel 200-13. For example, the barrel holder 300-13 may be made of the plastic material. However, the barrel holder 300-13 is not limited to the plastic material. For example, the barrel holder 300-13 may be made of any other material as long as the barrel holder 300-13 may be adhered or fastened to the lens barrel 200-13.

The energy generation unit 400-13 may use magnetic energy. For example, the energy generation unit 400-13 may be a magnetic induction device 450. The magnetic induction device 450 may include an electrode terminal 452 and a magnetic induction film 456.

The electrode terminal 452 may be formed on the first lens 110 or the lens barrel 200. The electrode terminal 452 may be electrically connected to the magnetic induction film 456. The electrode terminal 452 may be electrically connected to the substrate 600. For example, the electrode terminal 452 may be connected to the power supply terminal 640 of the substrate 600 by the flexible substrate or the wire. However, the electrical connection between the electrode terminal 452 and the power supply terminal 640 is not limited to the flexible substrate and the wire. For example, the electrode terminal 452 may be electrically connected to the substrate 600 or the power supply terminal 640 by a molded interconnected device MID (e.g., printed circuit) formed on the lens barrel 200 and the barrel holder 300.

The magnetic induction film 456 may be formed on the surface of the first lens 110. The magnetic induction film 456 may not affect the feature of the optical system 100. For example, the magnetic induction film 456 may be made of a light-transmitting material. The magnetic induction film 456 may form a predetermined magnetic field on the surface of the first lens 110. For example, an electrode or an electric circuit, which may form the magnetic field, may be formed on the magnetic induction film 456. The electrode and electric circuit of the magnetic induction film 456 may each be made of a transparent material. For example, the electrode and electrical circuit of the magnetic induction film 456 may each be formed of the ITO.

The magnetic induction device 450 may form the magnetic field on the surface of the first lens 110. For example, the magnetic induction device 450 may generate a stronger electromotive force at a center of the first lens 110 than at the edge of the first lens 110. The magnetic field and the electromotive force, generated by the magnetic induction device 450, may remove foreign matter adhering to the surface of the first lens 110. For example, the foreign matter adhering to the first lens 110 has a tendency to be moved from the center of the first lens 110 to the edge of the first lens 110 by the magnetic field caused by the magnetic induction device 450. Accordingly, as time passes, the foreign matter may be collected on the edge of the first lens 110 or separated outward from the first lens 110. Therefore, according to this embodiment, it is possible to remove foreign matter adhering to the first lens 110 without heating or vibrating the first lens 110.

The housing 500 may accommodate one or more of the lens barrel 200-13, the barrel holder 300-13 and the substrate 600. For example, the substrate 600 may be disposed in the housing 500. The housing 500 may be coupled with the barrel holder 300-13. For example, the housing 500 may be coupled with the barrel holder 300-13 by using the adhesive, the bolt fastening, etc. The housing 500 may be made of the material that is resistant to an external impact. For example, the housing 500 may be made of the metal material. However, the housing 500 is not limited to the metal material. For example, the housing 500 may be made of the material which is the same as or similar to that of the barrel holder 300-13 to be easily bonded or fused to the barrel holder 300-13.

The substrate 600 may include an electronic component required to drive the camera module 1009a. For example, the substrate 600 may be equipped with the image sensor 610, the passive element 620, the power supply terminal 640 and the like. The electronic components mounted on or embedded in the substrate 600 may be electrically connected to each other. For example, the electric circuit electrically connecting the electronic components to each other may be formed on the one surface of or in the substrate 600. The substrate 600 may provide power and a control signal, necessary to drive the camera module 1009a.

The cover member 700 may secure the glass cover panel 102 and the first lens 110 to the lens barrel 200-13. The cover member 700 may be coupled to the lens barrel 200-13 or the housing 500. As another example, the cover member 700 may be coupled to the lens barrel 200-13 by a screw coupling.

The cover member 700 may improve the airtightness by using the airtight member 800. For example, the cover member 700 may press the airtight member 800 while being coupled to the lens barrel 200 for the airtight member 800 to be elastically deformed or compressively deformed. The airtight member 800, when elastically deformed or compressively deformed, may block the minute gap between the glass cover panel 102 and the lens barrel 200. Therefore, the airtight member 800 pressed by the cover member 700 may block the gap between the glass cover panel 102 and the lens barrel 200 more firmly.

The airtight member 800 may block the gap between the first lens 110 and the cover member 700. For example, the airtight member 800 may be disposed between the first lens 110 and the cover member 700 to block the external air or the foreign matter from intruding into the gap between the first lens 110 and the cover member 700. The airtight member 800 may be made of the material which may be elastically deformed or compressively deformed. For example, the airtight member 800 may be made of rubber, synthetic rubber, elastomer, or the like. However, the airtight member 800 is not limited to the above-mentioned material.

The camera module 1009*a* co may remove foreign matter adhering to the surface of the first lens 110 by using the magnetic induction device 450 as described above. For example, the second-type camera module 1009*a* may use the magnetic field, thereby removing not only the liquid foreign material also a solid foreign material, adhering to the surface of the first lens 110. In addition, the second-type camera module 1009*a* may use the magnetic field to disperse outward, foreign matter in the shape of a particle scattered in front of the first lens 110 from the field of view of the first lens 110. Therefore, the camera module 1009*a* may reduce the resolution degradation caused by fine dust, dust particles, etc.

Figure 34:
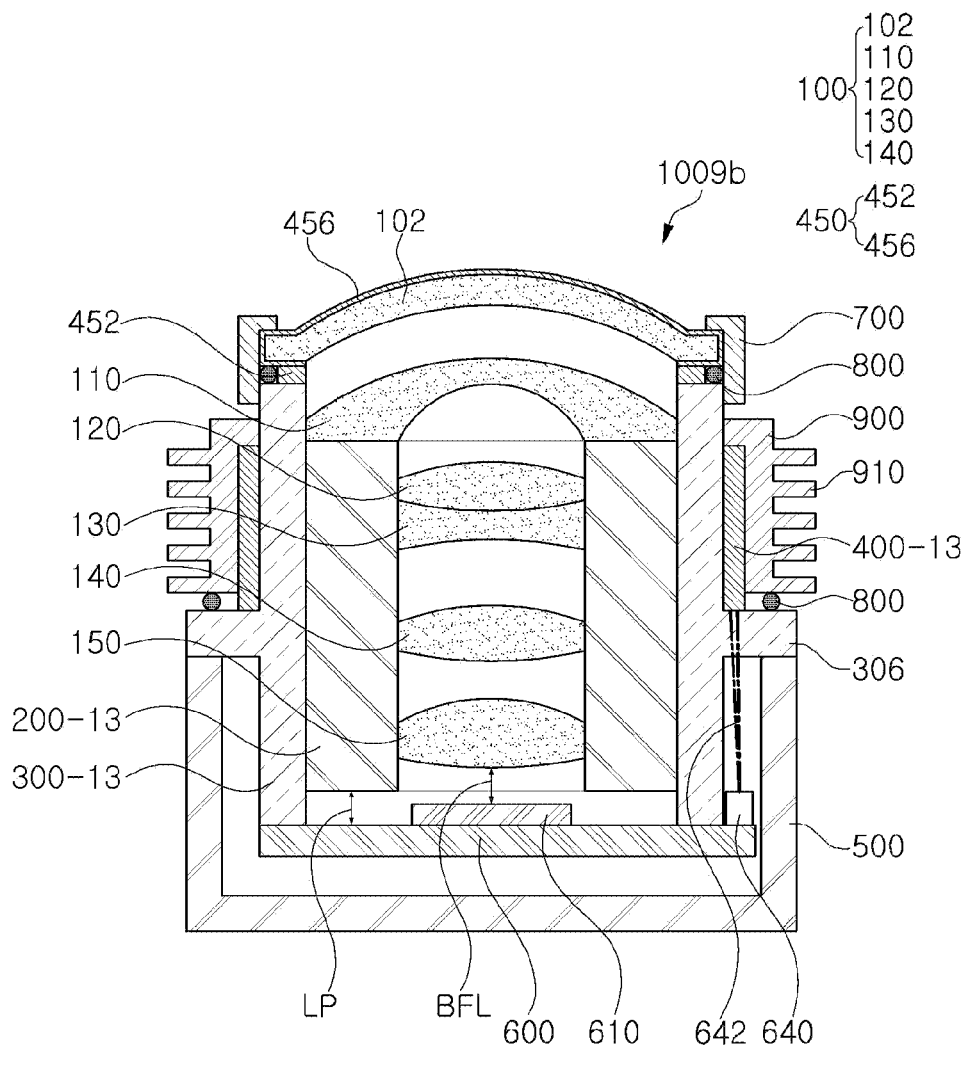

Referring to FIG. 34, a camera module 1009*a* may be modified to have a shape shown in FIG. 34. For example, a camera module 1009*b* may further include the glass cover panel 102 as shown in FIG. 34. In addition, the magnetic induction device 450 of the camera module 1009*b* may be formed on the glass cover panel 102.

Figure 35:
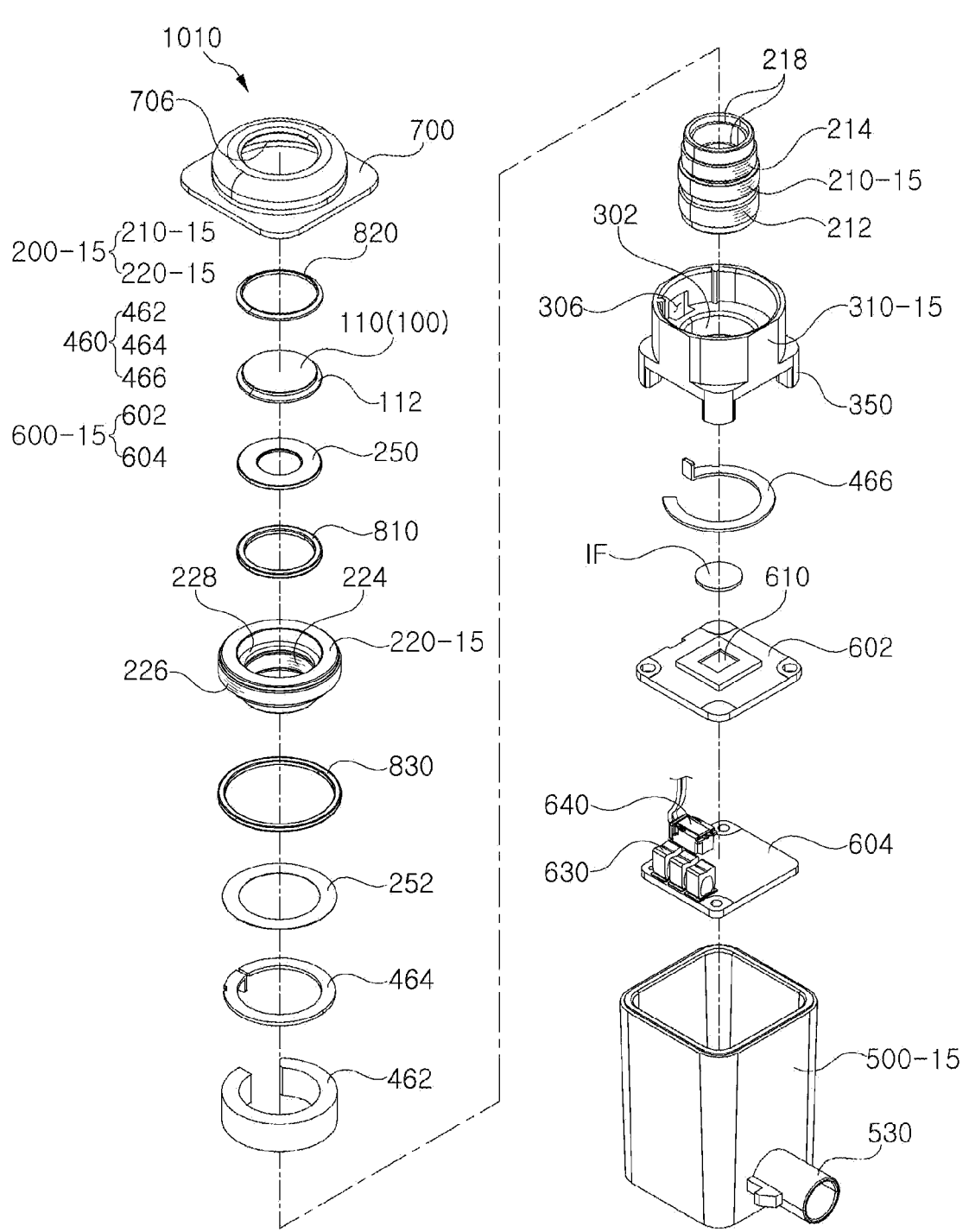
FIG. 35 is an exploded perspective view of a camera module, according to another embodiment.
Figure 36:
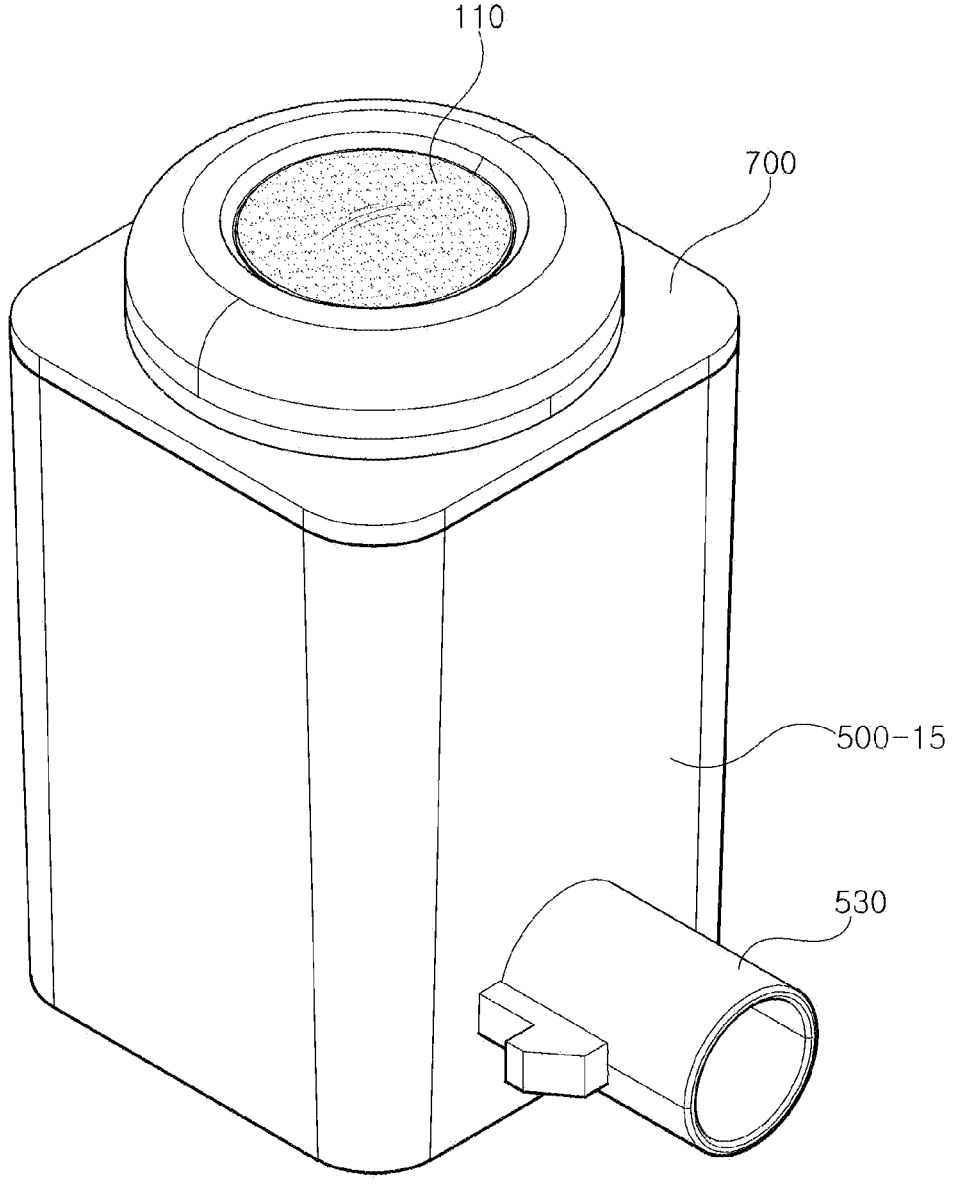
FIG. 36 is an assembled perspective view of the camera module shown in FIG. 35.
Figure 37:
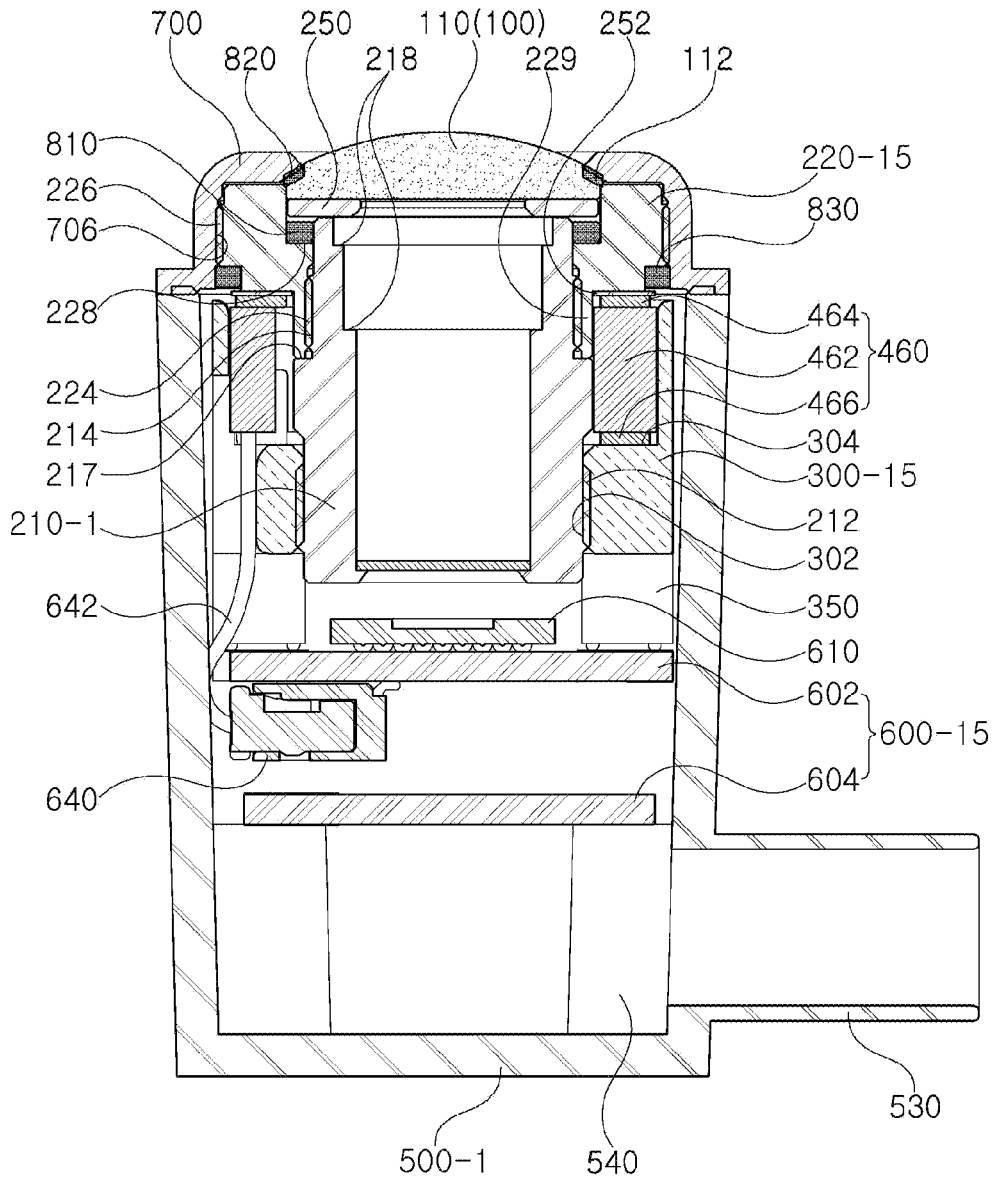
FIG. 37 is a cross-sectional view of the camera module shown in FIG. 36.
Figure 38:
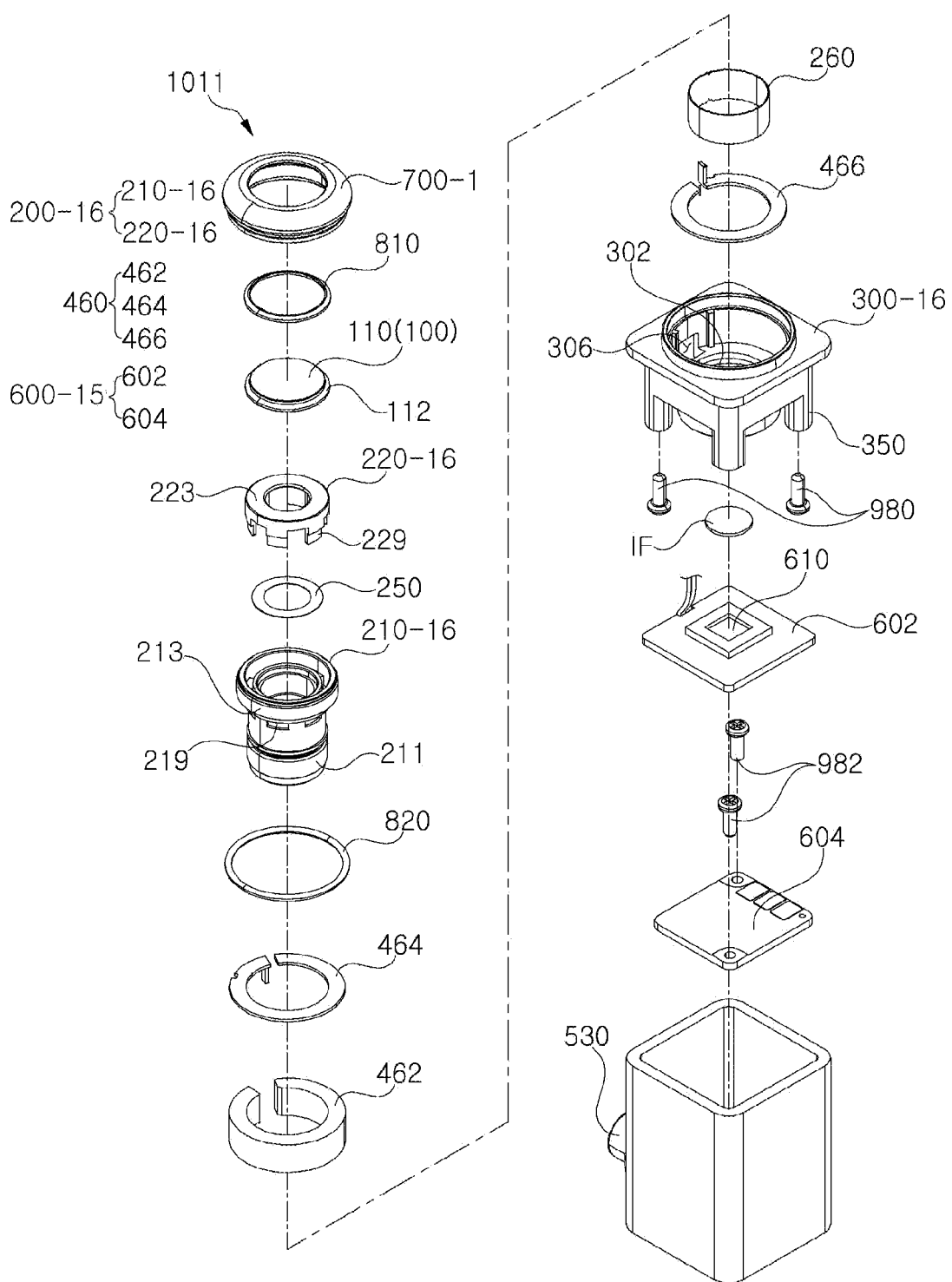
FIG. 38 is an exploded perspective view of a camera module, according to another embodiment.
Figures 39A, 39B:
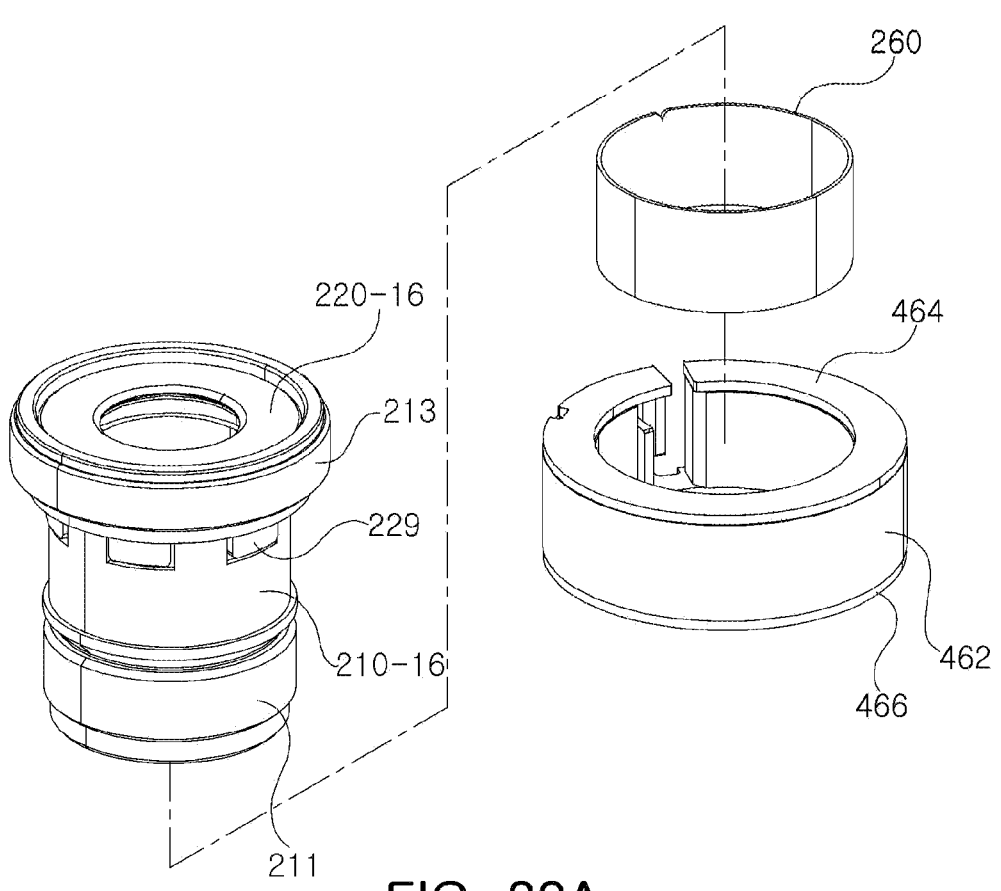
FIGS. 39A and 39B are perspective views each illustrating a lens barrel and the heat generation device shown in FIG. 38, partially coupled to each other.
Figure 40:
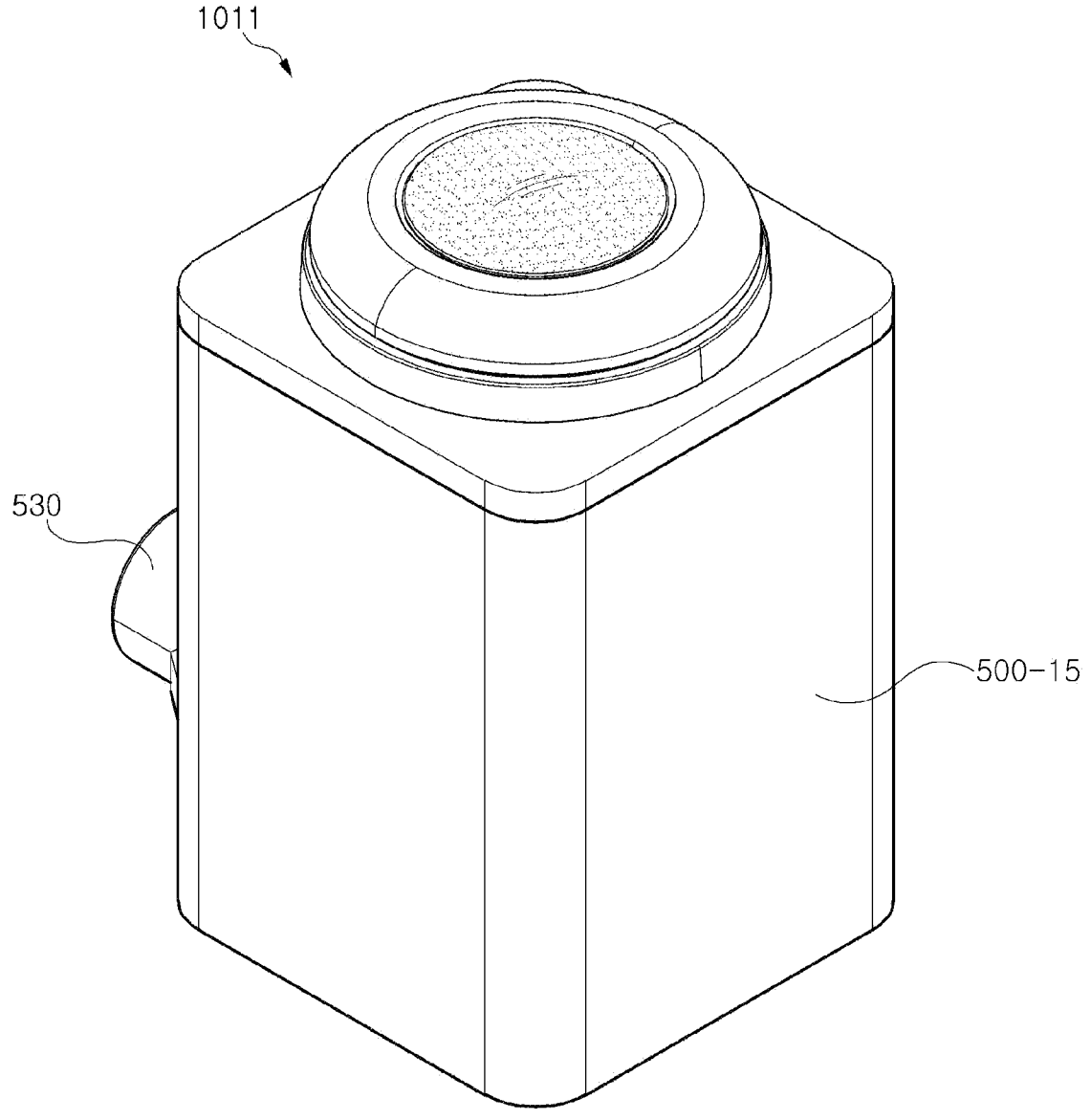
FIG. 40 is an assembled perspective view of the camera module shown in FIG. 38.
Figure 41:
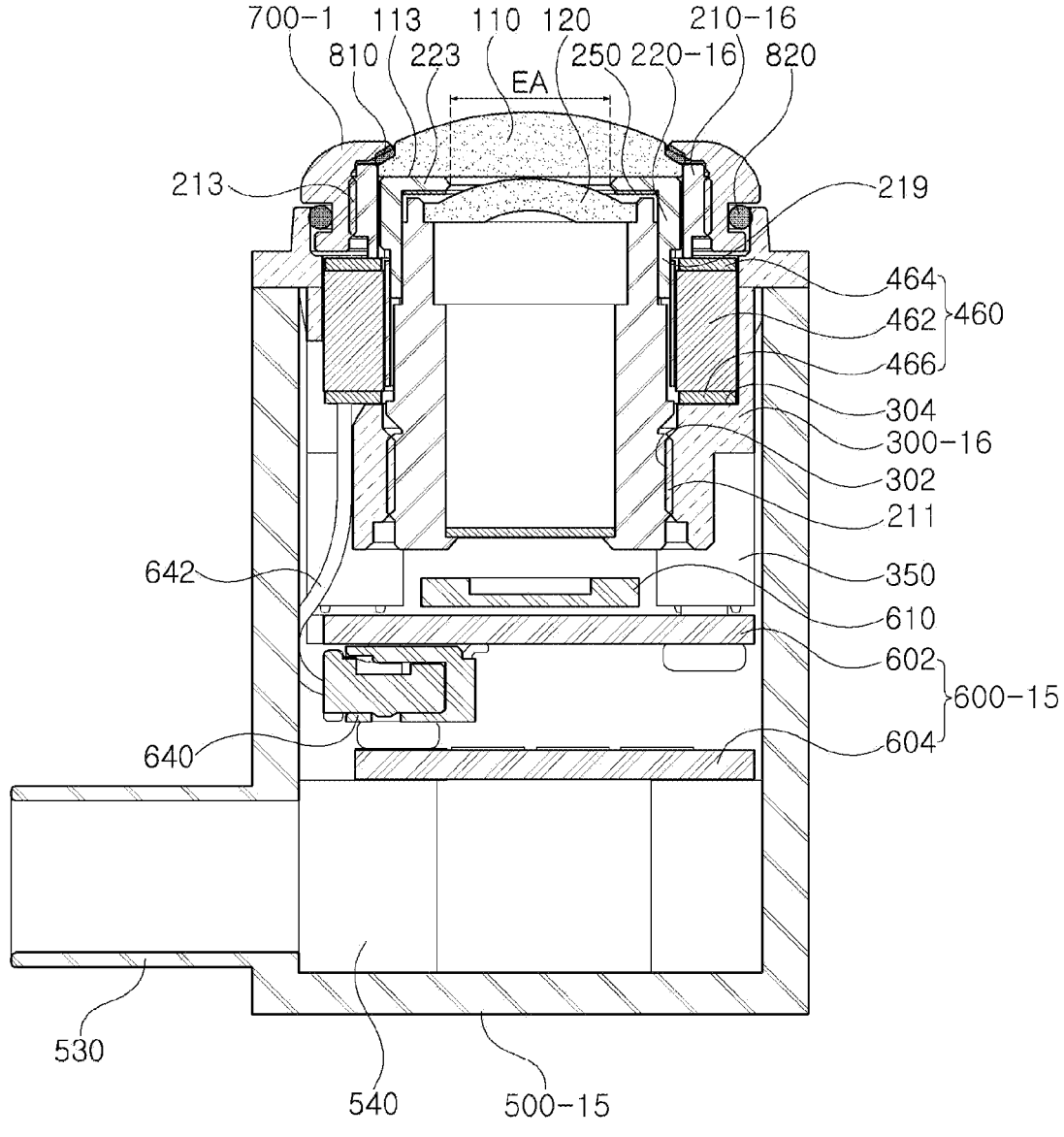
FIG. 41 is a cross-sectional view of the camera module shown in FIG. 38.

FIGS. 35 to 37 illustrate a camera module, according to another embodiment.

Referring to FIGS. 35 to 37, a camera module 1010 may include the optical system 100, a lens barrel 200-15, a barrel holder 300-15, a heat generation device 460, which is a type of the energy generation unit, a housing 500-15, a substrate 600-15, the cover member 700, and first, second, and third airtight members 810, 820, and 830. However, the camera module 1010 is not limited to including the above-mentioned members.

The optical system 100 may include one or more lenses. For example, the optical system 100 may include the first lens 110 to the fifth lens (not shown) sequentially arranged from the object side. The optical system 100 may have a predetermined angle of view. For example, the optical system 100 may have an angle of view of 120 degrees or more to simultaneously capture the image over a wide area. However, the angle of view of the optical system 100 is not limited to 120 degrees or more. For example, the optical system 100 may have an angle of view of less than 120 degrees.

The first lens 110 may be disposed at the forwardmost of the optical system 100. For example, the first lens 110 may be disposed for its (object-side) surface to be partially exposed outward. The first lens 110 may have a predetermined refractive power. For example, the first lens 110 may have positive or negative refractive power. One surface of the first lens 110 may have a convex shape. As an example, the object-side surface of the first lens 110 may have the convex shape. However, the object-side surface of the first lens 110 may not necessarily have the convex shape.

The first lens 110 may be easily fixed by the cover member 700. For example, the flange portion 112 which may be coupled to the cover member 700 may be formed on the edge of the first lens 110.

The lens barrel 200-1 may accommodate the optical system 100. For example, the lens barrel 200-15 may include the accommodation space accommodating the optical system 100. The lens barrel 200-15 may accommodate the plurality of lenses. For example, the lens barrel 200-15 may accommodate the lenses except for the first lens 110.

There may be the plurality of lens barrels 200-15. For example, the lens barrel 200-15 may include a first lens barrel 210-15 and a second lens barrel 220-15. The first lens barrel 210 and the second lens barrel 220 may be made of materials that are different from each other. As an example, the first lens barrel 210 may be made of a material having low thermal conductivity or a material having low electrical conductivity, and the second lens barrel 220 may be made of a material having high thermal conductivity or a material having high electrical conductivity. As another example, the first lens barrel 210 may be made of a plastic material, and the second lens barrel 220 may be made of a metal material.

The first lens barrel 210-15 may accommodate the plurality of lenses. For example, the lens barrel 210-15 may accommodate all the lenses except for the first lens 110. The first lens barrel 210-15 may be firmly coupled with another member. For example, a first screw portion 212 and a second screw portion 214 may be formed on the outer circumferential surface of the first lens barrel 210-15. The first screw portion 212 may be formed on a lower portion of the first lens barrel 210-15, and the second screw portion 214 may be formed on an upper portion of the first lens barrel 210-15. However, the positions where the first screw portion 212 and the second screw portion 214 are formed are not limited to the lower and upper portions of the first lens barrel 210-15.

The first screw portion 212 may allow the first lens barrel 210-15 and the barrel holder 300-15 to be coupled to each other. For example, the first screw portion 212 may be screwed with a screw portion 302 formed on an inner circumferential surface of the barrel holder 300-15. However, the coupling between the first lens barrel 210-15 and the barrel holder 300-15 is not limited to a screw coupling. For example, the first lens barrel 210-15 and the barrel holder 300-15 may be coupled to each other by using the method such as a press-fit, adhesion, fusion, or the like. The second screw portion 214 may allow the first lens barrel 210-15 and the second lens barrel 220-15 to be coupled to each other. For example, the second screw portion 214 may be screwed with the first screw portion 212 formed on an inner circumferential surface of the second lens barrel 220-15. However, the coupling between the first lens barrel 210-15 and the second lens barrel 220-15 is not limited to a screw coupling. For example, the first lens barrel 210-15 and the second lens barrel 220-15 may be coupled to each other by using the method such as a press-fit, adhesion, fusion, or the like.

The first lens barrel 210-15 may include a component restricting a position at which the first lens barrel 210-15 and the second lens barrel 220-15 are coupled to each other. For example, a step 216 may be formed on the outer circumferential surface of the second lens barrel 220-15 to restrict the movement range or coupling position of the second lens barrel 220-15. The first lens barrel 210-15 may include a component fixing a position of the lens or supporting the lens. For example, a plurality of steps 218 may be formed on the inner circumferential surface of the first lens barrel 210-15.

The second lens barrel 220-15 may accommodate the first lens 110. For example, the first lens 110 may be seated inside the second lens barrel 220-15. The second lens barrel 220-15 may be coupled with the first lens barrel 210-15. For example, the second lens barrel 220-15 may be coupled to the first lens barrel 210-15 by the screw portions 214 and 224 being fastened to each other. The second lens barrel 220-15 may be coupled with the cover member 700. For example, the second lens barrel 220-15 may be coupled to the cover member 700 by the screw portions 226 and 706 being fastened to each other.

The second lens barrel 220-15 may function as the energy transfer member. To this end, the second lens barrel 220-15 may be made of the material which may easily transfer the energy. For example, the second lens barrel 220-15 may be made of the material having high thermal conductivity to easily transfer the thermal energy. As a specific example, the second lens barrel 220-15 may be made of copper, aluminum, an alloy of copper and aluminum, or the like. However, the material of the second lens barrel 220-15 is not limited to copper or aluminum. For example, the second lens barrel 220-15 may be made of a material having high thermal conductivity, other than the metal material.

The second lens barrel 220-15 may be in contact with the heat generation device 460, which is an energy generation unit. For example, the second lens barrel 220-15 may include an extension 229 in contact with an inner circumferential surface of the heat generation device 460. The extension 229 may be extended downward from a body of the second lens barrel 220-15.

The barrel holder 300-15 may be coupled with the first lens barrel 210-15. For example, the barrel holder 300-15 may be firmly coupled to the first lens barrel 210-15 by the screw portions 302 and 212 being fastened to each other. The barrel holder 300-15 may be coupled with the substrate 600-15. For example, the barrel holder 300-15 may be coupled with the substrate 600-15 by interposing a leg member 350 therebetween. The leg member 350 may be fixed to the substrate 600-15 by a bolt. An extraction hole 306 may be formed in the barrel holder 300-15. The extraction hole 306 may be used as an outlet for the power line 642 that connects the power supply terminal 640 of the substrate 600-15 and the heat generation device 460 to each other. The barrel holder 300-15 may be made of a material having low energy transfer efficiency. For example, the barrel holder 300-15 may be made of a plastic material having low thermal conductivity. However, the barrel holder 300-15 is not limited to the plastic material.

The heat generation device 460 may be disposed between the first lens barrel 210-15 and the second lens barrel 220-15. For example, the heat generation device 460 may be disposed between the seating portion 304 of the barrel holder 300-15 and the first lens barrel 210-15. However, the position at which the heat generation device 460 is disposed is not limited to a position between the seating portion 304 of the barrel holder 300-15 and the first lens barrel 210-15. For example, the position at which the heat generation device 460 is disposed may be changed as long as the heat generation device 460 is in contact with the second lens barrel 220-15.

The heat generation device 460 may provide the thermal energy to an adjacent member. For example, the heat generation device 460 may provide the thermal energy to the second lens barrel 220-15 having high thermal conductivity. The heat generation device 460 may generate constant thermal energy regardless of time or amount of current. For example, the heat generation device 460 may be a PTC heater always maintained at a constant temperature.

The heat generation device 460 may include a heating element 462 and electrodes 464 and 466. The heating element 462 may have a shape of a ring having one side open, and the electrodes 464 and 466 may each have a disk shape. However, the heating elements 462 and the electrodes 464 and 466 are not limited to the ring and disk shapes, respectively. The heating element 462 may be elastically deformed or its shape may be deformed. Therefore, the heating element 462 may be freely deformed to be inserted into a space where the heat generation device 460 is disposed, and may be in close contact with the second lens barrel 220-15. The heating element 462 may include a component configured to convert electrical energy into the thermal energy. For example, the heating element 462 may be made of a material having high electrical resistance, or may be an electronic component including a plurality of resistance elements. The electrodes 464 and 466 may supply the current to the heating element 462. The first electrode 464 may be disposed on a top potion of heating element 462, and the second electrode 466 may be disposed on a bottom portion of the heating element 462.

The heat generation device 460 may supply thermal energy to the first lens 110. For example, the thermal energy generated from the heat generation device 460 may be transferred to the first lens 110 through the second lens barrel 220-15 having high thermal conductivity. The heat generation device 460 may allow foreign matter adhering to the first lens 110 to be removed. For example, the thermal energy generated from the heat generation device 460 may be used as an energy source to evaporate frost, dew, moisture and a water droplet, adhering to the surface of the first lens 110.

The housing 500-15 may accommodate the lens barrel 200-15, the barrel holder 300-15 and the substrate 600-15. For example, the housing 500-15 may accommodate all of the lens barrel 200-15, the barrel holder 300-15 and the substrate 600-15. The housing 500-15 may include a component that supports the position of the substrate 600-15. For example, a support member 540 which may be coupled to the substrate 600-15 while supporting the position of the substrate 600-15 may be formed in a lower portion of the housing 500. The support member 540 may support four corners of the substrate 600-15 and may be coupled to the substrate 600-15 by a bolt. The housing 500-15 may include a component through which input and output cables are extracted. For example, a passage 530 through which the input and output cables are extracted may be formed on one side of the housing 500-15. The housing 500-15 may be coupled with the cover member 700. For example, the housing 500-15 may be coupled with the cover member 700 by the method such as adhesion, fitting, screwing, etc. The housing 500-15 may be made of a material resistant to impact. For example, the housing 500-15 may be made of a metal material. However, the housing 500 is not limited to the metal material. For example, the housing 500 may be made of a plastic material to reduce a weight of the camera module 1010.

The substrate 600-15 may include an electronic component required to drive the camera module 1010. For example, the substrate 600-15 may be equipped with the image sensor 610, the passive element 640 and the like. The electronic components mounted on or embedded in the substrate 600-15 may be electrically connected to each other. For example, the electric circuit electrically connecting the electronic components to each other may be formed on the one surface of or in the substrate 600-15. The substrate 600-15 may provide power and a control signal that are necessary to drive the camera module 1010. The substrate 600-15 may include a first substrate 602 and a second substrate 604 to more efficiently dispose the electronic components thereon. The image sensor 610 may be disposed on the first substrate 602, and the passive element, the connection terminal, or the like may be disposed on the second substrate 604. However, the electronic components, disposed on the first substrate 602 and the second substrate 604, are not limited to the above-described components. For example, the passive element may also be disposed on the first substrate 602. The power supply terminal 640 may be connected to the heat generation device 460. For example, the power supply device 640 may be electrically connected to the heat generation device 460 by the connection line 642.

The cover member 700 may prevent separation of the first lens 110 from the lens barrel 200-15. For example, the cover member 700 may secure the first lens 110 to the second lens barrel 220-15. The cover member 700 may be coupled to the second lens barrel 220-15. For example, the screw portion 706 which may be fastened to the second screw portion 226 of the second lens barrel 220-15 may be formed on an inner circumferential surface of the cover member 700.

The first, second, and third airtight members 810, 820 and 830 may block the gap in the camera module 1010. For example, the first airtight member 810, the second airtight member 820, and the third airtight member 830 may respectively be disposed between the first lens barrel 210-15 and the second lens barrel 220-15, between the first lens 110 and the second lens barrel 220-15, and between the second lens barrel 220-15 and the cover member 700. In more detail, the first airtight member 810 may be disposed on an inner jaw 228 of the second lens barrel 220-15, the second airtight member 820 may be disposed on the flange portion 112 of the first lens 110, and the third airtight member 830 may be disposed on an outer jaw 229 of the second lens barrel 220-15. However, the positions where the first, second, and third airtight members 810, 820 and 830 are disposed are not limited to the above-described portions. The airtight member 800 may be made of the material which may be elastically deformed or compressively deformed. For example, the airtight member 800 may be made of rubber, synthetic rubber, elastomer or the like. However, the airtight member 800 is not limited to the above-mentioned material.

The camera module 1010 may further include spacing members 250 and 252 and the filter member (IF). The spacing members 250 and 252 may respectively be disposed between the lenses and the lens barrel 200-15, and between the lens barrel 200-15 and the energy generation unit. As an example, the first spacing member 250 may be disposed between the first lens 110 and the first lens barrel 210-15. As another example, the second spacing member 252 may be disposed between the second lens barrel 220-15 and the first electrode 464. The first spacing member 250 may be made of a material having low elastic deformation and low thermal conductivity. For example, the first spacing member 250 may be made of a material that may be elastically deformed or compressively deformed to be in close contact with the first lens 110 when pressed by the cover member 700. In addition, the first spacing member 250 may be made of the material having low thermal conductivity to minimize loss of heat transferred to the first lens 110 through the first lens barrel 210-15. The second spacing member 252 may be made of an insulating material. For example, the second spacing member 252 may be made of the insulating material to prevent the current supplied through the first electrode 464 from leaking through the second lens barrel 220-15.

The camera module 1010 may capture a still image or a video by an external signal. For example, the camera module 1010 may capture the still image or video of a subject positioned in front thereof by an external driving signal of a device (e.g., vehicle) on which the camera module 1010 is mounted. However, the camera module 1010 may not be necessarily driven by the external signal. For example, the camera module 1010 may continuously or discontinuously capture the subject positioned in the front thereof by power constantly supplied from the external source.

The camera module 1010 may be operated to remove foreign matter adhering to the first lens 110 by the external signal or an internal signal. As an example, the camera module 1010 may selectively drive the heat generation device 460 by the external signal to remove the foreign matter adhering to the first lens 110. As another example, when a resolution of an image obtained through the image sensor 610 has a value less than a predetermined value, the camera module 1010 may recognize that the foreign matter is adhered to the first lens 110 and then activate the heat generation device 460. As yet another example, the camera module 1010 may always drive the heat generation device 460 to fundamentally prevent frost, moisture, a raindrop, or the like from adhering to the surface of the first lens 110.

In the camera module 1010, the thermal energy of the heat generation device 460 may not be transferred to the first lens barrel 210, and may thus minimize the change in the performance of the optical system 100 caused by the thermal energy of the heat generation device 460. In addition, in the camera module 1010, the thermal energy generated by the heat generation device 460 may be rapidly transferred to the first lens 110 through the second lens barrel 220-15 made of the material having high thermal conductivity, and may thus rapidly remove frost, moisture, dew, a raindrop or the like, adhering to the first lens 110.

FIGS. 38 through 41 illustrate a camera module, according to another embodiment.

Referring to FIGS. 38 through 41, a camera module 1011 may include the optical system 100, a lens barrel 200-16, a barrel holder 300-16, the heat generation device 460, the housing 500-15, the substrate 600-15, a cover member 700-1, and the airtight members 810 and 820. However, the camera module 1011 is not limited to including the above-mentioned members.

The optical system 100 may include one or more lenses. For example, the optical system 100 may include the first lens 110 to the fifth lens (not shown) sequentially arranged from the object side. The optical system 100 may have a predetermined angle of view. For example, the optical system 100 may have an angle of view of 120 degrees or more to simultaneously capture the image over a wide area. However, the angle of view of the optical system 100 is not limited to 120 degrees or more. For example, the optical system 100 may have an angle of view of less than 120 degrees.

The first lens 110 may be disposed at the forwardmost of the optical system 100. For example, the first lens 110 may be disposed for its (object-side) surface to be partially exposed outward. The first lens 110 may have a predetermined refractive power. For example, the first lens 110 may have positive or negative refractive power. One surface of the first lens 110 may have a convex shape. As an example, the object-side surface of the first lens 110 may have a convex shape. However, the object-side surface of the first lens 110 may not necessarily have a convex shape.

The first lens 110 may be easily fixed by the cover member 700-1. For example, the flange portion 112, which may be coupled to the cover member 700, may be formed on the edge of the first lens 110.

The lens barrel 200-16 may accommodate the optical system 100. For example, the lens barrel 200-16 may include the accommodation space accommodating the optical system 100. The lens barrel 200-16 may accommodate the plurality of lenses. For example, the lens barrel 200-16 may accommodate the lenses except for the first lens 110.

There may be the plurality of lens barrels 200-16. For example, the lens barrel 200-16 may include a first lens barrel 210-16 and a second lens barrel 220-16. The first lens barrel 210-16 and the second lens barrel 220-16 may be made of materials that are different from each other. As an example, the first lens barrel 210-16 may be made of a material having low thermal conductivity or a material having low electrical conductivity, and the second lens barrel 220-16 may be made of a material having high thermal conductivity or a material having high electrical conductivity. As another example, the first lens barrel 210-16 may be made of a plastic material, and the second lens barrel 220-16 may be made of a metal material.

The first lens barrel 210-16 may accommodate the plurality of lenses. For example, the lens barrel 210-16 may accommodate all the lenses including the first lens 110. The first lens barrel 210-16 may be firmly coupled with another member. For example, a first screw portion 211 and the second screw portion 213 may be formed on the outer circumferential surface of the first lens barrel 210-16. The first screw portion 211 may be formed on the lower portion of the first lens barrel 210-16, and the second screw portion 213 may be formed on the upper portion of the first lens barrel 210-16. However, the positions where the first screw portion 211 and the second screw portion 213 are formed are not limited to the lower and upper portions of the first lens barrel 210-16.

The first screw portion 211 may allow the first lens barrel 210-16 and the barrel holder 300-16 to be coupled to each other. For example, the first screw portion 211 may be screwed with the screw portion 302 formed on the inner circumferential surface of the barrel holder 300-16. However, the coupling between the first lens barrel 210-16 and the barrel holder 300-16 is not limited to a screw coupling. For example, the first lens barrel 210-16 and the barrel holder 300-16 may be coupled to each other by using the method such as the press-fit, the adhesion, the fusion or the like. The second screw portion 213 may allow the first lens barrel 210-16 and the cover member 700-1 to be coupled to each other. For example, the second screw portion 213 may be screwed with the screw portion 706 formed on the inner circumferential surface of the cover member 700-1. However, the coupling between the first lens barrel 210 and the cover member 700-1 is not limited to screw coupling. For example, the first lens barrel 210-16 and the cover member 700-1 may be coupled to each other by using the method such as a press-fit, adhesion, fusion, or the like.

The first lens barrel 210 may include a component by which the first lens barrel 210-16 and the second lens barrel 220-16 are coupled to each other. For example, a coupling hole 219, into which the extension 229 of the second lens barrel 220-16 is inserted, may be formed in the first lens barrel 210-16. The coupling holes 219 may be spaced apart from each other in a circumferential direction of the first lens barrel 210-16. The coupling hole 219 may be open outward from the inside of the first lens barrel 210-16. Accordingly, the extension 229 of the second lens barrel 220-16, inserted into the coupling hole 219, may protrude or be exposed outward from the first lens barrel 210-16.

The second lens barrel 220-16 may support one surface of the first lens 110. For example, the second lens barrel 220-16 may support the first lens 110 for the first lens 110 to be maintained at a predetermined height from the first lens barrel 210-16. The second lens barrel 220-16 may be in contact with the first lens 110. For example, an upper portion 223 of the second lens barrel 220-16 may be in contact with a lower flange portion 112 of the first lens 110. The second lens barrel 220 and the first lens 110 may maximize an area in which the second lens barrel 220-16 and the first lens 110 are in contact with each other in a range in which the contact area does not affect the optical feature of the first lens 110. For example, a partial area of the lower portion of the first lens 110, excluding an area EA through which effective light substantially transmits, may be in contact with the upper portion 223 of the second lens barrel 220-16. Therefore, the camera module 1011 may secure a sufficient contact area between the first lens 110 and the second lens barrel 220-16, and may thus rapidly and easily heat the first lens 110 or transfer energy to the first lens 110, through the second lens barrel 220-16.

The second lens barrel 220-16 may function as an energy transfer member. To this end, the second lens barrel 220-16 may be made of the material which may easily transfer the energy. For example, the second lens barrel 220-16 may be made of a material having high thermal conductivity to easily transfer the thermal energy. As a specific example, the second lens barrel 220-16 may be made of copper, aluminum, an alloy of copper and aluminum, or the like. However, the material of the second lens barrel 220-16 is not limited to copper or aluminum. For example, the second lens barrel 220-16 may be made of a material having high thermal conductivity, other than the metal material.

The second lens barrel 220-16 may be in contact with the heat generation device 460, which is an energy generation unit. For example, the second lens barrel 220-16 may include the extension 229 in contact with the inner circumferential surface of the heat generation device 460. The extensions 229 may each be extended downward from the body of the second lens barrel 220-16, and may be spaced apart from each other in the circumferential direction of the second lens barrel 220-16. The extension 229 may be inserted into the first lens barrel 210-16. For example, the extension 229 may be inserted into coupling hole 219 of the first lens barrel 210-16. The extension 229 may be exposed or protrude outward from the first lens barrel 210-16 to be in contact with another adjacent member. For example, the extension 229 may pass through the coupling hole 219 to protrude outward from the first lens barrel 210-16.

The second lens barrel 220-16 may function as the spacing member. For example, the second lens barrel 220-16 may maintain a constant distance between the first lens 110 and the second lens (i.e., lens disposed on an image-side of the first lens). When using the second lens barrel 220-16 as the spacing member, the camera module 1011 may have a simple configuration. For example, when using the second lens barrel 220-16 as the spacing member, the camera module 1011 may omit the spacing member 250 shown in FIG. 38, and may transfer energy to the first lens 110 and the second lens through the second lens barrel 220-16.

The barrel holder 300-16 may be coupled with the first lens barrel 210-16. For example, the barrel holder 300-16 may be firmly coupled to the first lens barrel 210-16 by the screw portions 302 and 211 fastened to each other. The barrel holder 300 may be coupled with the substrate 600-15. For example, the barrel holder 300-16 may be coupled with the substrate 600-15 by interposing the leg member 350 therebetween. The leg member 350 may be fixed to the substrate 600-15 by using a bolt 980. The extraction hole 306 may be formed in the barrel holder 300-16. The extraction hole 306 may be used as the outlet for the power line 642 that connects the power supply terminal 640 of the substrate 600-15 and the heat generation device 460 to each other. The barrel holder 300-16 may be made of a material having low energy transfer efficiency. For example, the barrel holder 300-16 may be made of a plastic material having low thermal conductivity. However, the barrel holder 300-16 is not limited to the plastic material.

The heat generation device 460 may be disposed on the outer circumferential surface of the first lens barrel 210-16. For example, the heat generation device 460 may be disposed above the first screw portion 211 of the first lens barrel 210-16. The heat generation device 460 may be in contact with the second lens barrel 220-16. For example, the heat generation device 460 may be disposed to be in contact with the extension 229 of the second lens barrel 220-16. The heat generation device 460 may generate thermal energy. For example, the heat generation device 460 may be a PTC heater always maintained at a constant temperature.

The heat generation device 460 may include the heating element 462 and the electrodes 464 and 466. The heating element 462 may generally have the shape of a ring having one side open, and the electrodes 464 and 466 may each have a disk shape. However, the heating elements 462 and the electrodes 464 and 466 are not limited to the ring and disk shapes, respectively. The heating element 462 may be elastically deformed or its shape may be deformed. Therefore, the heating element 462 may be freely deformed to be inserted into a space where the heat generation device 460 is disposed, and may be in close contact with the second lens barrel 220-16. The heating element 462 may include the component configured to convert electrical energy into the thermal energy. For example, the heating element 462 may be made of a material having high electrical resistance, or may be an electronic component including a plurality of resistance elements. The electrodes 464 and 466 may supply current to the heating element 462. The first electrode 464 may be disposed on the top portion of the heating element 462, and the second electrode 466 may be disposed on the bottom portion of the heating element 462.

The heat generation device 460 may supply the thermal energy to the first lens 110. For example, the thermal energy generated by the heat generation device 460 may be transferred to the first lens 110 through the second lens barrel 220-16 having high thermal conductivity. The heat generation device 460 may allow foreign matter adhering to the first lens 110 to be removed. For example, the thermal energy generated from the heat generation device 460 may be used as an energy source to evaporate frost, dew, moisture, and a water droplet adhering to the surface of the first lens 110.

The housing 500-15 may accommodate the lens barrel 200-16, the barrel holder 300-16 and the substrate 600-15. For example, the housing 500-15 may accommodate all of the lens barrel 200-16, the barrel holder 300-16 and the substrate 600-15. The housing 500-15 may include the component that supports the position of the substrate 600-15. For example, the support member 540, which may be coupled to the substrate 600-15 while supporting the position of the substrate 600-15, may be formed on the lower portion of the housing 500-15. The support member 540 may support the four corners of the substrate 600-15 and may be coupled to the substrate 600-15 by the bolt 982. The housing 500-15 may include the component through which the input and output cables are extracted. For example, the passage 530 through which the input and output cables are extracted may be formed on one side of the housing 500-15. The housing 500-15 may be coupled with the cover member 700-1. For example, the housing 500-15 may be coupled with the cover member 700-1 by the method such as adhesion, fitting, screwing, etc. The housing 500-15 may be made of a material resistant to impacts. For example, the housing 500-15 may be made of a metal material. However, the housing 500-15 is not limited to the metal material. For example, the housing 500-15 may be made of a plastic material to reduce the weight of the camera module 1011.

The substrate 600-15 may include an electronic component required to drive the camera module 1011. For example, the substrate 600-15 may be equipped with the image sensor 610, the passive element 640, and the like. The electronic components mounted on or embedded in the substrate 600-15 may be electrically connected to each other. For example, the electric circuit electrically connecting the electronic components to each other may be formed on the one surface of or in the substrate 600-15. The substrate 600-15 may provide power and a control signal that are necessary to drive the camera module 1011. The substrate 600-15 may include the first substrate 602 and the second substrate 604 to more efficiently dispose the electronic components thereon. The image sensor 610 may be disposed on the first substrate 602, and the passive element, the connection terminal, or the like may be disposed on the second substrate 604. However, the electronic components disposed on the first substrate 602 and the second substrate 604 are not limited to the above-described components. For example, the passive element may also be disposed on the first substrate 602. The power supply terminal 640 may be connected to the heat generation device 460. For example, the power supply device 640 may be electrically connected to the heat generation device 460 by the connection line 642.

The cover member 700-1 may prevent the separation of the first lens 110 from the lens barrel 200-16. For example, the cover member 700-1 may secure the first lens 110 to the first lens barrel 210-16. The cover member 700-1 may be coupled to the first lens barrel 210-16. For example, the screw portion 706, which may be fastened to the second screw portion 213 of the first lens barrel 210-16, may be formed on the inner circumferential surface of the cover member 700-1.

The airtight members 810 and 820 may block the gap in the camera module 1011. For example, the first airtight member 810 and the second airtight member 820 may respectively be disposed between the first lens 110 and the cover member 700-1, and between barrel holder 300-16 and the cover member 700-1. The first airtight member 810 may be disposed between the first lens 110 and the cover member 700-1. The first airtight member 810 may be disposed on the edge of the first lens 110 to block foreign matter or external air from intruding into the space between the first lens 110 and the cover member 700-1. The second airtight member 820 may be disposed between the barrel holder 300 and the cover member 700-1. The second airtight member 820 may be disposed on the edge of the cover member 700-1 to block the foreign matter or the external air from intruding into the space between the barrel holder 300-16 and the cover member 700-1. For reference, a groove 708 accommodating the second airtight member 820 may be formed on the outer circumferential surface of the cover member 700-1. The airtight members 810 and 820 may each be made of the material which may be elastically deformed or compressively deformed. For example, the airtight members 810 and 820 may each be made of rubber, synthetic rubber, elastomer or the like. However, each of the airtight members 810 and 820 is not limited to the above-mentioned material.

The camera module 1011 according to this embodiment may further include an intermediate member 260. For example, the camera module 1011 may further include the intermediate member 260 disposed between the extension 229 of the second lens barrel 220-16 and the heating element 462 of the heat generation device 460. The intermediate member 260 may be elastically deformed or stretched and compressed. For example, intermediate member 260 may be partially expanded or partially deformed to be coupled with the extension 229. The intermediate member 260 may be made of a material having high thermal conductivity. For example, the intermediate member 260 may be made of copper, aluminum, or an alloy of copper and aluminum. However, the material of the intermediate member 260 is not limited to the above-mentioned materials. The intermediate member 260 may increase an area in which the extension 229 and the heating element 462 are in contact with each other. For example, the intermediate member 260 may be in close contact with a surface of the extension 229, while simultaneously being in close contact with an inner circumferential surface of the heating element 462. Accordingly, the thermal energy generated from the heating element 462 may be transferred to the extension 229 of the second lens barrel 220 through the intermediate member 260.

The camera module 1011 may increase the contact area and heat transfer area between the heat generation device 460 and the second lens barrel 220-16 by including the intermediate member 260, and may thus rapidly heat the second lens barrel 220-16 through the heat generation device 460.

Figure 42:
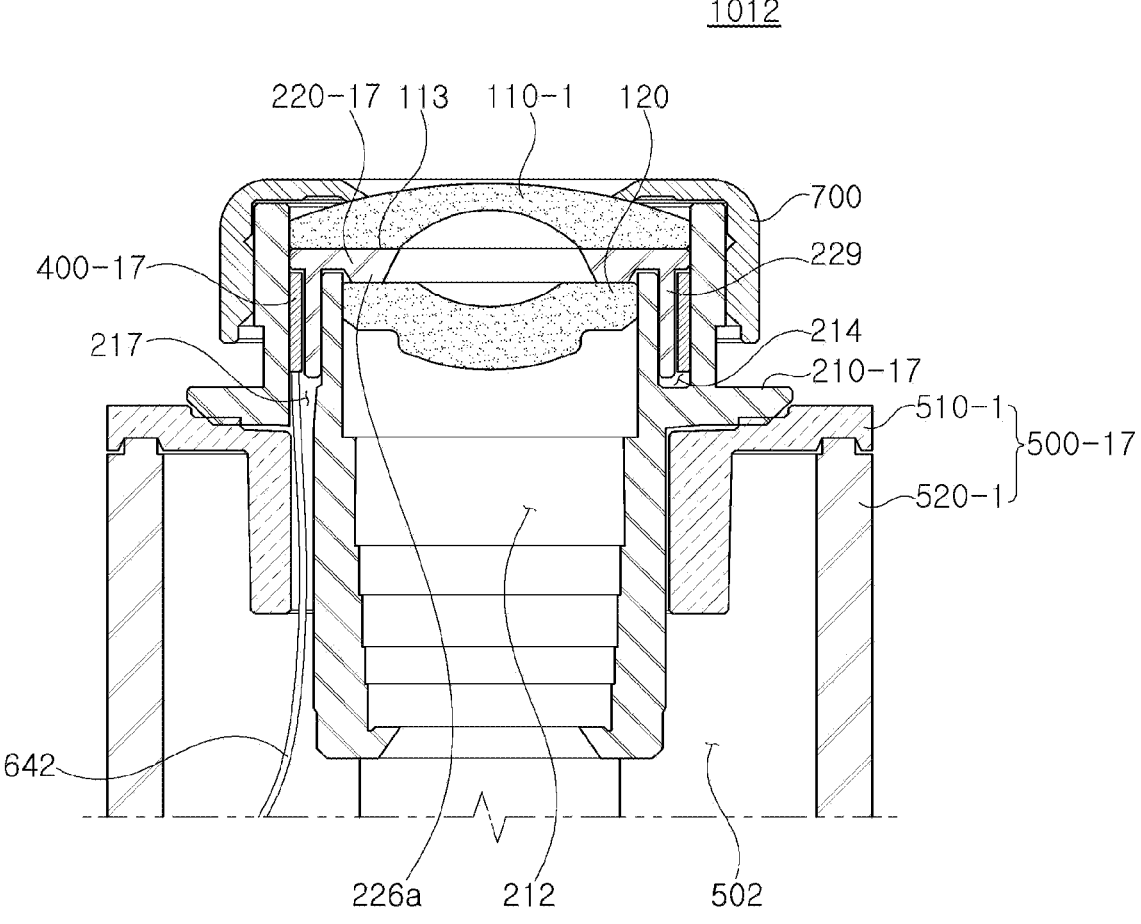
FIG. 42 is a cross-sectional view of a camera module, according to another embodiment.

FIG. 42 illustrates a camera module, according to another embodiment.

Referring to FIG. 42, a camera module 1012 may include a first lens barrel 210-17, a second lens barrel 220-17, an energy generation unit 400-17, a first housing 510-1, a second housing 520-1 and the cover member 700-2. However, the camera module 1012 is not limited to including the above-mentioned members.

The first lens barrel 210-17 may accommodate the plurality of lenses. For example, two or more lenses 120 may be accommodated in the first accommodation portion 212 of the first lens barrel 210-17. However, the number of lenses accommodated in the first lens barrel 210-17 is not limited to two. The first lens barrel 210-17 may be coupled with the second lens barrel 220-17 or accommodate the second lens barrel 220-17. For example, the second accommodation portion 214 accommodating the second lens barrel 220-17 may be formed in the first lens barrel 210-17 separately from the first accommodation portion 212.

The second lens barrel 220-17 may be coupled with the first lens barrel 210-17. For example, the second lens barrel 220-17 may be disposed inside the first lens barrel 210-17. The second lens barrel 220-17 may be easily coupled with the first lens barrel 210-17. For example, the second lens barrel 220-17 may include the extension 229 inserted into the second accommodation portion 214. The second lens barrel 220-17 may accommodate a forwardmost lens 110-1 or be in contact with the forwardmost lens 110. The second lens barrel 220-17 may be significantly sized to be in contact with the forwardmost lens 110-1. For example, one surface of the second lens barrel 220-17 may be in contact with a flange portion 113 of the forwardmost lens 110-1. The second lens barrel 220-17 may maintain a constant distance between the forwardmost lens 110-1 and the lens 120. For example, the second lens barrel 220-17 may include a protrusion 226a protruding toward the first accommodation portion 212 of the first lens barrel 210-17. The protrusion 226a may be formed between the forwardmost lens 110-1 and the lens 120 to maintain the constant distance between the forwardmost lens 110-1 and the lens 120. The second lens barrel 220-17 may be made of a material having higher thermal conductivity than that of the first lens barrel 210-17. In more detail, the second lens barrel 220-17 may be made of a metal material which may easily transfer heat. However, the material of the second lens barrel 220-17 is not limited to the metal.

The energy generation unit 400-17 may generate a predetermined amount of energy. For example, the energy generation unit 400-17 may be a heat generation device configured to generate thermal energy. As an example, the energy generation unit 400-17 may be a positive temperature coefficient (PTC) heater. However, the energy generation unit 400-17 is not limited to the heat generation device. For example, the energy generation unit 400-17 may be the excitation device or piezoelectric body configured to generate vibration energy. The energy generation unit 400-17 may be in close contact with the second lens barrel 220-17. For example, the energy generation unit 400-17 may be disposed in the second accommodation portion 214 of the first lens barrel 210 to be in contact with the extension 229 of the second lens barrel 220-17.

The energy generation unit 400-17 may transfer energy to the second lens barrel 220-17 and the forwardmost lens 110-1 in contact with the second lens barrel 220-17. For example, the energy generated by the energy generation unit 400-17 may be transferred to the body of the second lens barrel 220-17 and the forwardmost lens 110-1 through the extension 229. The energy generated by the energy generation unit 400-17 may be generally transferred only to the second lens barrel 220-17. For example, the second lens barrel 220-17 may be made of a material which may receive thermal energy, vibration energy and the like more easily than that of the first lens barrel 210-17, and most of the energy generated by the energy generation unit 400-17 may thus be transferred to the second lens barrel 220-17 or absorbed into the second lens barrel 220-17.

The energy generated by the energy generation unit 400-17 may be used to remove foreign matter adhering to the surface of the forwardmost lens 110-1. As an example, frost, moisture, or the like adhered to the surface of the forwardmost lens 110-1 may be removed by the thermal energy transferred from the energy generation unit 400-17. As another example, dust or the like adhered to the surface of the forwardmost lens 110-1 may be separated therefrom by vibration energy transferred from the energy generation unit 400-17.

For reference, the power line 642 connecting the energy generation unit 400-17 and the external power source may be extracted outward from the first lens barrel 210-17 through a hole 217 formed in the second accommodation portion 214 of the first lens barrel 210-17.

A housing 500-17 including the first housing 510-1 and the second housing 520-1 may accommodate some components of the camera module 1012. For example, an electronic component required to drive the camera module 1012 may be disposed or accommodated in a space 502 formed by the coupling of the first housing 510-1 and the second housing 520-1. The housing 500-17 may fix the position of the first lens barrel 210-17. For example, the first housing 510-1 may be coupled to the first lens barrel 210-17 to fix the position of the first lens barrel 210-17.

The cover member 700-2 may secure the forwardmost lens 110-1 to the first lens barrel 210-17. For example, the cover member 700-2 may be coupled to the first lens barrel 210-17 while pressing the edge of the forwardmost lens 110-1. The cover member 700-2 may be coupled to the first lens barrel 210-17 by a screw coupling.

As set forth above, according to embodiments disclosed herein, it is possible to resolve resolution degradation due to foreign matter. It is also possible to resolve the problem of a field of view being blocked due to the foreign matter.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a lens barrel accommodating a lens;
a forwardmost lens disposed closer to an object side than the lens, the forwardmost lens having a convex object-side surface and a step portion disposed along a periphery thereof;
an energy generation device configured to supply energy to the forwardmost lens;
an energy transfer member disposed in contact with the forwardmost lens and the energy generation device, and configured to transfer the supplied energy to the forwardmost lens;
a cover member coupled to the lens barrel, and configured to press an edge of the forwardmost lens at a position adjacent to the step portion, such that a gap is disposed between the step portion of the forwardmost lens and the cover member, to secure the forwardmost lens to the lens barrel; and
an airtight member disposed in the gap between the step portion of the forwardmost lens and the cover member.

2. The camera module of claim 1, wherein the lens barrel includes:
a first accommodation portion accommodating the lens, and
a second accommodation portion accommodating the energy transfer member.

3. The camera module of claim 2, wherein the energy generation device is disposed in the second accommodation portion.

4. The camera module of claim 3, further comprising an insulation member disposed in the second accommodation portion, and configured to block the supplied energy from being transferred to the lens barrel.

5. The camera module of claim 1, wherein the energy generation device is further configured to generate either one or both of thermal energy and vibration energy.

6. The camera module of claim 1, wherein the energy generation device is disposed between the lens barrel and the energy transfer member.

7. The camera module of claim 1, wherein the energy transfer member is made of a material having a thermal conductivity higher than a thermal conductivity of the lens barrel.

8. The camera module of claim 1, wherein the energy transfer member is in contact with a flange portion of the forwardmost lens.

9. The camera module of claim 8, wherein the forwardmost lens and the energy transfer member include respective inclined surfaces coupled to each other such that the forwardmost lens and the energy transfer member are aligned with each other, or
wherein the forwardmost lens includes protrusions and the energy transfer member includes grooves, and the protrusions and the grooves are coupled to each other such that the forwardmost lens and the energy transfer member are aligned with each other.

10. The camera module of claim 1, wherein the energy transfer member is disposed between the forwardmost lens and the lens.

11. A camera module, comprising:
a first lens barrel accommodating a lens;
a second lens barrel coupled to the first lens barrel, and coupled to or in contact with a forwardmost lens disposed in front of the lens, the forwardmost lens having a convex object-side surface and a step portion disposed along a periphery thereof;
an energy generation device disposed in contact with the second lens barrel, and configured to transfer energy to the forwardmost lens through the second lens barrel;
a cover member coupled to the first lens barrel or the second lens barrel, and configured to press an edge of the forwardmost lens at a position adjacent to the step portion, such that a gap is disposed between the step portion of the forwardmost lens and the cover member, to prevent the forwardmost lens from being separated from the first lens barrel or the second lens barrel; and
an airtight member disposed in the gap between the step portion of the forwardmost lens and the cover member.

12. The camera module of claim 11, wherein the second lens barrel is made of a material having a thermal conductivity higher than a thermal conductivity of the first lens barrel.

13. The camera module of claim 11, wherein the second lens barrel is in contact with a flange portion of the forwardmost lens.

14. The camera module of claim 11, wherein the second lens barrel includes an extension in contact with an inner circumferential surface of the energy generation device.

15. The camera module of claim 14, wherein the first lens barrel includes a space or a hole, and the extension is inserted into the space or the hole.

16. A camera module, comprising:
a first lens barrel accommodating one or more lenses;
a second lens barrel coupled to the first lens barrel;
an additional lens disposed closer to an object side of the camera module than the one or more lenses and having a larger diameter than the one or more lenses, and in contact with the second lens barrel, the additional lens having a refractive power and a convex object-side surface at an optical axis thereof, the additional lens including a step portion disposed along a periphery thereof;
an energy generation device disposed between the first lens barrel and the second lens barrel, and configured to transfer either one of thermal energy and vibration energy to the additional lens through the second lens barrel;
a cover member coupled to the first lens barrel or the second lens barrel, and configured to press an edge of the additional lens at a position adjacent to the step portion, such that a gap is disposed between the step portion of the additional lens and the cover member, to prevent the additional lens from being separated from the first lens barrel or the second lens barrel; and
an airtight member disposed in the gap between the step portion of the additional lens and the cover member.

17. The camera module of claim 16, wherein the energy generation device is not in contact with the first lens barrel.

18. The camera module of claim 17, further comprising an insulation member disposed between the energy generation device and the first lens barrel.

19. The camera module of claim 17, further comprising a buffer member disposed between the energy generation device and the first lens barrel, and configured to press the energy generation device against the second lens barrel.

20. The camera module of claim 16, wherein a material of the second lens barrel has a thermal conductivity higher than a thermal conductivity of a material of the first lens barrel.

\*   \*   \*   \*   \*